(12) United States Patent
Nahill et al.

(10) Patent No.: US 9,022,288 B2
(45) Date of Patent: May 5, 2015

(54) SYMBOL READING SYSTEM HAVING PREDICTIVE DIAGNOSTICS

(71) Applicant: Metrologic Instruments, Inc., Blackwood, NJ (US)

(72) Inventors: James Nahill, Turnersville, NJ (US); David M. Wilz, Sr., Sewell, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/973,315

(22) Filed: Aug. 22, 2013

(65) Prior Publication Data

US 2014/0061305 A1  Mar. 6, 2014

Related U.S. Application Data

(60) Provisional application No. 61/632,422, filed on Sep. 5, 2012.

(51) Int. Cl.
*G06K 7/14* (2006.01)
*G06K 7/00* (2006.01)
*G06K 7/10* (2006.01)

(52) U.S. Cl.
CPC ............ *G06K 7/0095* (2013.01); *G06K 7/1096* (2013.01)

(58) Field of Classification Search
USPC ..................................... 235/454, 462.25, 438
See application file for complete search history.

(56) References Cited

U.S. PATENT DOCUMENTS

| 6,619,549 | B2 | 9/2003 | Zhu et al. | |
| 7,128,266 | B2 | 10/2006 | Zhu | |
| 7,422,156 | B2 | 9/2008 | Good | |
| 7,841,533 | B2 | 11/2010 | Kotlarsky et al. | |
| 8,561,905 | B2 | 10/2013 | Edmonds et al. | |
| 8,636,212 | B2 | 1/2014 | Nahill et al. | |
| 2006/0196942 | A1* | 9/2006 | Itou et al. | 235/462.22 |
| 2008/0314985 | A1 | 12/2008 | Kotlarsky et al. | |
| 2014/0131441 | A1 | 5/2014 | Nahill et al. | |

* cited by examiner

*Primary Examiner* — Jamara Franklin
(74) *Attorney, Agent, or Firm* — Additon, Higgins & Pendleton, P.A.

(57) ABSTRACT

A retail information network includes one or more POS scanning and checkout systems, each including (i) a bar code symbol reading subsystem, and (ii) a cash register computer subsystem interfaced with the bar code symbol reading subsystem and a network infrastructure, and each having access to product and price data maintained in a product/price database. The bar code symbol reading subsystem includes a local predictive error event (PEE) data store for logging and storing predictive error events (PEEs) detected within the bar code symbol reading system, wherein said PEEs are subsequently sent to POS information servers used to create predictive error alerts (PEAs) and corresponding instructions to maintain and/or repair certain aspects of the bar code symbol reading system.

20 Claims, 37 Drawing Sheets

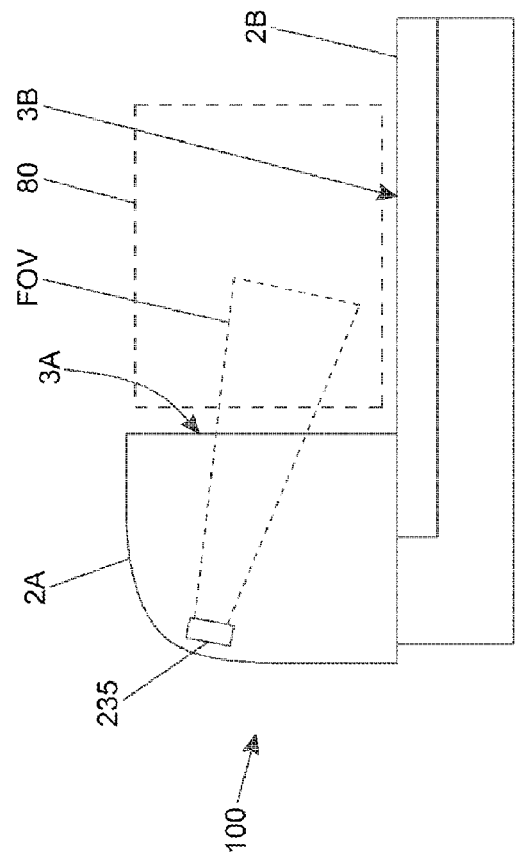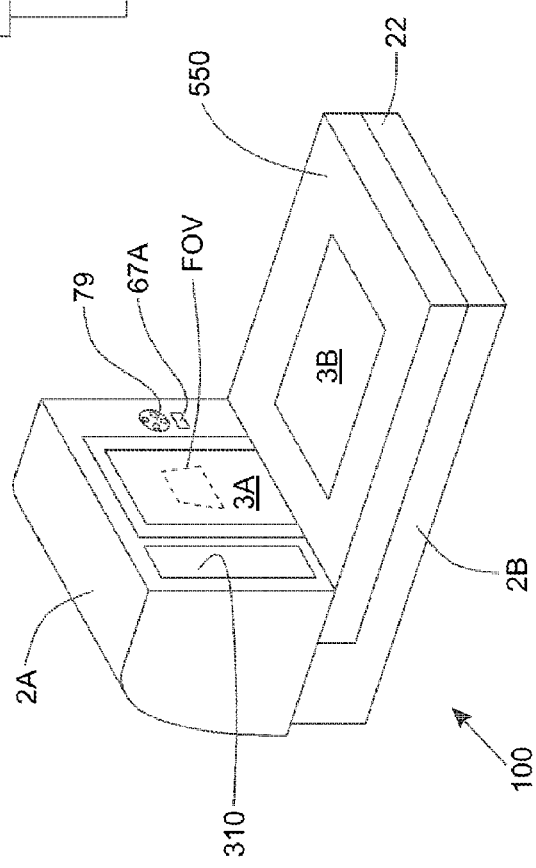

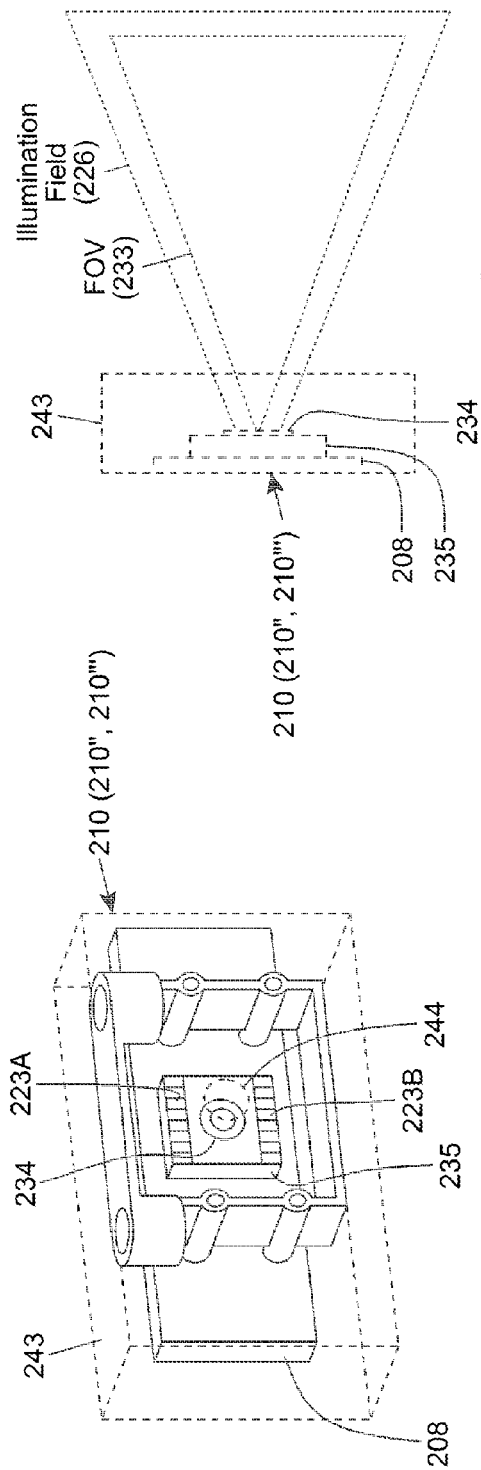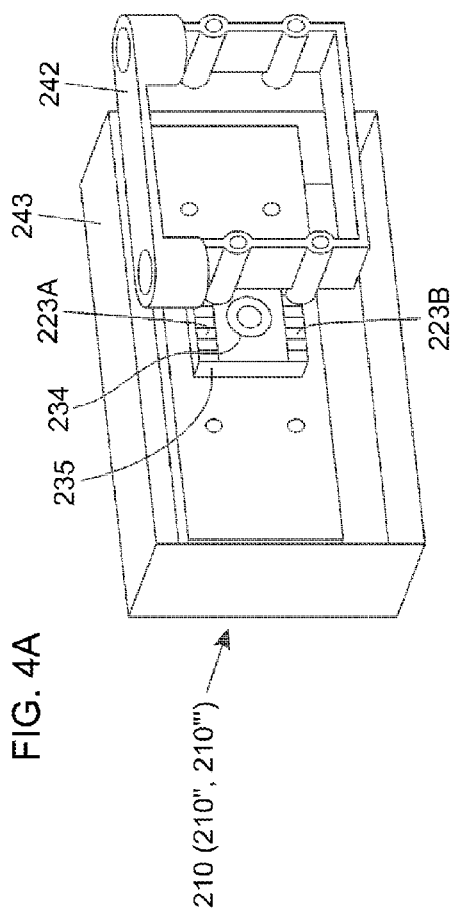

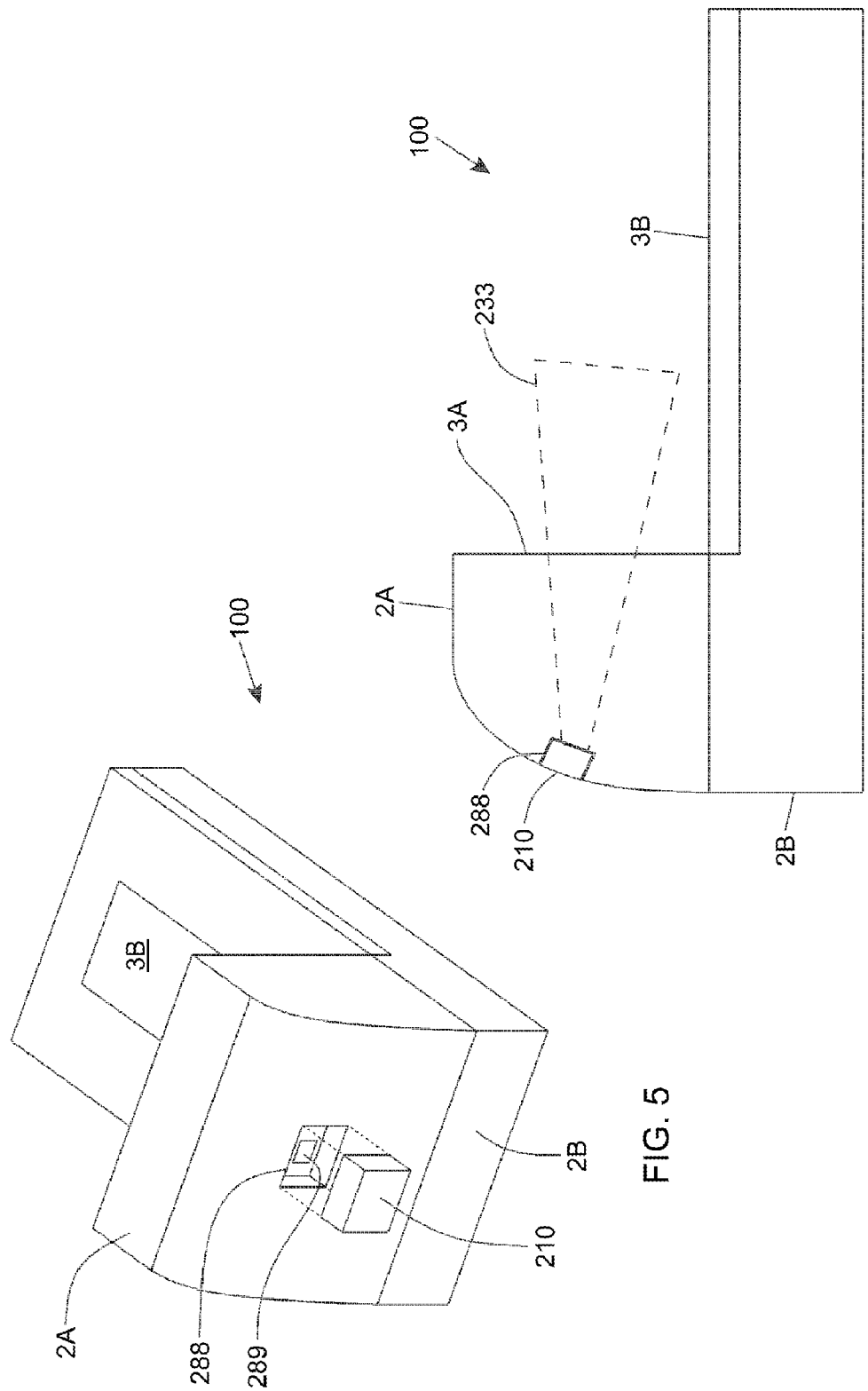

SYMBOL READING SYSTEM HAVING PREDICTIVE DIAGNOSTICS

CROSS-REFERENCE TO PRIORITY APPLICATION

This application hereby claims the benefit of U.S. Provisional Patent Application No. 61/632,422 for a "Method of and Apparatus for Predictive Diagnostics and Pro-Active Reporting of Possible Failures in Hybrid Laser Scanning and Digital Imaging Systems, Digital Imaging Systems, and Laser Scanning Systems" (filed Sep. 5, 2012 at the United States Patent and Trademark Office), which is hereby incorporated by reference in its entirety.

BACKGROUND OF INVENTION

1. Field of Disclosure

The present disclosure relates to improvements in detecting and reporting conditions within bar code symbol reading systems deployed at retail POS stations, to avoid system breakdown or failure, and thus the loss of sales or decrease in worker productivity in retail store environments.

2. Brief Description of the State of Knowledge in the Art

In general, prior art POS-based bar code symbol reading systems only alert the cashier and/or manager after error events have occurred, based on log records of error events after they have occurred. Hitherto, retail managers have been satisfied that reports can be generated and action can be discussed regarding these and other fatal errors, using after-the-fact techniques. However, this reactive approach has resulted in unnecessary expenses, and lost revenues in the retail environment.

Also, currently, prior art POS-based bar code symbol reading systems and cash register computer systems lack the capacity to report problems with symbologies and product labels that have generated errors or presented difficulties during POS scanning operations. Reports on difficult to scan and read bar code symbols and product items often get lost along the chain from the cashier, to the store manager, and to product representatives. Once a product item is approved for the sale in the retailer's store, there is usually no quality monitoring of the product and the symbology that it represents after it is released into the retailer's inventory.

Thus, there is a great need in the art for a new and improved bar code symbol reading system having the capacity to support predictive diagnostics and reporting functions, on both internal events and external events, while avoiding the shortcomings and drawbacks of prior art technologies.

OBJECTS OF THE PRESENT DISCLOSURE

Accordingly, a primary object of the present disclosure is to provide a new and improved bar code symbol reading system with the capacity to support predictive diagnostics and reporting functions so that system operators and/or other personnel can be notified of particular kinds of events before they happen, allowing improved levels of system maintenance to be performed during normal scheduled maintenance activities, while avoiding the shortcomings and drawbacks of prior art technologies.

Another object is to provide a bar code symbol reading system, equipped with an integrated scale subsystem, and the capacity to support levels of predictive diagnostics and reporting functions allowing system operators to be automatically notified of particular kinds of events before they are likely to happen, so that improved levels of system maintenance can be provided during normal scheduled maintenance activities.

Another object is to provide a bar code symbol reading system having the capacity to predict that many different types of errors could possibly happen soon, thus providing advance warnings, and saving significant amounts of money in expenses and lost revenue to retailers.

Another object is to provide a bar code symbol reading system, in cooperation with a POS cash register computer system and POS information server deployed in a retail information network, with the capacity to proactively generate predictive error alerts based on what may likely happen either inside the system, or outside the system while code symbol scanning, before the occurrence of an error event.

Another object is to provide a bar code symbol reading system having the capacity to list a number of specific potential problem situations in the system, and automatically alert the cashier and/or store management before such situations become critical or otherwise fatal.

Another object is to provide a bar code symbol reading system that uses its digital imager to capture a digital image of the scanning/imaging window while in a clean state, and then store the digital image as a reference for subsequent use when determining when the scanning/imaging window has attained an optical state that requires cleaning.

Another object is to provide a bar code symbol reading system that senses the drive current supplied to the illumination LED array used by the digital imager, and compare the sensed LED drive current to a baseline current, detecting predictive error events (PEE) for the LED illumination array.

Another object is to provide a bar code symbol reading system that uses its digital imager to image a laser scanning pattern being projected onto the scanning window, to determine if any laser diodes are not functioning, or are producing weak laser beams.

Another object is to provide a bar code symbol reading system that uses its digital imager to digitally image a laser scanning pattern being projected onto a reflective flat surface while in a maintenance mode, and analyze the laser patterns to determine if any laser diodes in the laser scanning subsystem are not functioning properly, or are producing weak laser scanning beams.

Another object is to provide a digital-imaging bar code symbol reading system that flags imager communication degradation by analysis of main microprocessor operation.

Another object is to provide a bar code symbol reading system that uses the decode time (i.e. time to scan code) as a prediction of a dirty scanning window or illumination issues or other internal functional degradation.

Another object is to provide a bar code symbol reading system that uses the number of decoding attempts (i.e. moving an object into, out of and back into the scan field a number of times) as a prediction of a dirty scanning window, illumination issues, and/or other internal functional degradation.

Another object is to provide a bar code symbol reading system that uses an increased decode time on specific code symbologies, along with server interaction, to predict potential error events, or scanner issues.

Another object is to provide a bar code symbol reading system that processes digital images acquired during scale zero measurement operations, to diagnose incorrect scale zeroing operation.

Another object is to provide a bar code symbol reading system that captures and processes digital images upon the occurrence of "no reads" to diagnose or predict improper operation (i.e. to reveal that the bar code was covered or obstructed, and a special beep sound is produced).

Another object is to provide a bar code symbol reading system that predicts potential issues by sensing for the warning current levels of laser devices employed in its laser scanning subsystem.

Another object is to provide a bar code symbol reading system that predicts potential issues by sensing for the warning current levels of motors employed in its laser scanning subsystem.

Another object is to provide a bar code symbol reading system that monitors the total current level produced by the system on initial surges, and also during quiescent operation, for change in levels previously stored as maximum surge and quiescent normal current levels.

Another object is to provide a bar code symbol reading system that monitors the total current level produced by the system during different levels of power-save mode operation for analysis and determination that the unit is not saving as much power as designed or desired.

Another object is to provide a bar code symbol reading and weigh scale system that senses the number of zero button presses as a prediction of the scale requiring zeroing too often.

Another object is to provide a bar code symbol reading system that senses extremely short-duration button depressions as a predictor of potential button failure, wherein too-short switching duration indicate non-real switching operations, and too-long switching duration indicates sticking-action.

Another object is to provide a bar code symbol reading system that uses the digital imager as a backup from waking up from power save modes to predict that separate IR-based wake-up system sensor is not being used as much and may be failing.

Another object is to provide a bar code symbol reading system that predicts potential wake-up sensor issues by monitoring the need for the wakeup button or switch to determine if it has been initiated repetitively thus showing the wakeup sensor not working as designed.

Another object is to provide a bar code symbol reading system that does periodic self-checking on its own electronic circuitry and functions namely firmware integrity, interface operation, configuration validity, auxiliary scanner integrity, internal digital imager integrity, customer-facing imager integrity, EAS subsystem integrity, electronic weigh scale sub-system integrity, and the integrity of any and all attached devices, monitored for current and predictive future problems.

Another object is to provide a bar code symbol reading and weigh scale system that uses the last calibration date as predictor of scale maintenance requirements.

Another object is to provide a bar code symbol reading system that predicts system issues by sensing changes in electrical current flowing through all local and auxiliary devices.

Another object is to provide a bar code symbol reading and weigh scale system that predicts the need for scale calibration by sensing scale zero drift.

Another object is to provide a bar code symbol reading and weigh scale system that monitors scale metrology numbers to diagnose improper scale operation, wherein these numbers plus the current weight read from the electronic scale sub-system provide an indication that the scale subsystem is drifting toward non-desired areas of operation.

Another object is to provide a bar code symbol reading system with the capacity for automated barcode analysis, problem notification and performance metric generation for retail managers through the supply chain up to product manufacturers.

Another object is to provide a bar code symbol reading system that proactively generates alerts based on what may happen within the system, based on monitored conditions within the system.

Another object is to provide a novel method for generating predictive error events (PEEs) with respect to a bar code symbol reading system deployed on a retailer information network, and storing the PEE records in a PEE database for subsequent processing by a POS information server.

These and other objects will become apparent hereinafter and in the Claims.

BRIEF DESCRIPTION OF THE DRAWINGS

In order to more fully understand the Objects, the following Detailed Description of the Illustrative Embodiments should be read in conjunction with the accompanying figure Drawings in which:

FIG. 3B a second perspective view of the hybrid-type bi-optical bar code symbol reading system of FIG. 3A, showing the field of view (FOV) and field of illumination (FOI) of the digital imaging subsystem directly projecting through the vertical scanning window in the vertical section of the system housing;

FIG. 3C is a first cross-sectional side view of the hybrid-type bi-optical bar code symbol reading system of FIGS. 3A and 3B, showing the FOV of digital imaging module being projected through the vertical scanning window, into the 3D scanning volume of the system, as an operator naturally presents a difficult to read code symbol closely towards the vertical scanning window;

FIG. 4A is a perspective view of the digital imaging module (i.e. digital imaging subsystem) employed in the system of FIGS. 3A through 3E, showing its area-type image detection array mounted on a PC board supporting drivers and control circuits, and surrounded by a pair of linear arrays of light emitting diodes (LEDs) for directly projecting a field of visible illumination (FOI) spatially co-extensive with and spatially-overlapping the FOV of the digital imaging subsystem;

FIG. 4B is a side view of the digital imaging module shown in FIG. 4A, showing the field of visible illumination produced by its array of LEDs being spatially co-extensive with and spatially-overlapping the FOV of the digital imaging subsystem;

FIG. 4C is an exploded view of the digital imaging module shown in FIG. 4A;

FIG. 5 is a rear perspective view of the hybrid-type bi-optical bar code symbol reading system of FIGS. 3A and 3B, showing a portal with a cavity formed in the rear section of the system housing, for receipt of a digital imaging module for projecting the FOV and illumination field produced from the digital imaging module when it is installed within the portal;

FIG. 6 is a cross-sectional view of the hybrid-type bi-optical bar code symbol reading system of FIGS. 3A through 3E and 5, showing the digital imaging module installed through the portal and into the cavity formed in the rear vertical portion of the system housing, with all of the electrical interfaces between the digital imaging module and system being established on completion of the module installation;

DETAILED DESCRIPTION OF THE ILLUSTRATIVE EMBODIMENTS

Figure 1:
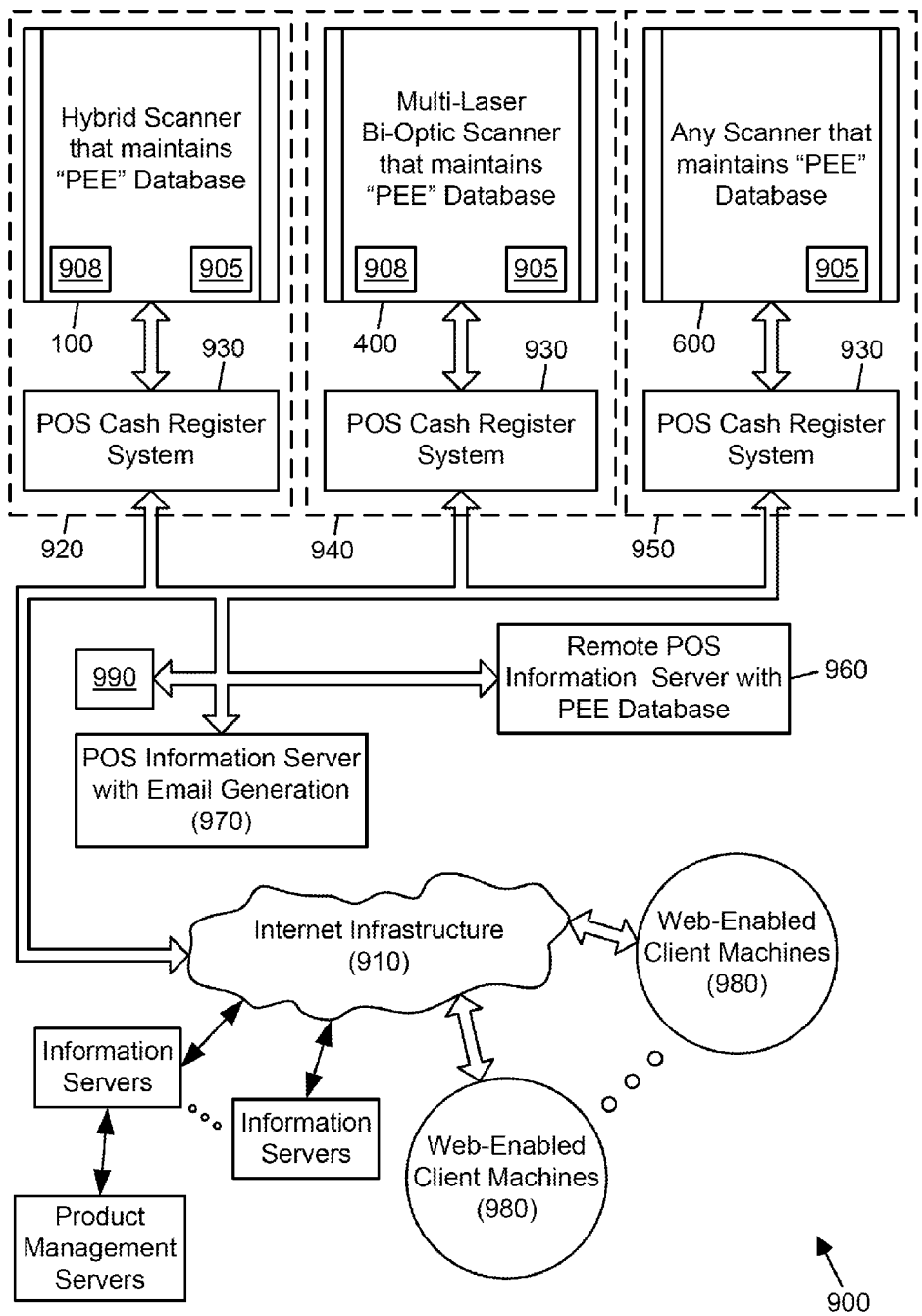
FIG. 1 is a retail information network of the present disclosure, comprising a network infrastructure with Internet connectivity and on which the following network devices are deployed: (i) a first POS-based scanning and checkout system interfaced to a hybrid (i.e. laser scanning and digital imaging) bar code symbol reading system, (ii) a second POS-based scanning and checkout system interfaced with a multi-laser bi-optical laser scanning bar code symbol reading system, (iii) a third POS-based scanning and checkout system interfaced with a single laser scanning bar code reading system, (iv) a product/price database server for storing product/price data with associated bar code symbol character data, (v) a remote information server (implementable on the same server machine as the product/price database server, but providing a different extended functionality) interfaced with a Predictive Error Event (PEE) database, (vi) a PEE/Problem Logging database server for storing PEEs detected at each POS-station, and (vii) a plurality of Internet-enabled client machines managed by the retail outlet and product manufacturers whose consumer products are being offered for sale and being scanned in the retail store environment.

Referring to the figures in the accompanying Drawings, the various illustrative embodiments of the apparatus and methodologies will be described in great detail, wherein like elements will be indicated using like reference numerals.

The Retail Information Network According to the Invention Disclosure

In FIG. 1, the retail information network 900 of the present disclosure is shown comprising: an Internet infrastructure 910 comprising Internet Packet (IP) routers, switches, hubs and other networking devices supporting TCP/IP and other communication protocols well known in the packet-switched data communications and networking art: a first POS-based scanning and checkout system 920 employing a hybrid (i.e. laser scanning and digital imaging) bar code symbol reading system 100 interfaced with a POS-based cash register system 930 having a display panel, keyboard and cash drawer, being operably connected to the infrastructure of the Internet 910, capable of differentiating laser scan data from image scan data, and maintaining a local database or data store 905 for storing and accessing predictive error event (PEE) records generated within the system 100; a second POS-based scanning and checkout system 940 employing a bi-optical multi-laser bar code symbol reading system 400 interfaced with a POS-based cash register system 930 having a display panel, keyboard and cash drawer, being operably connected to the infrastructure of the Internet 910, and maintaining a local database or data store 905 for storing and accessing predictive error event (PEE) records generated within the system 400; a third POS-based scanning and checkout system 950 employing a single digital imaging bar code symbol reading system 600 or laser scanning bar code reading system 800 interfaced with a POS-based cash register system 930 having a display panel, keyboard and cash drawer, being interfaced with the Internet infrastructure 910, and maintaining a local database or data store 905 for storing and accessing for storing and accessing predictive error event (PEE) records generated within the system 600; a remote event/problem logging information server with remote database 960, operably connected to the infrastructure of the Internet 910, for storing PEE records and performing procedures on data records stored in the database; and a plurality of Internet-enabled client machines 980 having a display panel and keyboard, and being operably connected to the infrastructure of the Internet 910, supporting a web browser and email client application software, and managed by different consumer product manufacturers supplying consumer products being sold in the retail store environment, for receiving email or instant messages transmitted by the POS information server 970 in response to a predetermined number of predictive error events (PEE) detected at the POS stations within the retail store environment.

Each POS-based scanning and checkout system 920, 940 and 950 has access to the retail store's product/price database server 990, which typically is centrally maintained on the retail network and possibly a copy thereof is resident within the POS-based cash register system. For each UPC/EAN-indexed (bar-coded) product within inventory and offered for sale in the retail environment, the product/price database server 990 contains a number of information items associated with bar code symbol character data (string) encoded in a bar code symbol structure applied to, or associated with, the bar coded item, namely: product descriptors; price information; trademark descriptors; special handling instructions; and possibly other information items conventionally specified under the EDI 832 retail transaction data set, well known in the art.

As used hereinafter, and in the Claims, the terms "bar code symbol character data", "bar code symbol character data string", and "symbol character data string" shall refer to any numerical, alphabetical or alphanumerical string, of any length, constructed according any symbology (e.g. UPC, EAN, UPC/EAN, JAN, and other symbologies known in the art) that can serve to uniquely identify a product item being purchased at a POS station, when used with a product/price database system, such as product/price database 990.

Each POS-based scanning and checkout system 920, 940 and 950 has the capacity to recognize whether or not a scanned product is registered or identifiable on the retailer's information network. Also, each POS-based scanning and checkout system has the capacity to predict Potential Error Events (PEE), during system operation, using the predictive test procedures set forth in the flow charts of FIGS. 17A through 23B, specified in greater detail hereinafter. Also, each bar code symbol reading system interfaced to its POS-based cash register system 930, maintains a local database (or memory storage device) 905 that maintains a record of each predictive error event (PEE) identified by the bar code symbol reading system 100, 400 and 600. Each PEE record consists of a local database record comprising: a time-of-day (i.e. date/time) stamp; a machine identification number (i.e. uniquely specifying the bar code symbol reading system on the retailer's information network; a MAC address for the system; an Internet address for the machine (if statically assigned thereto by the network administrator); the system functions, or device components which are predicted as likely to experience failure or malfunction in the near or not too distant future; retail store number identifying the store where the system is installed; the physical location in the store where the bar code symbol reading system is installed (e.g. POS station number); and possibly GPS coordinates where the bar code symbol reading system is physically located; etc. This local PEE record item is maintained in the local PEE database 905, along with its active or inactive status, so as not to repeat the same alert if it were to appear again when already active. The local PEE database 905 within the bar code symbol reading system is useful in that it can enforce local predictive diagnostics responses such as getting the cashier or POS operator to perform local predictive maintenance such as cleaning the scanning windows. Remote PEE database(s) 960 is maintained on the network for recognizing certain PEE events have exceeded their allowed threshold (or limits), and notifying different managerial personnel as needed. The local limit and threshold can be what number of PEE records must be generated for a given PEE type for a PEE record to be transmitted to the POS Server 970 via the POS cash register computer system 930. In the event the local and remote PEE threshold/limits are both set to zero, then each and every PEE record will be transmitted to the remote POS Server 970, to cause the POS server to automatically and immediately generate a Predictive Error Alert (PEA), as will be described in greater detail hereinafter.

Also, each bar code symbology (barcode-type) has its own built in programmable level of security (i.e. a set of preconfigured rules) for checking, validating and verifying bar code symbol strings (e.g. bar and space tolerances, adjacent character constraints, redundancy, etc). Thus, when the symbology is decoded by the bar code symbol reading system, the system will apply this set of pre-configured rules to perform filter functions that verify the correctness of the bar symbol character data string that it is about to be transmitted to the cash register system, after each scanning event. The main purpose of these pre-configured rules is to prevent misreads by the bar code symbol reading system. At some point, after several attempts to read a difficult bar code symbol, the symbol character data for a scanned product item may not be transmitted to the POS-based cash register computer, and used to ring up the product purchase during the checkout process.

In general, the bar code symbol reading systems of the present disclosure have special capacities for recognizing particular types of predictive error events (PEEs) to be described below. Notably, these error events can be classified into several different classes based on the system requirements of the PEE type (e.g. some PEE types require digital imaging and processing functionalities within the bar code symbol reading system, and other PEE types requiring both digital imaging and laser scanning functionalities, and perhaps integrated electronic weigh scale instrumentation as well, in certain system applications).

Predictive Activities (Error Event Types) Requiring The Digital Imaging Based Monitoring:

(1) The hybrid digital imaging and laser scanning system uses its digital imager to capture one or more digital images (i.e. pictures) of a clean scanning/imaging window, and then store these digital images as a reference for future use in determining when the scanning/imaging window requires cleaning during future diagnostic procedures carried out on the hybrid bar code symbol reading system.

(2) The hybrid digital imaging and laser scanning system monitors the drive current through its array of illumination LEDs, and compare this LED drive current to a baseline current expected to warn the network of potential failure.

(3) The hybrid digital imaging and laser scanning system uses its digital imager to image and analyze the laser scanning pattern to predict if any lasers are not working properly or as required for normal operation.

(4) The hybrid digital imaging and laser scanning system uses its digital imager to predict degradation in digital image communication supported by the main microprocessor and communication platform.

(5) The hybrid digital imaging and laser scanning system uses its digital imager to capture and process digital images of the laser scanning/imaging window and/or laser scanning pattern, and the decode processing time is used to predict the presence of dirty scanning/imaging windows and/or laser scanning pattern issues.

(6) The hybrid digital imaging and laser scanning system uses its digital imager to capture and process digital images, and the decode time required to read a specific code symbol, along with server interaction, is used to predict potential scanner issues.

(7) The hybrid digital imaging and laser scanning system uses its digital imager to capture and process digital images, and the number of scan-decode attempts required to read a specific code symbol, along with server interaction, is used to predict potential scanner issues.

(8) The hybrid digital imaging and laser scanning system uses its digital imager to capture and process digital images of the weigh platter during scale zeroing operations, to predict and notify about incorrect zeroing operation.

(9) The hybrid digital imaging and laser scanning system uses its digital imager to capture and process digital images upon the occurrence of "no reads" to diagnose improper operation (i.e. bar code is covered or obstructed, whereby a special beep is sounded).

(10) The hybrid digital imaging and laser scanning system uses its digital imager to capture and process digital images of the 3D scanning volume, to predict wake-up sensor is failing.

Predictive Activities Requiring Laser Scanning Monitoring Only:

(11) The warning current level of the laser diodes are sensed and monitored to predict potential issues.

(12) The warning current level of the laser scanning motor is sensed and monitored to predict potential issues.

Predictive Activities (Error Event Type) Requiring System Hardware Monitoring:

(13) The total current level drawn on initial surge and also during quiescent operation, are monitored for changes measured against current levels that have been previously stored as maximum current surge levels and quiescent normal current levels.

Predictive Activities Requiring The Digital Weigh Scale and System Hardware Monitoring:

(14) The number of zero button presses are monitored and used to predict whether or not the electronic weigh scale requires servicing or maintenance, despite that the fact that other things can be implied here besides the scale requiring calibration, such as the cashier playing too much with the zero push-button switch.

Predictive Activities Requiring System Wake-Up Switch Monitoring:

(15) Monitoring the time duration of any system switch generated signals to predict extremely short button presses as a predictor of potential button failures (i.e. if the monitored the switch signals are extremely too short, then they are probably not actual switch actuations, or if the switch signals are too long, then they probably indicate switch-sticking-action)

(16) Monitoring the system wake-up switch for repetitive actuations, to predict malfunction or normal wakeup IR sensor operation failure.

Predictive Activities Requiring the Digital Imaging Subsystem and System Monitoring:

(17) Using the last calibration date of the electronic weigh scale subsystem, as a predictor of scale maintenance required.

(18) Monitoring changes in the electrical current flowing through all local and auxiliary devices to predict potential future maintenance issues.

Predictive Activities Requiring The Digital Weigh Scale Subsystem:

(19) Monitoring the zero drifting behavior in the electronic weigh scale subsystem, to predict the need for electronic weigh scale zeroing or calibration.

(20) Monitoring metrology numbers on the electronic weigh scale, are collected during a substantial weighing activity and analyze, diagnose and predict improper scale operation (e.g. drift from the normal travel of the scale when arriving at a final weight indicating possible interference with the scale arms which should be free to travel at all times).

Overview of Predictive Error Event (PEE) Detection Carried Out Within the Bar Code Symbol Reading System at Each POS Station Deployed Along the Retailer Information Network As described above, each bar code symbol reading system 100, 400 and 600 is equipped with the capacity to automatically recognize that there could be a failure indicated by some or all of the predictive error events (PEE) types specified above, depending on the capacities of the system. Such recognition capacities will include, inter alia, sensors, feedback, communication, control and diagnostic software functions, which are proactively used to detect any of the predictive error types specified above. Each predictive error event (PEE) specification has a programmed local limit of operation which once exceeded (the number to exceed may be 0), automatically generates a potential error alert (PEA) transmitting this information to the Point-Of-Sale (POS) terminals. The POS terminal contains software module (e.g. drivers) 908 that filter out these potential error alerts (PEAs). The software module 908 can be realized within the bar code symbol reading system, or installed within the POS cash register computer 930, as suggested or required in any given application environment. Instead of treating the PEA data as if a bar code symbol was scanned, the POS cash register computer system 930 relays this information, from the bar code symbol reading system, to the POS information server 960, typically located in the back room or off-site, for time-stamping and special handling of the PEAs. Once a 'time stamped' potential error alert (PEA) data package is received by the POS server, the POS server logs and files the event and then determines whether or not an immediate distribution of the notification is required or otherwise indicated. The POS server database 960 will contain records regarding the performance and error events (PEEs) of all checkout lanes in the retail store. POS information server 960 or 970 sends email or instant messages (regarding PEAs) to all the pre-programmed parties that need to know and take action on this documented predictive error event (PEE) information. Such email distribution serves to notify the proper departments that there is a problem brewing with respect to a specific bar code symbol reading system on the retailer information network, and that action should be taken. The PEE record provides evidence that a specific system or component malfunction is imminent, and should be avoided by taking a prescribed course of action now, and not after the malfunction occurs. If no action is taken, then the PEE record will help management account for those individuals who were notified and did not proactively respond to the situation. In summary, the retail information network in FIG. 1 enforces responsible individuals in the organization to act proactively to service bar code symbol reading equipment on the network, and thereby save the users of the equipment both time and money before machine malfunction or breakdown. The flow of "predictive error alert" activity supported by the system will be described in greater detail hereinafter.

Method of Automatically Detecting Predictive Error Events (PEEs) within Bar Code Symbol Reading Systems Deployed on a Retailer Information Network Referring to FIGS. 2A and 2B, an overview will be described for the process carried out on the retail information network shown in FIG. 1, commenced at each POS-based scanning and checkout system when an operator attempts to read a bar code symbol at the POS station.

Figure 2A:
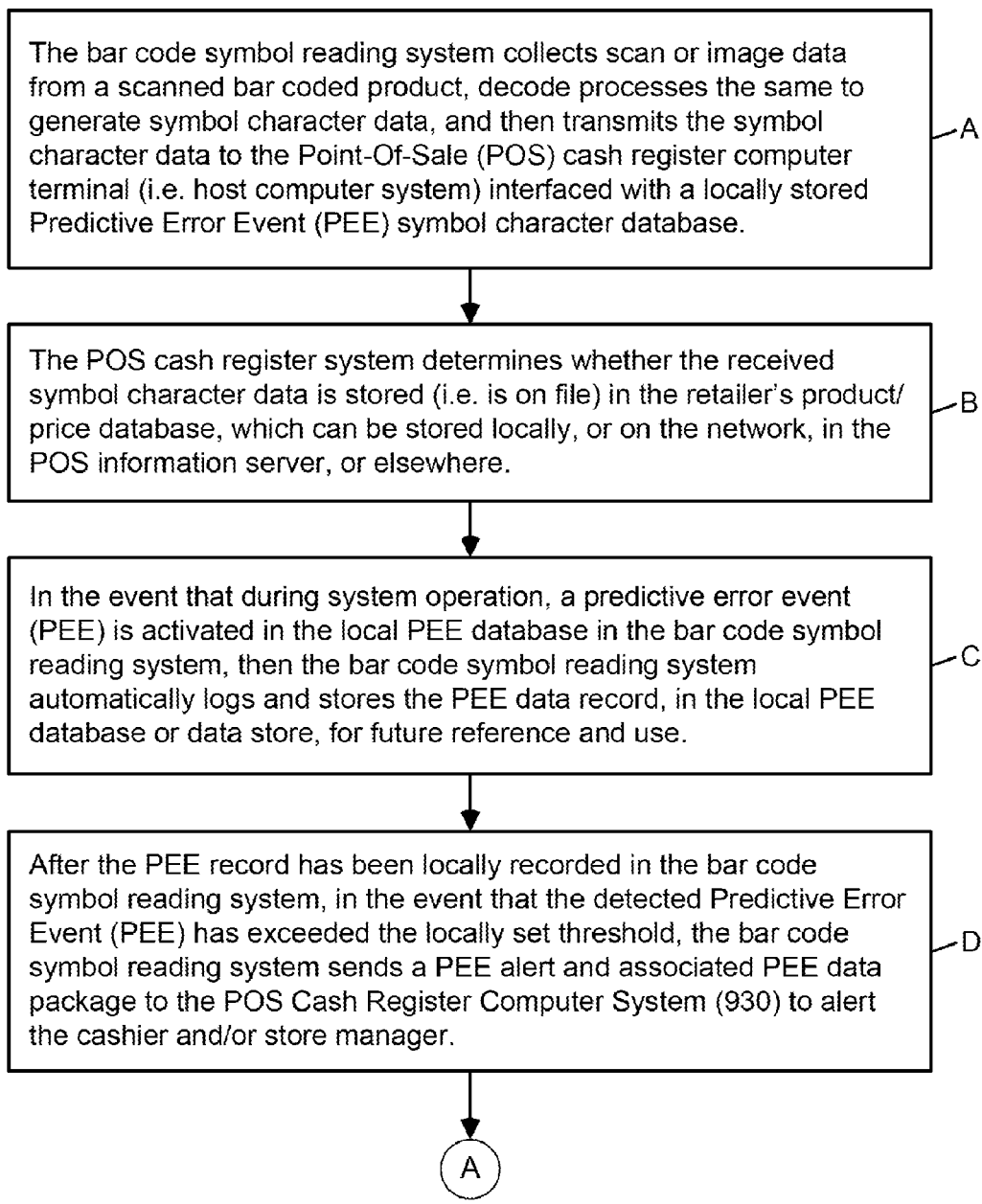
FIGS. 2A and 2B, taken together, set forth a flow chart describing an overview of the predictive error event (PEE) detection processes that are carried out on the retail information network shown in FIG. 1, to better manage the occurrence of predictive error events detected within various types of bar code symbol reading systems, deployed at POS stations within the retailer's information network.
Figure 2B:
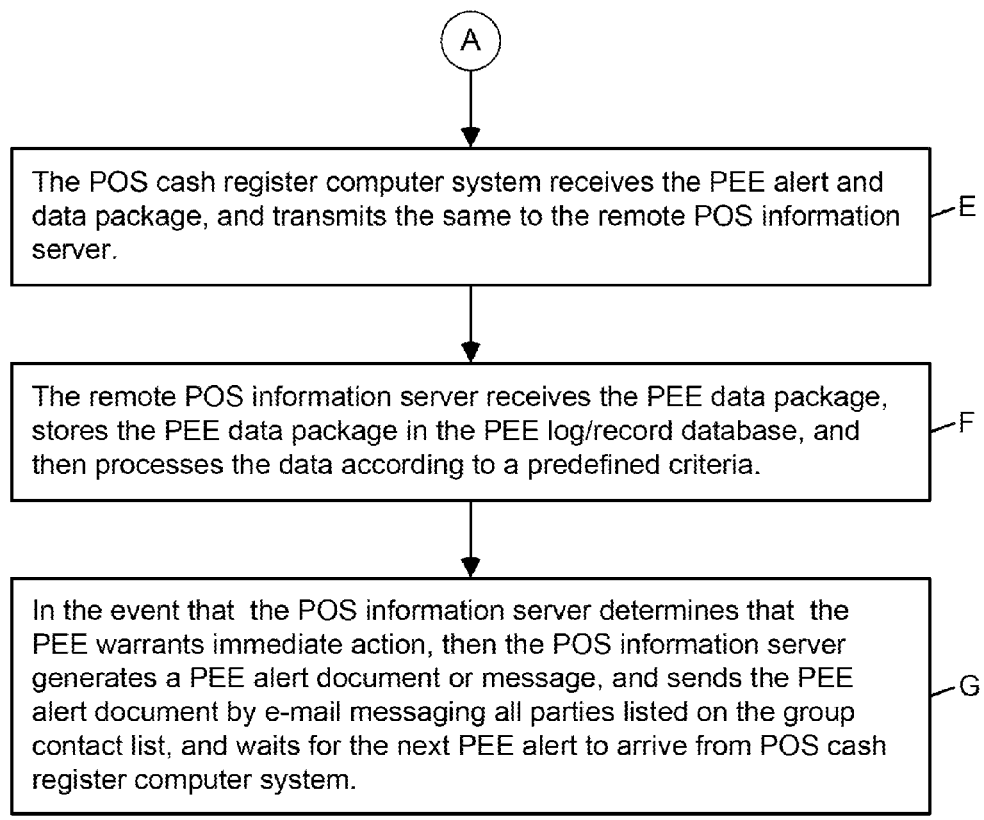

As indicated at Block A in FIG. 2A, the bar code symbol reading system 100, 400, or 600 collects scan or image data from a scanned bar coded product, decode processes the same to generate symbol character data, and then transmits the symbol character data to the Point-Of-Sale (POS) cash register terminal (i.e. host computer system).

As indicated at Block B, in turn, the POS cash register system 930 then determines whether the received symbol character data string (from the bar code symbol reading system) is stored or on file in the product/price database 990—which can be stored locally at the POS cash register computer system, or in database server or POS information server 970 on the network. If the product/price database 990 is stored on the POS information server 970, or on a separate POS information server, then the POS cash register system 930 transfers the received symbol character data to the POS information server 970, usually in the retailer's back office, to check if the received symbol character data is contained in (i.e. on file) in the product/price database 990.

As indicated at Block C, if during system operation, a predictive error event (PEE) is activated in the local PEE database 905 aboard the bar code symbol reading system, then the bar code symbol reading system automatically logs and stores the PEE data record, in the local PEE database or data store 905, for future reference and non-repetitive use.

As indicated at Block D, after the PEE record has been locally recorded in the bar code symbol reading system, in the event that the detected predictive error event (PEE) has exceeded the locally set threshold level, which maybe zero, the bar code symbol reading system sends a PEE alert and associated PEE data package to the POS cash register computer system 930, interfaced with the bar code symbol reading system.

As indicated at Block E, the POS cash register computer system 930 receives the PEE alert and data package, and transmits the same to the remote POS information server 960.

As indicated at Block F, the remote POS information server 960 receives the PEE data package, stores the PEE data package in its PEE log/record database, and then processes the data according to predefined criteria.

As indicated at Block G, in the event the POS information server 960 determines that the PEE warrants immediate action, then the POS information server 960, or 970, generates a PEE alert document or message, and sends the PEE alert document by e-mail or instant messaging all parties listed on the group contact list, and waits for the next PEE alert to arrive from a POS cash register computer system 930. This alert list will contain the cashier, in some cases such as "clean the scan window" event in which case an alert message is transmitted to the POS cash register computer system to immediately alert the cashier.

Specification of the Hybrid-Type Scanning/Imaging Bar Code Symbol Reading System Employing a Locally Maintained Predictive Error Event (PEE) Database FIGS. 3A through 3D show an illustrative embodiment of the hybrid laser-scanning/digital-imaging (i.e. scanning/imaging) based bar code symbol reading system 100 of the present disclosure supporting three different modes of operation, namely: a laser scanning (only) mode of operation; a digital imaging mode of operation; and a hybrid scanning/imaging mode of operation. The hybrid scanning/imaging system 100 of the present disclosure, and its various modes of operation, will now be described below in great technical detail.

As shown in FIGS. 3A through 3D, the hybrid scanning/imaging code symbol reading system of the illustrative embodiment includes a system housing 2 having a vertical housing section 2A having a vertical optically transparent (glass) scanning window 3A, and a horizontal housing section 2B having a horizontal optically transparent (glass) scanning window 3B. As shown, the horizontal and vertical sections 2A and 2B are arranged in an orthogonal relationship with respect to each other such that the horizontal and vertical scanning windows are substantially perpendicular. First and second laser scanning stations 150A and 150B are mounted within the system housing, and provide a laser scanning subsystem 150 for generating and projecting a complex groups of laser scanning planes through laser scanning windows 3A and 3B where the laser scanning planes intersect and produce an omni-directional laser scanning pattern within a 3D scanning volume 80 defined between the vertical and horizontal scanning windows 3A and 3B, and other figures. Details on the laser scanning stations or platforms 150A and 150B can be found in U.S. Pat. No. 7,422,156 incorporated herein by reference, as if set forth fully herein.

Figure 3A:
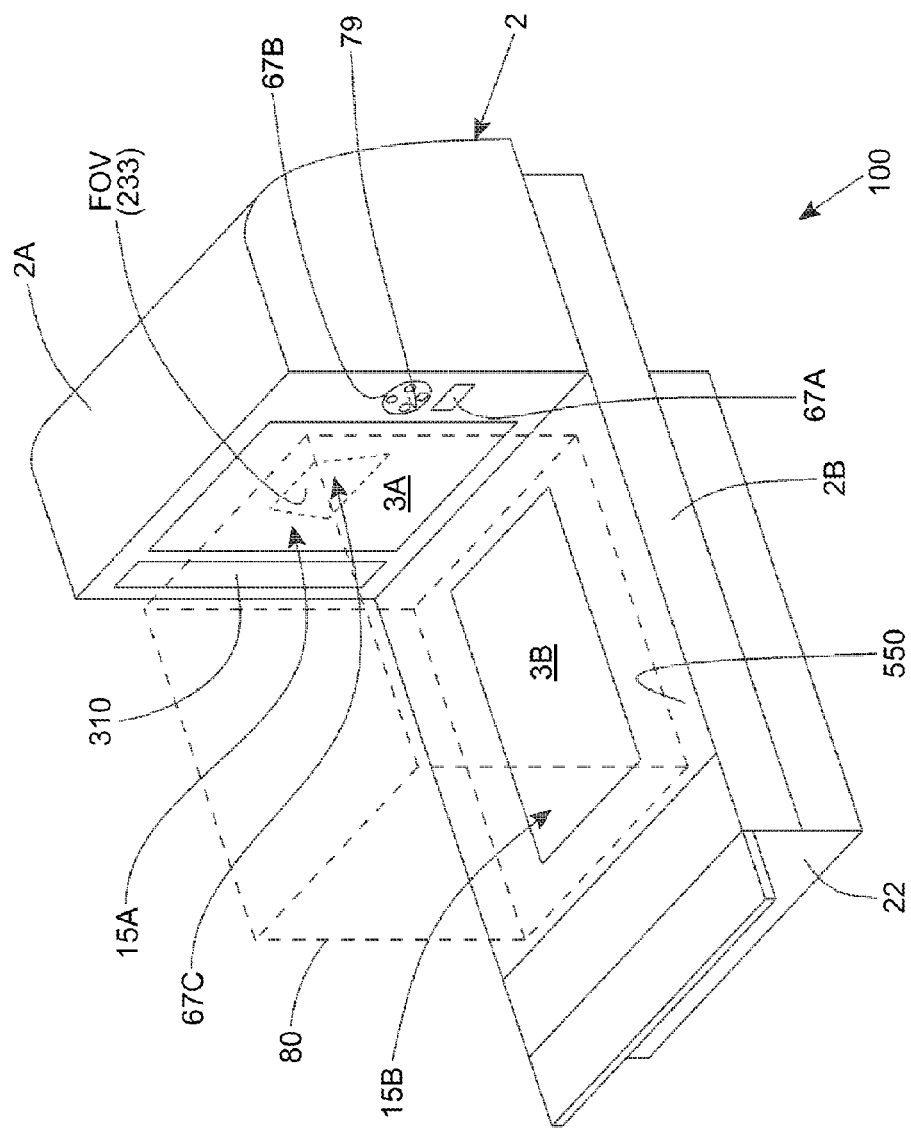
FIG. 3A is a first perspective view of a first illustrative embodiment of the hybrid-type bi-optical bar code symbol reading system for installation and use at a point of sale (POS) checkout station in a retail environment, and supporting a local predictive error event (PEE) database or data store according to the present disclosure.

As shown in FIGS. 3A and 3B, an IR-based proximity detector 67A is mounted in the front portion of the housing, below circular switch panel 79, for automatically detecting the presence of a human operator in front of the 3D scanning volume 80 during system operation. The shape of the IR detection window for the IR-based proximity detector 67A can be adapted to the space available on the housing. The function of the IR-based proximity detector 67A is to wake up the system (i.e. WAKE UP MODE), and set a SLEEP Timer (T1) which counts how long the system has to read a bar code symbol (e.g. 15 minutes) before the system is automatically induced into its SLEEP MODE, where the polygon scanning element and laser diodes are deactivated to conserve electrical power within the system. Preferably, the IR-based proximity (i.e. wake-up) detector 67A is realized using (i) an IR photo-transmitter for generating a high-frequency amplitude modulated IR beam, and (ii) a IR photo-receiver for receiving reflections of the amplitude modulated IR beam, using a synchronous detection circuitry, or combination thereof, well known in the art; or (iii) a photo-transistor which detects and responds to changes in reflected light intensity, in a programmed manner.

As shown in FIG. 3B, a digital camera mounting/installation portal 288 is formed in the upper housing section of the system housing, and has a geometry closely matching the geometry of the digital imaging module 210 that slides into the installation portal 288. As shown in FIGS. 5 and 6, the digital imaging module 210 has data and power/control interfaces 295 and 296 which are adapted to engage and establish electrical connections with matching data and power/control interfaces 287 and 286, respectively, mounted within the interior portion of the portal. It is understood that other methods of interfacing the digital imaging module are possible and will occur to those skilled in the art in view of the present disclosure.

As shown in FIG. 3C, installation portal 288 is formed within the vertical section of the housing, and includes a peep-type aperture 289 allowing the FOV and field of illumination (FOI) to project therethrough, and then directly through the vertical scanning window, into the 3D scanning volume 80. Preferably, the resulting field of view (FOV) will extend several inches into the 3D scanning volume 80 (e.g. 6 inches or more), with a depth of focus of at least a few inches (e.g. 2-3 inches) before the vertical scanning window 3A, but may extend substantially beyond the scanning window 3A as the application may require.

As shown in FIG. 3C, when the digital imaging module 210 is installed in its installation portal 288, the visible targeting beam 270 supported by the digital imaging module can be enabled by way of the data/power/control interface circuitry provided within the portal. At the same time, the automatic object detection subsystem 220 within the digital imaging module 210 can be enabled so that the digital imaging module automatically generates and projects its IR-based detection beam 232 through the vertical scanning window 3A, to automatically detect an object being presented to the vertical scanning window, and thus activate the digital imaging module 210 to capture and process digital images of the presented product, and any bar code symbols supported on the surface of the presented product. Alternatively, the object detection subsystem 220 can be disabled and the digital imaging module operated to continuously capture, buffer and process digital images at a rate 60 frames per second, in an enhanced continuous imaging presentation mode.

Figure 3D:
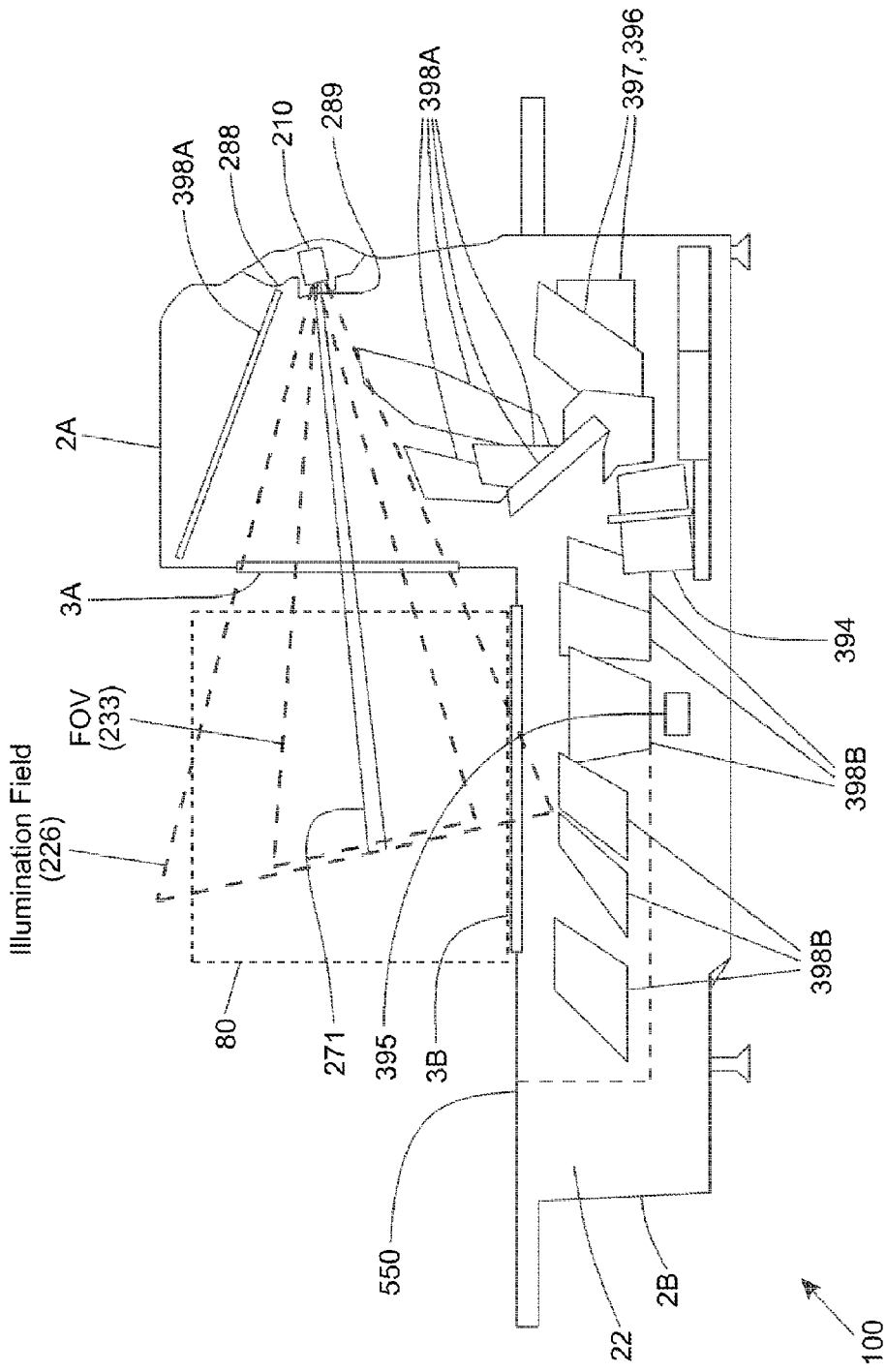
FIG. 3D is a second cross-sectional side view of the hybrid-type bi-optical bar code symbol reading system of FIGS. 3A and 3B, showing optical and electro-optical components of the digital imaging subsystem and the laser scanning subsystem containing within the system housing, and the FOV of the digital imaging system projecting through and spatially-overlapping with the field of view (FOV) of the laser scanning subsystem embedded within the vertical section of the system housing.

As shown in FIG. 3D, the hybrid-type bi-optical bar code symbol reading system has a rear housing portal into which the digital imaging module 210 is installed, and projects its FOV and illumination field through a peep-hole 289 formed in the housing structure, allowing the digital imaging module to be added as an optional feature or integrated with the system at the manufacturing plant.

As shown in FIG. 3D, during the hybrid scanning/imaging mode of operation, the FOV of the digital imaging module 210 spatially overlaps a portion of the 3D scanning volume 80 of the system. However, in alternative embodiments, the digital imaging FOV can completely spatially overlap the entire 3D scanning volume 80, or simply fill in a region of space between the vertical scanning window and the edge portion of the 3D scanning volume 80. This way, when the operator presents a bar coded product through the 3D scanning volume, towards the vertical scanning window, "sure-shot" bar code reading operation will be ensured even when reading the most-difficult-to-read bar code symbols.

In FIGS. 4A through 4C, the physical construction of an illustrative embodiment of the digital imaging module 210 is shown in great technical detail. As shown, the digital imaging module 210 comprises: a PC board 208, on which area-type image detection array (i.e. sensor) 235 (e.g. 5.0 megapixel 2D image sensor), LED arrays 223A and 223B, and image formation optics 234, are mounted, along with the circuitry specified in FIG. 7; a mounting framework 242 attached to the PC board 208 as shown; module housing 243 for containing the PC board 208 and mounting framework 242, and having a light transmission aperture 244 allowing the FOV of the image sensor 235 and the field of illumination (FOI) from LED arrays 223A, 223B project out of the module housing 243, and ultimately through the peep-hole aperture 289 formed in the installation portal 288, when the module 210 is installed therein, as shown in FIG. 5; and data and power/ control interfaces 287 and 286, respectively, mounted on PC board and extending through the module housing 243 so that matching interface connections can be established in the installation portal 288, when the module is installed therein.

Figure 7:
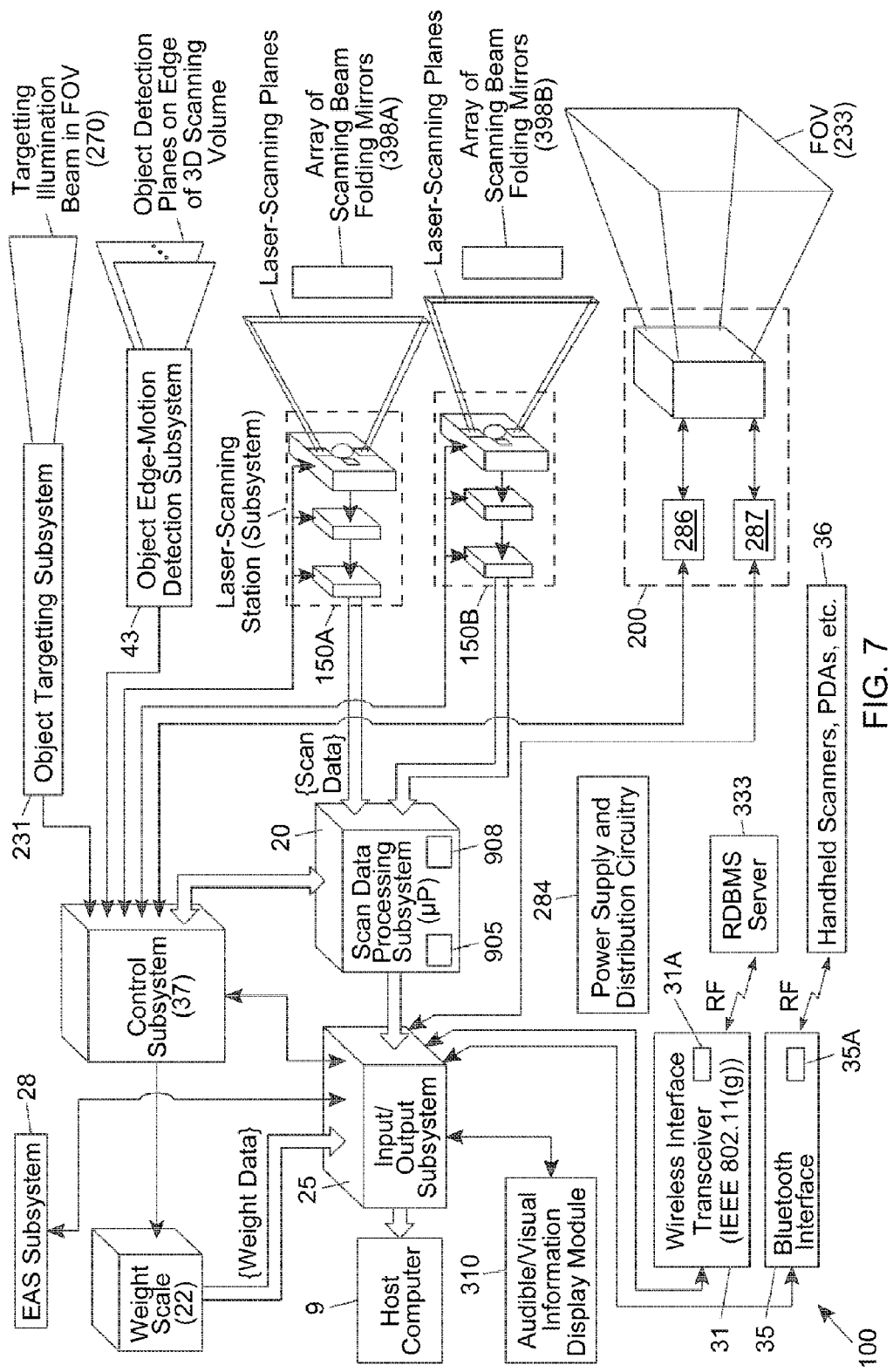
FIG. 7 is a block schematic representation of the hybrid scanning/imaging code symbol reading system of FIGS. 3A through 3D, wherein (i) a pair of laser scanning stations support automatic laser scanning of bar code symbols along a complex of scanning planes passing through the 3D scanning volume of the system, and (ii) a stand-alone digital imaging module, supported within the system housing, supports imaging-based reading of bar code symbols presented to the vertical scanning window of the system.

As shown in the system diagram of FIG. 7, hybrid scanning/imaging system 100 generally comprises: laser scanning stations 150A and 150B for generating and projecting groups of laser scanning planes through the vertical and horizontal scanning windows 3A and 3B, respectively, and generating scan data streams from scanning objects in the 3D scanning volume 80; a scan data processing subsystem 20 for supporting automatic scan data processing based bar code symbol reading using scan data streams generated from stations 150A and 150B; an input/output subsystem 25 for interfacing with the image processing subsystem 20, the electronic weight scale 22, RFID reader 26, credit-card reader 27, Electronic Article Surveillance (EAS) Subsystem 28 (including a Sensormatic® or Checkpoint® EAS tag deactivation block 29 integrated in the system, and an audible/visual information display subsystem (i.e. module) 310; a Bluetooth® RF 2-way communication interface 135 including RF transceivers and antennas 103A for connecting to Blue-Tooth® enabled handheld scanners, imagers, PDAs, portable computers 136 and the like, for control, management, application and diagnostic purposes; digital imaging module 210 specified in FIG. 6, and having data/power/control interface 294 provided on the exterior of the module housing, and interfacing and establishing electrical interconnections with data/power/control interface 285 when the digital imaging module 210 is installed in its installation portal 288 as shown in FIG. 2C; IR-based wake-up detector 67A, operably connected to the control subsystem 37, for generating and supplying a first trigger signal to the system controller in response to automatic detection of an operator in proximity (e.g. 1-2 feet) of the system housing; an IR-based object edge-motion detection subsystem 43 for producing IR-based planar object detection fields at the edge of the 3D scanning volume 100 of the system, for detecting the motion of objects entering and exiting the 3D scanning volume 100; an object targeting illumination subsystem 231, illustrated in FIG. 1B, for generating a narrow-area targeting illumination beam 270 into the FOV to help allow the user align bar code symbols within the active portion of the FOV where imaging occurs; a local PEE record database or data store 905 for storing PEE records generated during system operation; and a control subsystem 37 for controlling (i.e. orchestrating and managing) the operation of the laser scanning stations (i.e. subsystems 150A, 150B), the functions of the digital imaging module 210 when installed in the installation portal 288, other subsystems supported in the system. Notably, the local database or data store 905 can be realized in various ways including a simple memory storage device such as EPROM, or using more complex data storage techniques such as a relational database management system (RDBMS) where the application requires or permits.

In the illustrative embodiments disclosed herein, each laser scanning station 150A, 150B is constructed from a rotating polygon 394, one or more laser diode sources 395, light collection optics 396, one or more photodiodes 397, and arrays of beam/FOV folding mirrors 398A and 398B installed in the horizontal and vertical housing sections, respectively, as shown in FIG. 3D, and as generally disclosed, for example, in U.S. Pat. No. 7,422,156, incorporated herein by reference.

In FIG. 7, the bar code symbol reading module employed along each channel of the scan data processing subsystem 20 can be realized using conventional bar code reading techniques, including bar code symbol stitching-based decoding techniques, well known in the art.

Figure 8:
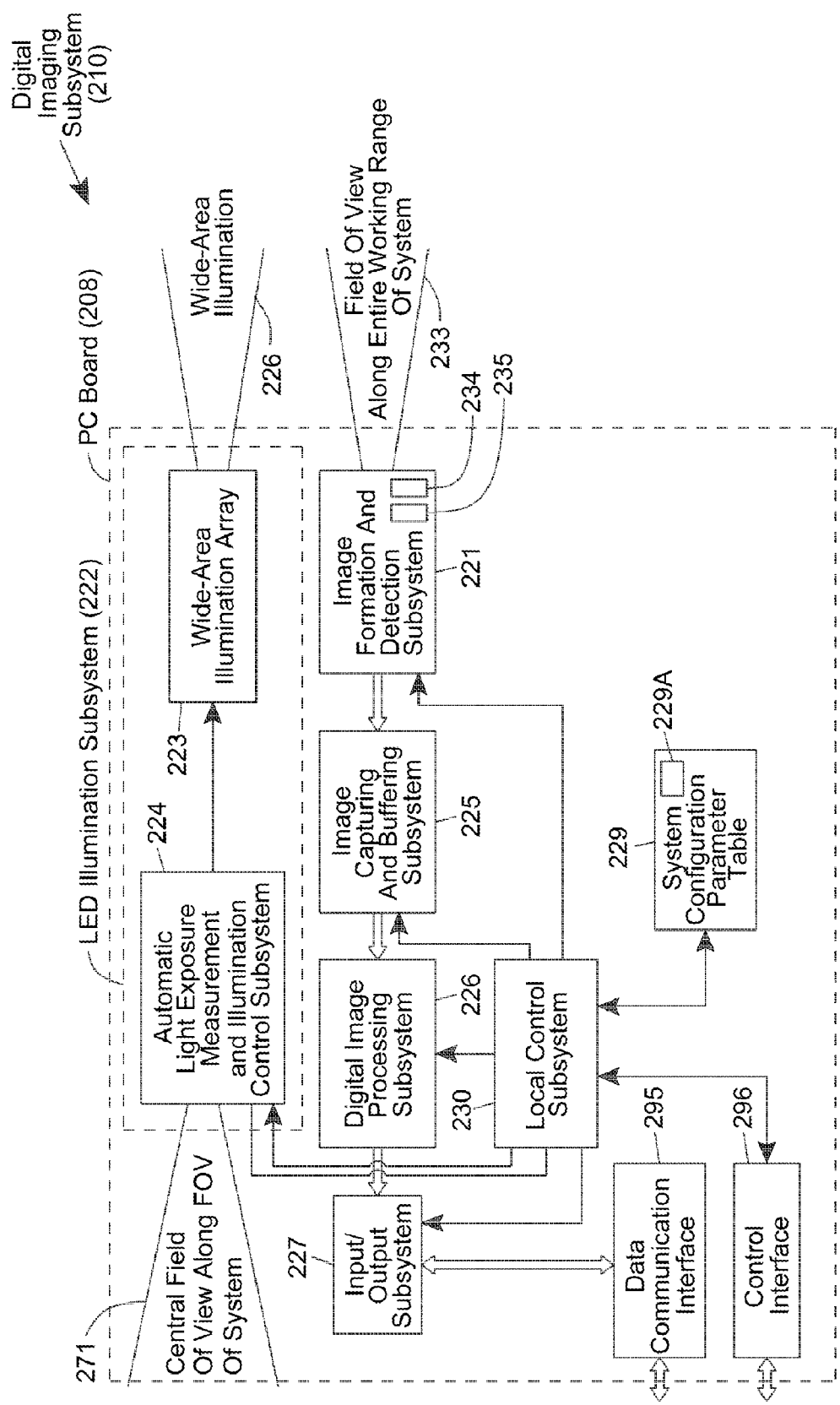
FIG. 8 is a block schematic representation of the digital imaging module supported within the hybrid scanning/imaging code symbol reading system of FIGS. 3 through 7.

As shown in FIG. 8, the digital imaging module or subsystem 210 employed in the illustrative embodiment of the hybrid scanning/imaging system 100 is realized as a complete stand-alone digital imager, comprising a number of components, namely: an image formation and detection (i.e. camera) subsystem 221 having image formation (camera) optics 234 for producing a field of view (FOV) upon an object to be imaged and a CMOS or like area-type image detection array 235 for detecting imaged light reflected off the object during illumination operations in an image capture mode in which at least a plurality of rows of pixels on the image detection array are enabled; a LED-based illumination subsystem 222 employing an LED illumination array 232 for producing a field of narrow-band wide-area illumination 226 within the entire FOV 233 of the image formation and detection subsystem 221, which is reflected from the illuminated object and transmitted through a narrow-band transmission-type optical filter and detected by the image detection array 235, while all other components of ambient light are substantially rejected; an automatic light exposure measurement and illumination control subsystem 224 for controlling the operation of the LED-based illumination subsystem 222; an image capturing and buffering subsystem 225 for capturing and buffering 2-D images detected by the image formation and detection subsystem 221; a digital image processing subsystem 226 for processing 2D digital images captured and buffered by the image capturing and buffering subsystem 225 and reading 1D and/or 2D bar code symbols represented therein; an input/output subsystem 527 for outputting processed image data and the like to an external host system or other information receiving or responding device; a system memory 229 for storing data implementing a configuration table 229A of system configuration parameters (SCPs); data/power/control interface 294 including a data communication interface 295, a control interface 296, and an electrical power interface 297 operably connected to an on-board battery power supply and power distribution circuitry 293; a Bluetooth communication interface, interfaced with I/O subsystem 227; and a system control subsystem 230 integrated with the subsystems above, for controlling and/or coordinating these subsystems during system operation.

In addition, the hybrid system 100 also includes: an object targeting illumination subsystem 231 for generating a narrow-area targeting illumination beam 270 into the FOV, to help allow the user align bar code symbols within the active portion of the FOV where imaging occurs; and also an object detection subsystem 43 for automatically producing an object detection field within the FOV 233 of the image formation and detection subsystem 221, to detect the presence of an object within predetermined edge regions of the object detection field, and generate control signals that are supplied to the system control subsystem 230 to indicate when an object is detected within the object detection field of the system.

In order to implement the object targeting subsystem 231, a pair of visible LEDs can be arranged on opposite sides of the FOV optics 234, in the digital imaging module 210, to generate a linear visible targeting beam that is projected off a FOV folding and out the imaging window 203, as shown and described in detail in US Publication No. US20080314985 A1, incorporated herein by reference in its entirety.

Also, the object motion detection subsystem 43 can be implemented using a plurality of pairs of IR LED and IR photodiodes, mounted within the system housing 2A and 2B, as disclosed in co-pending U.S. patent application Ser. No. 13/160,873, incorporated herein by reference, to automatically generate parallel planes of IR light to detect the presence of objects entering and leaving the 3D scanning volume 80 and passing through the FOV 233 of the system.

The primary function of the image formation and detection subsystem 221 which includes image formation (camera) optics 234 is to provide a field of view (FOV) 233 upon an object to be imaged and a CMOS area-type image detection array 235 for detecting imaged light reflected off the object during illumination and image acquisition/capture operations.

The primary function of the LED-based illumination subsystem 222 is to produce a wide-area illumination field 36 from the LED array 223 when an object is automatically detected within the FOV. Notably, the field of illumination has a narrow optical-bandwidth and is spatially confined within the FOV of the image formation and detection subsystem 521 during modes of illumination and imaging, respectively. This arrangement is designed to ensure that only narrow-band illumination transmitted from the illumination subsystem 222, and reflected from the illuminated object, is ultimately transmitted through a narrow-band transmission-type optical filter subsystem (not shown) within the system and reaches the CMOS area-type image detection array 235 for detection and processing, whereas all other components of ambient light collected by the light collection optics are substantially rejected at the image detection array 535, thereby providing improved SNR, thus improving the performance of the system. The narrow-band transmission-type optical filter subsystem can be realized by (i) a high-pass (i.e. red-wavelength reflecting) filter element embodied within at the imaging window 203, and (2) a low-pass filter element mounted either before the CMOS area-type image detection array 235 or anywhere after beyond the high-pass filter element, including being realized as a dichroic mirror film supported on at least one of the FOV folding mirrors employed in the module.

The automatic light exposure measurement and illumination control subsystem 224 performs two primary functions: (i) to measure, in real-time, the power density [joules/cm] of photonic energy (i.e. light) collected by the optics of the system at about its image detection array 235, and to generate auto-exposure control signals indicating the amount of exposure required for good image formation and detection; and (2) in combination with the illumination array selection control signal provided by the system control subsystem 230, to automatically drive and control the output power of the LED array 223 in the illumination subsystem 222, so that objects within the FOV of the system are optimally exposed to LED-based illumination and optimal images are formed and detected at the image detection array 235.

The primary function of the image capturing and buffering subsystem 225 is (i) to detect the entire 2-D image focused onto the 2D image detection array 235 by the image formation optics 234 of the system, (2) to generate a frame of digital pixel data for either a selected region of interest of the captured image frame, or for the entire detected image, and then (3) buffer each frame of image data as it is captured. Notably, in the illustrative embodiment, the system has both single-shot and video modes of imaging. In the single shot mode, a single 2D image frame (31) is captured during each image capture and processing cycle, or during a particular stage of a processing cycle. In the video mode of imaging, the system continuously captures frames of digital images of objects in the FOV. These modes are specified in further detail in US Patent Publication No. 2008/0314985 A1, incorporated herein by reference in its entirety.

The primary function of the digital image processing subsystem 226 is to process digital images that have been captured and buffered by the image capturing and buffering subsystem 225, during modes of illumination and operation. Such image processing operations include image-based bar code decoding methods as described in U.S. Pat. No. 7,128,266, incorporated herein by reference.

The primary function of the input/output subsystem 227 is to support universal, standard and/or proprietary data communication interfaces with host system 9 and other external devices, and output processed image data and the like to host system 9 and/or devices, by way of such communication interfaces. Examples of such interfaces, and technology for implementing the same, are given in U.S. Pat. No. 6,619,549, incorporated herein by reference.

The primary function of the system control subsystem 230 is to provide some predetermined degree of control, coordination and/or management signaling services to each subsystem component integrated within the system, when operated in its digital imaging mode of operation shown in FIG. 2D. Also, in the illustrative embodiment, when digital imaging module 210 is installed in portal 288, and interfaced with data/power/control interface 285, system control subsystem 230 functions as a slave controller under the control of master control subsystem 37. While this subsystem can be implemented by a programmed microprocessor, in the preferred embodiments of the present disclosure, this subsystem is implemented by the three-tier software architecture supported on micro-computing platform, described in U.S. Pat. No. 7,128,266, incorporated herein by reference.

The primary function of the system configuration parameter (SCP) table 229A in system memory is to store (in non-volatile/persistent memory) a set of system configuration and control parameters (i.e. SCPs) for each of the available features and functionalities, and programmable modes of supported system operation, and which can be automatically read and used by the system control subsystem 230 as required during its complex operations. Notably, such SCPs can be dynamically managed as taught in great detail in co-pending US Publication No. 2008/0314985 A1, incorporated herein by reference.

Figure 9A:
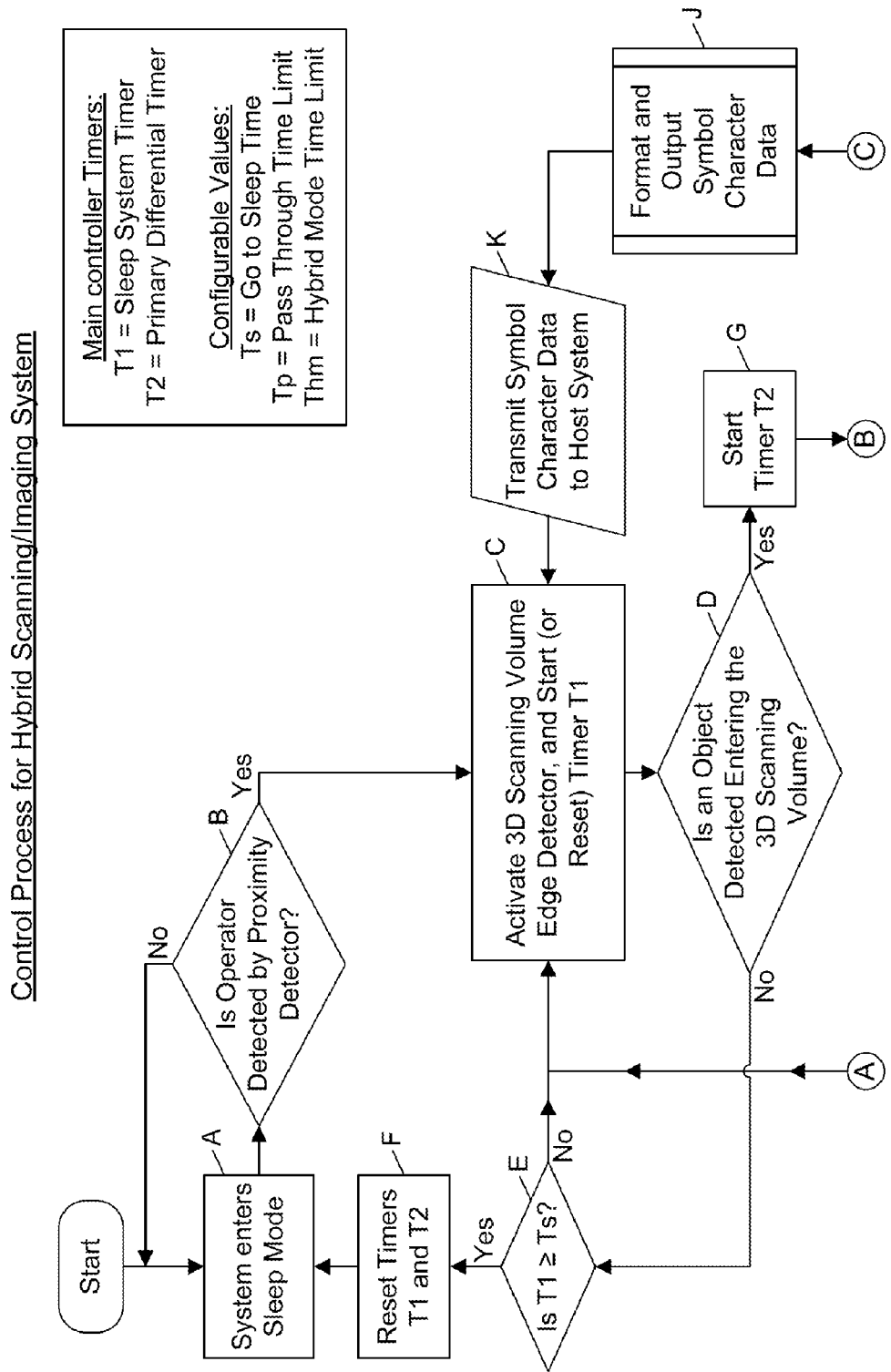
FIGS. 9A and 9B, taken together, set forth a flow chart describing the control process supported by the system controller within the hybrid scanning/imaging code symbol reading system of the illustrative embodiment shown in FIGS. 3 through 8, during its hybrid scanning/imaging mode of operation.
Figure 9B:
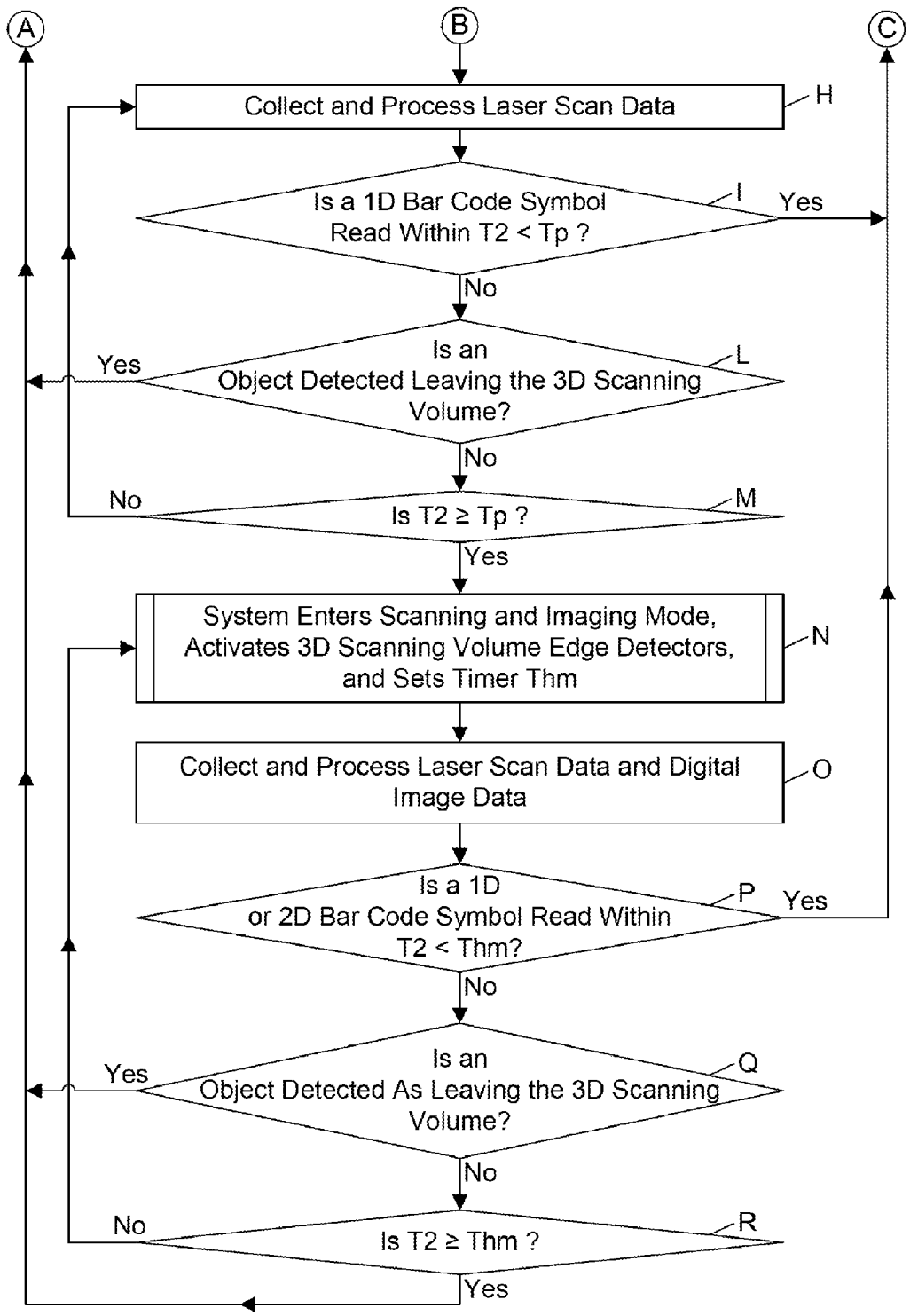

The Control Process Supported Within the Bi-Optical Hybrid Scanning/Imaging Code Symbol Reading System FIGS. 9A and 9B describes an illustrative embodiment of the control process supported by the system controller within the bi-optical hybrid scanning/imaging code symbol reading system 100 during its hybrid scanning/imaging mode of operation.

As indicated at Block A in FIG. 9A, the system is initialized (i.e. parameters are reset, and the system is in SLEEP mode).

At the START Block in FIG. 9A, the system is initialized and programmable/configurable parameters or variables are reset, and at Block A, the system enters its SLEEP mode.

At Block B, the system controller determines whether or not the operator is detected by proximity detector 44D. If not, then the system controller returns to Block A, and if an operator is detected, then the system proceeds to Block C and activates the 3D scanning volume edge detector (i.e. object edge-motion detection subsystem 43), and starts (or resets) Timer T1.

At Block D, the system controller determines whether or not an object is detected entering the 3D Scanning Volume, and if not, the proceeds to Block E, and determines if Timer T1>Ts. If so, then at Block F, the system controller resets Timers T1 and T2. If not, then the system controller returns to Block C.

If at Block G, an object is detected as entering the 3D scanning volume, the system controller starts Timer T2, and at Block H, collects and processes laser scan data in effort to read a 1D bar code symbol.

At Block I, the system controller determines whether or not a 1D bar code symbol is read within T2<Tp. In the event that a 1D bar code symbol has been read, then at Block J the symbol character data is formatted and at Block K is transmitted to the host system 9, and then the system returns to Block C, as indicated in FIG. 9A.

If at Block I, a 1D bar code symbol is not decoded within T2<Tp, then the system controller determines whether or not an object is detected as leaving the 3D scanning volume at Block L, and if so, then returns to Block C, as indicated in FIGS. 9A and 9B.

If an object is not detected leaving the 3D scanning volume at Block L, then the system controller determines at Block M whether or not T2> or =Tp.

If the condition T2> or =Tp is not met at Block M, then the system controller returns to Block H and continues to collect and process laser scan data in effort to read a 1D bar code symbol. However, it this timer condition is met at Block M, then the system controller advances to Block N and the system enters the scanning and imaging mode, activates the 3D scanning volume edge detectors, and sets Timer Thm.

Then at Block O, the system controller collects and processes laser scan data and digital image data so as to read 1D and/or 2D bar code symbols.

At Block P, the system controller determines whether or not a 1D or 2D bar code symbol is read within T2<Thm, and if so, then the system controller proceeds to Block C. In the event that no 1D or 2D bar code symbol is read within T2<Thm, then the system controller proceeds to Block Q and determines whether or not an object is detected as leaving the 3D scanning volume.

In the event that an object is detected leaving the 3D scanning volume at Block Q, then the system controller returns to Block C indicated in FIGS. 9A and 9B. In the event that an object is not detected leaving the 3D scanning volume at Block Q, then the system controller advances to Block R. At Block R, the system controller determines whether or not T2>Thm, and if not, then returns to Block H, as shown in FIG. 9B. However, in the event that T2>Thm, then the system controller returns to Block C, as indicated in FIGS. 9A and 9B.

Specification of the Bi-Optical Multiple-Channel Laser Scanning Bar Code Symbol Reading System Employing a Locally Maintained Predictive Error Event (PEE) Database or Data Store Referring to FIGS. 7, 10 through 12B, an alternative embodiment of a multiple-channel bar code symbol reading system is disclosed. Specifically in FIG. 10, a bi-optical multi-channel laser scanning bar code symbol reading system is shown supporting a local predictive error event (PEE) database or data store 905 similar to that described hereinabove.

Unlike the hybrid system 100 described above, the laser-scanning bar code symbol reading system 400 only supports a laser scanning mode of operation. However, this system has multiple scan data capturing and processing channels which can capture and process scan data signals nearly simultaneously generated during bar code symbol scanning operations.

Figure 10:
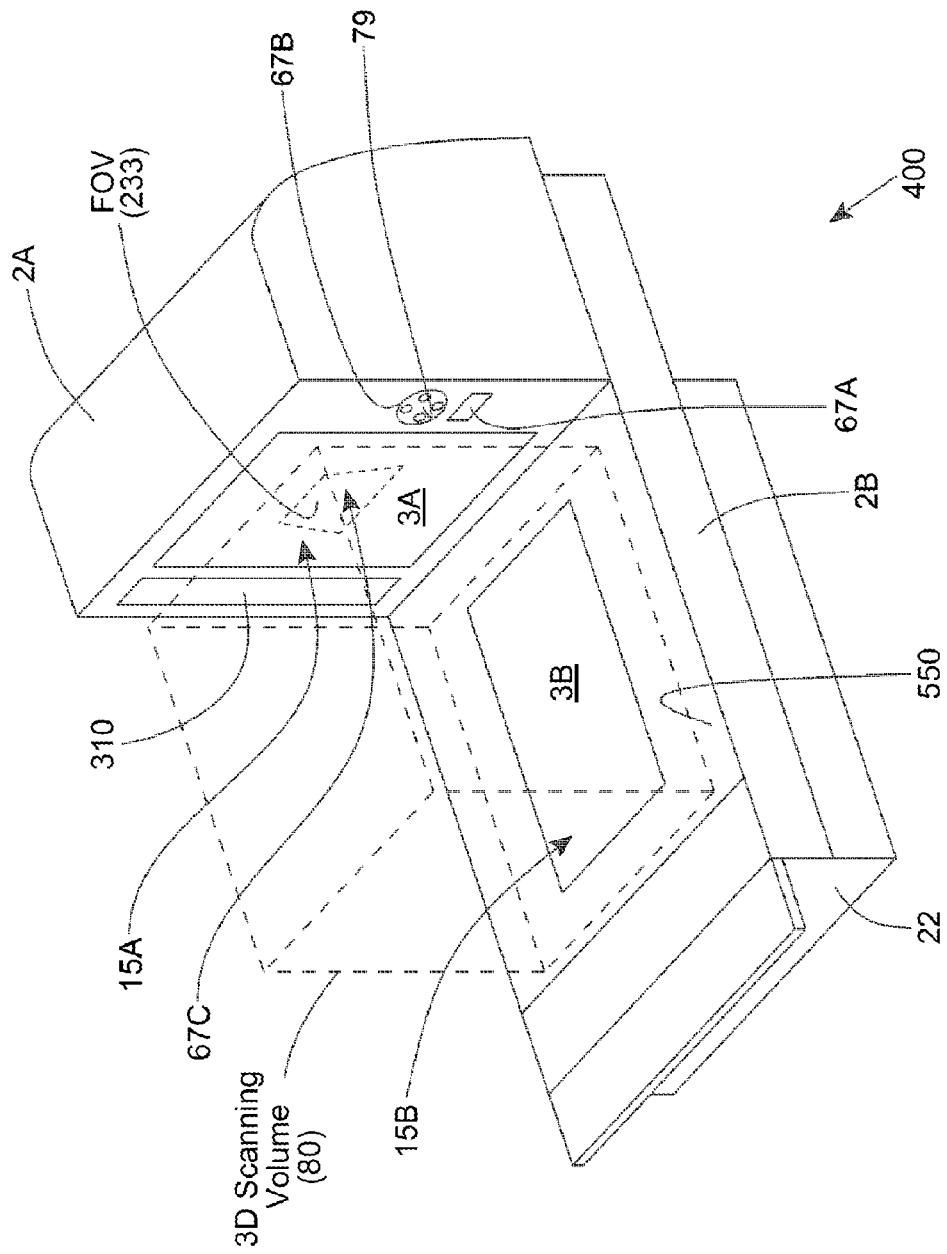
FIG. 10 is a perspective view of a bi-optical multi-channel laser scanning bar code symbol reading system supporting a local predictive error event (PEE) database or data store.

As shown in FIG. 10, the laser scanning code symbol reading system 400 includes a system housing 2 having a vertical housing section 2A having a vertical optically transparent (glass) scanning window 3A, and a horizontal housing section 2B having a horizontal optically transparent (glass) scanning window 3B. As shown, the horizontal and vertical sections 2A and 2B are arranged in an orthogonal relationship with respect to each other such that the horizontal and vertical scanning windows are substantially perpendicular. First and second laser scanning stations 150A and 150B are mounted within the system housing, and provide a resultant laser scanning subsystem 150 for generating and projecting a complex group of laser scanning planes through laser scanning windows 3A and 3B where the laser scanning planes intersect and produce an omni-directional laser scanning pattern within a 3D scanning volume 80 defined between scanning windows 3A and 3B, as shown in FIG. 10.

Ways of and Means for Waking-Up System Out of its Power-Conserving Mode of Operation In the illustrative embodiment 100 and 40 shown in FIGS. 3A and 10, respectively, the system 100 is provided with several different ways of, and means for, waking-up the system from its power-conserving sleep mode of operation, namely: (i) via triggering an IR wake-up sensor 67A (ii) via triggering a manually-triggered wake-up switch 67B; and (iii) a triggering a digital imaging based wake-up sensor 67C implemented using the digital imaging subsystem 210 of the system.

As shown in FIGS. 3A and 10, the IR-based proximity detector 67A is mounted in the vertical section under the circular push button assembly 79 for automatically detecting the presence of a human operator in front of the 3D scanning volume 80 region during system operation. Also, the manually-triggered button-type wake-up switch 67B implemented by switch assembly 79 is mounted on the system housing for each access by the cashier or POS operator, so that the cashier or operator easily depress and wake-up the system from its power-conserving sleep-mode of operation. The function of the IR-based proximity detector 67A, as well as wake-up switch 67B, is to wake up the system (i.e. WAKE UP MODE), and set a SLEEP Timer (T1) which counts how long the system has to read a bar code symbol (e.g. 15 minutes) before the system is automatically induced into its SLEEP MODE, during which time the polygon scanning element 394 and laser diodes 395A, 395B, 395C and 395D, as well as other non-essential circuits, are deactivated to conserve electrical power within the system.

Preferably, the IR-based proximity (i.e. wake-up) detector 67A is realized using (i) an IR photo-transmitter for generating a high-frequency amplitude modulated IR beam, and (ii) a IR photo-receiver for receiving reflections of the amplitude modulated IR beam, or (iii) a photo transistor detecting light interference, using a synchronous detection circuitry, well known in the art. However, the IR or photo-transistor based wake-up sensor 67A may be realized using other object-sensing technology known in the art.

To implement the digital imaging based wake-up sensor 67C, the digital imaging module 210 in system 100 can be configured to capture and process images of FOV continuously or periodically in search of a change in the FOV indicative of an operator's hand or body requesting the system to wake-up from its power-conserving mode of operation, into its operational model, where the laser scanning subsystems are operating and ready to laser scan objects transported through the 3D scanning volume and/or the digital imaging subsystem is operating and reading to capture and process images of objects transported through the FOV, in effort to read bar code symbols thereon.

Figure 11:
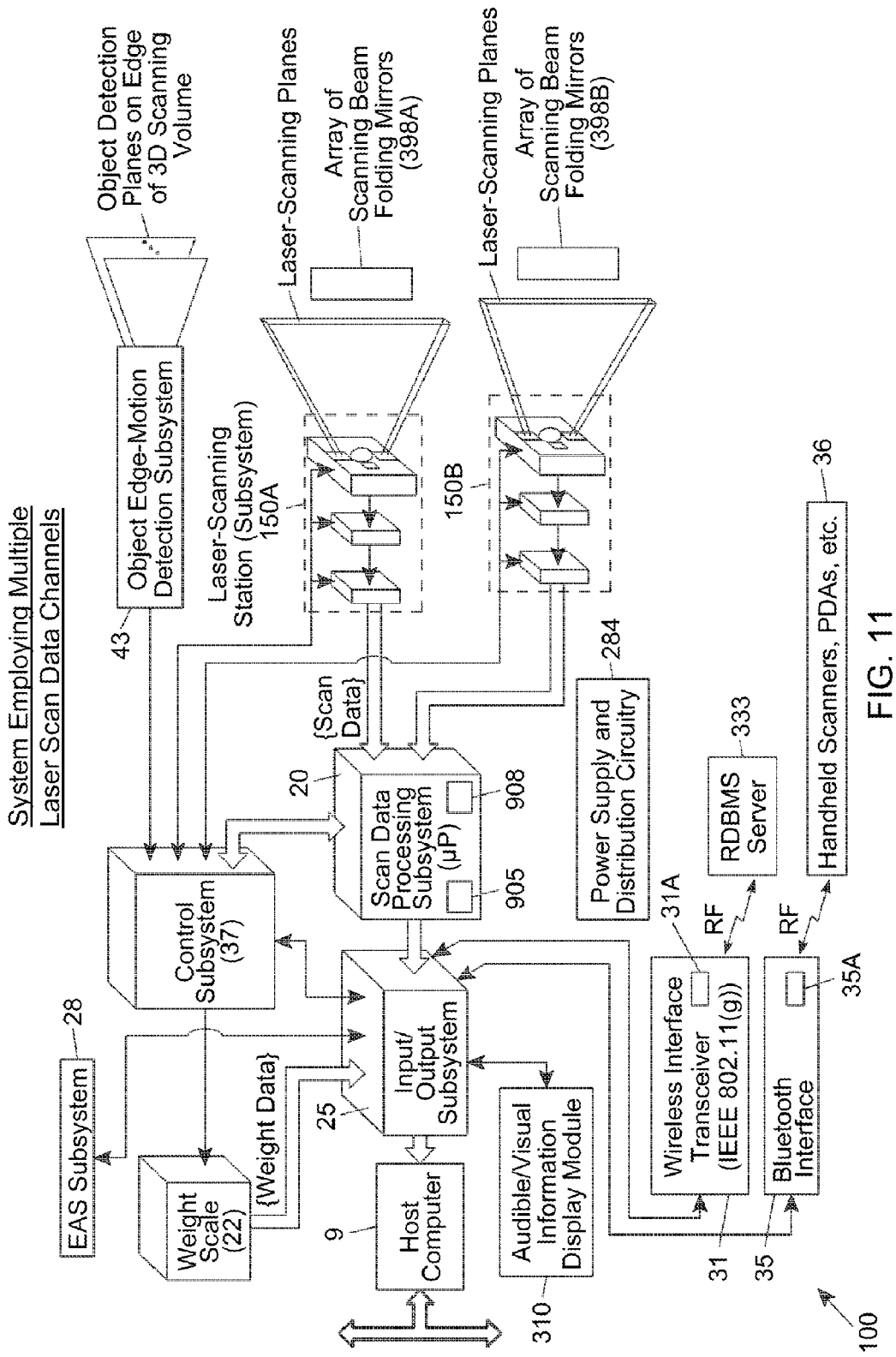
FIG. 11 is a block schematic system diagram of the bi-optical multi-channel laser scanning bar code symbol reading system shown in FIG. 10.

As shown in the system diagram of FIGS. 7 and 11, the scanning system 100 and 400, respectively, generally comprises: laser scanning stations 150A and 150B for generating and projecting groups of laser scanning planes through the vertical and horizontal scanning windows 3A and 3B, respectively, and generating scan data streams from scanning objects in the 3D scanning volume 80; a scan data processing subsystem 20 for supporting automatic scan data processing based bar code symbol reading using the scan data streams generated from laser scanning stations 150A and 150B; an input/output subsystem 25 for interfacing with the image processing subsystem 20, the electronic weight scale 22, RFID reader 26, credit-card reader 27, Electronic Article Surveillance (EAS) Subsystem 28 (including a Sensormatic® or Checkpoint® EAS tag deactivation block 29 integrated in system, and an audible/visual information display subsystem (i.e. module) 310; a Bluetooth® RF 2-way communication interface 135 including RF transceivers and antennas 103A for connecting to Blue-tooth® enabled handheld scanners, imagers, PDAs, portable computers 136 and the like, for control, management, application and diagnostic purposes; IR-based wake-up detector 67A, operably connected to the control subsystem 37, for generating and supplying a first trigger signal to the system controller in response to automatic detection of an operator in proximity (e.g. 1-2 feet) of the system housing; and automatic object edge-motion detection subsystem 44 for detecting the motion of objects entering and exiting the 3D scanning volume 100; an IR-based object edge-motion detection subsystem 43 for producing IR-based planar object detection fields at the edge of the 3D scanning volume 100 of the system, as shown in FIGS. 1A and 4; a local Predictive Error Event (PEE) database or data store 905 for storing predictive error events as determined by the POS information server 970, and further supporting a bar code symbol reading process on the retail information network 1, as described in FIGS. 16A through 23B; a software-implemented bar code symbol arbitration module 908 for selecting the best bar code symbol among multiple bar code symbols presented along multiple data-channels during any given predetermined time window of operation; and a control subsystem 37 for controlling (i.e. orchestrating and managing) the operation of the laser scanning stations (i.e. subsystems 150A, 150B), and other subsystems supported in the system. Notably, the local database or data store 905 can be realized in various ways including a simple memory storage device such as EPROM, or using more complex data storage techniques such as a relational database management system (RDBMS) where the application requires or permits.

In the illustrative embodiment disclosed herein, each laser scanning station 150A, 150B is constructed from a single, common rotating polygon 394, having multiple sides and mounted at the junction between the vertical and horizontal housing sections 2A, 2B, and driven by a high-speed brushless DC motor, and associated drive and sensing circuitry, as shown in FIG. 3D. However, scanning stations can be constructed with separate rotating polygons, in a conventional manner. The rotating polygon 394 can be regular by ensuring that the interior angles between adjacent sides of the polygon element are substantially equal. Alternatively, the rotating polygon 394 can be irregular by ensuring that the interior angles between adjacent sides of the polygon element are not equal in size, and in fact, are substantially different so as to generate a raster scanning pattern having a highly non-uniform scan density.

In the illustrative embodiment, laser scanning subsystem 150A comprises: a pair of visible laser diode sources (e.g. VLDs) 395A and 395B mounted off center to the central axis 399 of the system, for generating a first laser scanning raster pattern 410; light collection optics 396B and a pair of photodiodes 397A and 397B mounted so as to collect and detect incoming light rays produced by VLDs 395A and 395B, and generate corresponding analog electrical scan data signals for scan data and decode processing by scan data processing subsystem 20 shown in FIG. 11; and array of laser scanning pattern folding mirrors 398A installed in the horizontal housing sections, as shown in FIG. 3D, for folding the raster scanning pattern 410, and projecting a folded scanning pattern out the horizontal scanning window 3A and into the 3D scanning volume.

Also, laser scanning subsystem 150B comprises: a pair of visible laser diode sources (e.g. VLDs) 395C and 395D mounted off center to the central axis 399 of the system, for generating a second laser scanning raster pattern 420; light collection optics 396B and a pair of photodiodes 397C and 397D mounted so collect and detect incoming light rays produced by VLDs 395C and 395D, and generate corresponding analog electrical scan data signals for scan data and decode processing by scan data processing subsystem 20 shown in FIG. 11; and array of laser scanning pattern folding mirrors 398B installed in the horizontal housing sections, as shown in FIG. 3D, for folding the second raster scanning pattern 420 and projecting the folded scanning pattern through the vertical scanning window 3B, and out into the 3D scanning volume.

As the illustrative embodiment of in FIG. 10, laser beams from the VLDs in the first scanning subsystem 150A are positioned on a first side of the scanning polygon 394, and laser beams 395C and 395D are positioned on the opposing side of the scanning polygon 394, mounted at the junction of the vertical and horizontal housing sections 2A, 2B. With this bi-optical laser scanning arrangement, during each complete revolution of the scanning polygon 394, two completely separate laser scanning raster patterns with 180 degrees of scan coverage are simultaneously generated in the vertical and horizontal housing sections, respectively, and projected/folded off laser scanning pattern folding mirror arrays 398A and 398B, respectively, and out the vertical and horizontal scanning windows 3A and 3B, respectively, and into the 3D scanning volume 80.

Figure 12A:
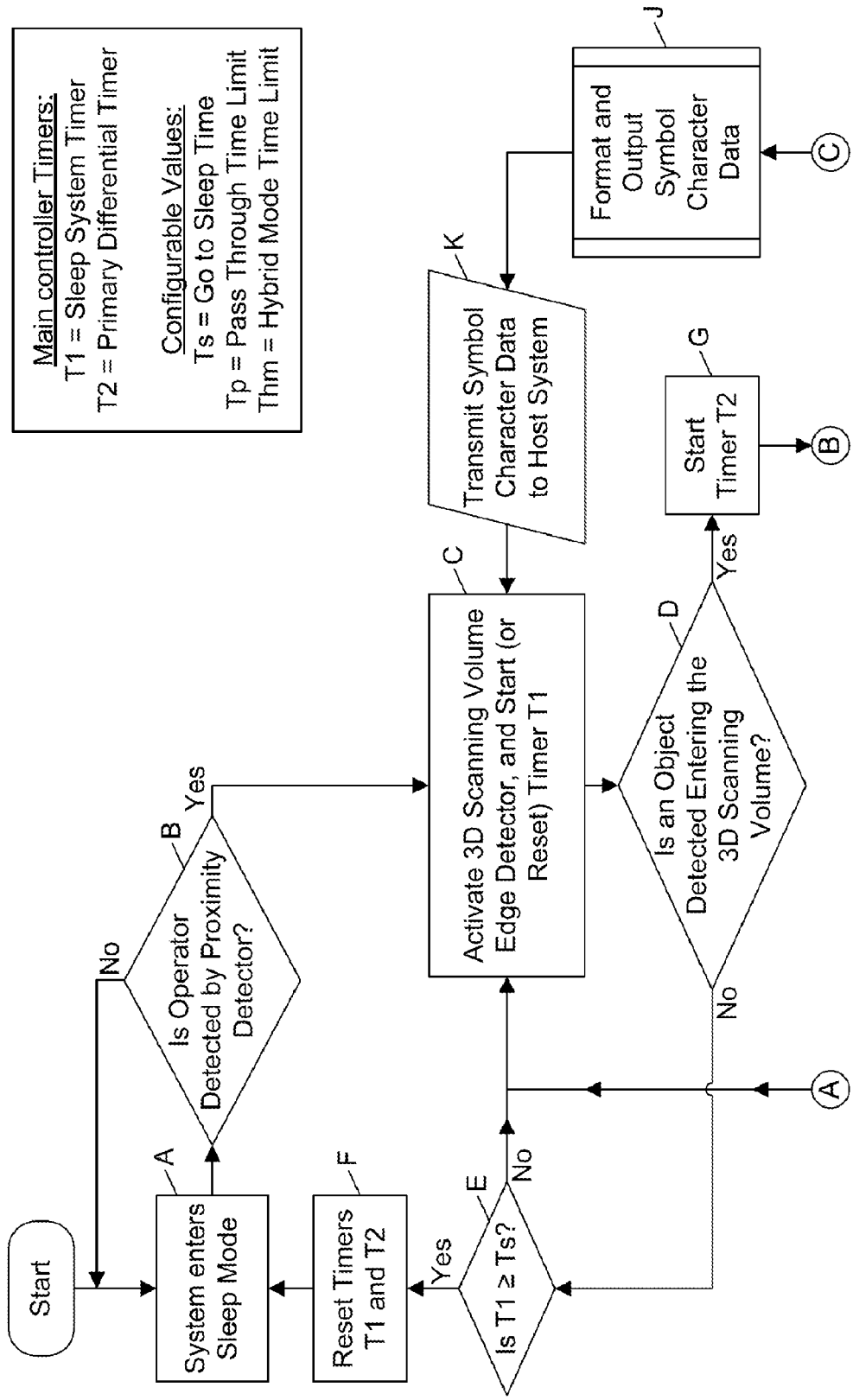
FIGS. 12A and 12B, taken together, provide a flow chart describing the primary steps carried out within the system of FIG. 10 when reading bar code symbols presented within its scanning field.
Figure 12B:
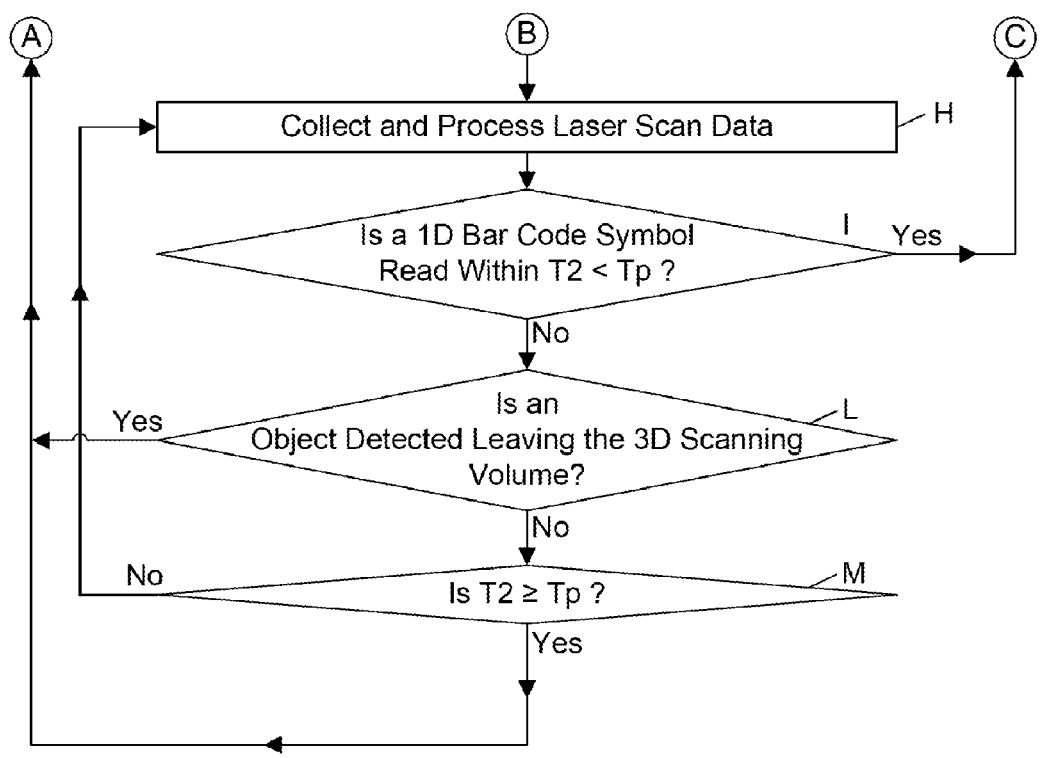

The Control Process Supported within the Bi-Optical Laser Scanning Bar Code Symbol Reading System FIGS. 12A and 12B describe the control process supported by the system controller within the bi-optical hybrid scanning/imaging code symbol reading system of the first illustrative embodiment.

At the START Block in FIG. 12A, the system is initialized and programmable/configurable parameters or variables are reset, and at Block A, the system enters its SLEEP mode.

At Block B, the system controller determines whether or not the operator is detected by proximity detector 67A. If not, then the system controller returns to Block A, and if an operator is detected, then the system proceeds to Block C and activates the 3D scanning volume edge detector (i.e. object edge-motion detection subsystem 43), and starts (or resets) Timer T1.

At Block D, the system controller determines whether or not an object is detected entering the 3D Scanning Volume, and if not, the proceeds to Block E, and determines if Timer T1>Ts. If so, then at Block F, the system controller resets Timers T1 and T2. If not, then the system controller returns to Block C.

If at Block G, an object is detected as entering the 3D scanning volume, then the system controller starts Timer T2, and at Block H, collects and processes the multiple channels of laser scan data in effort to read a 1D bar code symbol.

At Block I, the system controller determines whether or not a 1D bar code symbol is read within T2<Tp. In the event that a 1D bar code symbol has been read, then at Block J the symbol character data is formatted and at Block K is transmitted to the host system 9, and then the system returns to Block C, as indicated in FIG. 12A.

If at Block I, a 1D bar code symbol is not decoded within T2<Tp, then the system controller determines whether or not an object is detected as leaving the 3D scanning volume, and if so, then returns to Block C, as indicated in FIGS. 12A and 12B.

If an object is not detected leaving the 3D scanning volume at Block L, then the system controller determines at Block M whether or not T2> or =Tp.

If the condition T2> or =Tp is not met at Block M, then the system controller returns to Block H and continues to collect and process laser scan data in effort to read a 1D bar code symbol. However, it this timer condition is met at Block M, then the system controller returns to Block C.

Specification of a Digital Imaging Bar Code Symbol Reading System Employing a Locally Maintained Predictive Error Event (PEE) Database or Data Store Referring now to FIGS. 13 through 14, a digital imaging bar code symbol reading system 600 will be described in detail, supporting a local Predictive Error Event (PEE) database 905 for use in the retail information network shown in FIG. 1.

Figure 13:
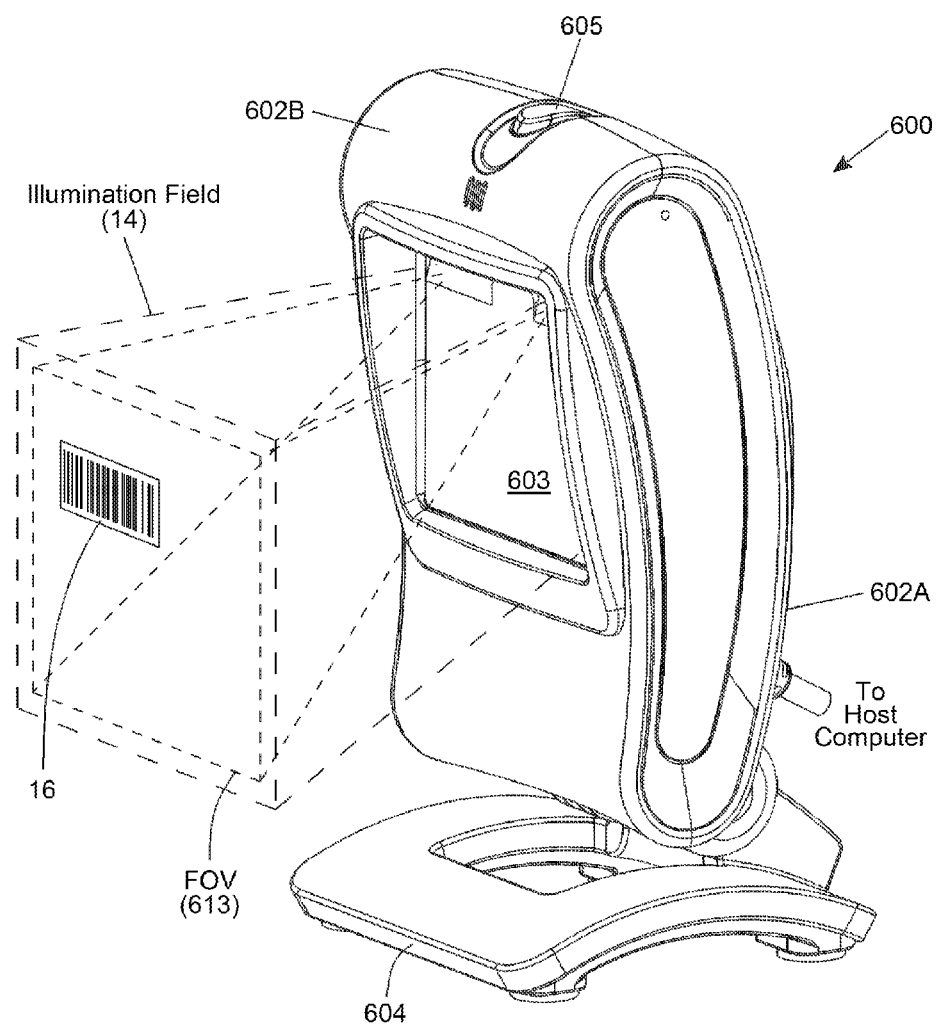
FIG. 13 is a perspective view of a single-channel digital imaging bar code symbol reading system supporting a local predictive error event (PEE) database or data store.

As shown in FIG. 13, the digital-imaging bar code symbol reading system 600 comprises: a hand-supportable housing 602 having (i) a front housing portion 602B with a window aperture 606 and an imaging window panel 603 installed therein; and (ii) a rear housing portion 602A. Typically, a single PC board based optical bench (having optical subassemblies mounted thereon) is supported between the front and rear housing portions 602A and 603B of the housing which, when brought together, form an assembled unit. A base portion 604 is connected to the assembled unit by way of a pivot axle structure that passes through the bottom portion of the imager housing and the base portion so that the hand-supportable housing and base portion are able to rotate relative to each other. The host/imager interface cable passes through a port formed in the rear of the rear housing portion, and interfaces with connectors mounted on the PC board, and establishes an electrical/communication interface with the cash register (host) computer system 930 to which it is connected.

Figure 14:
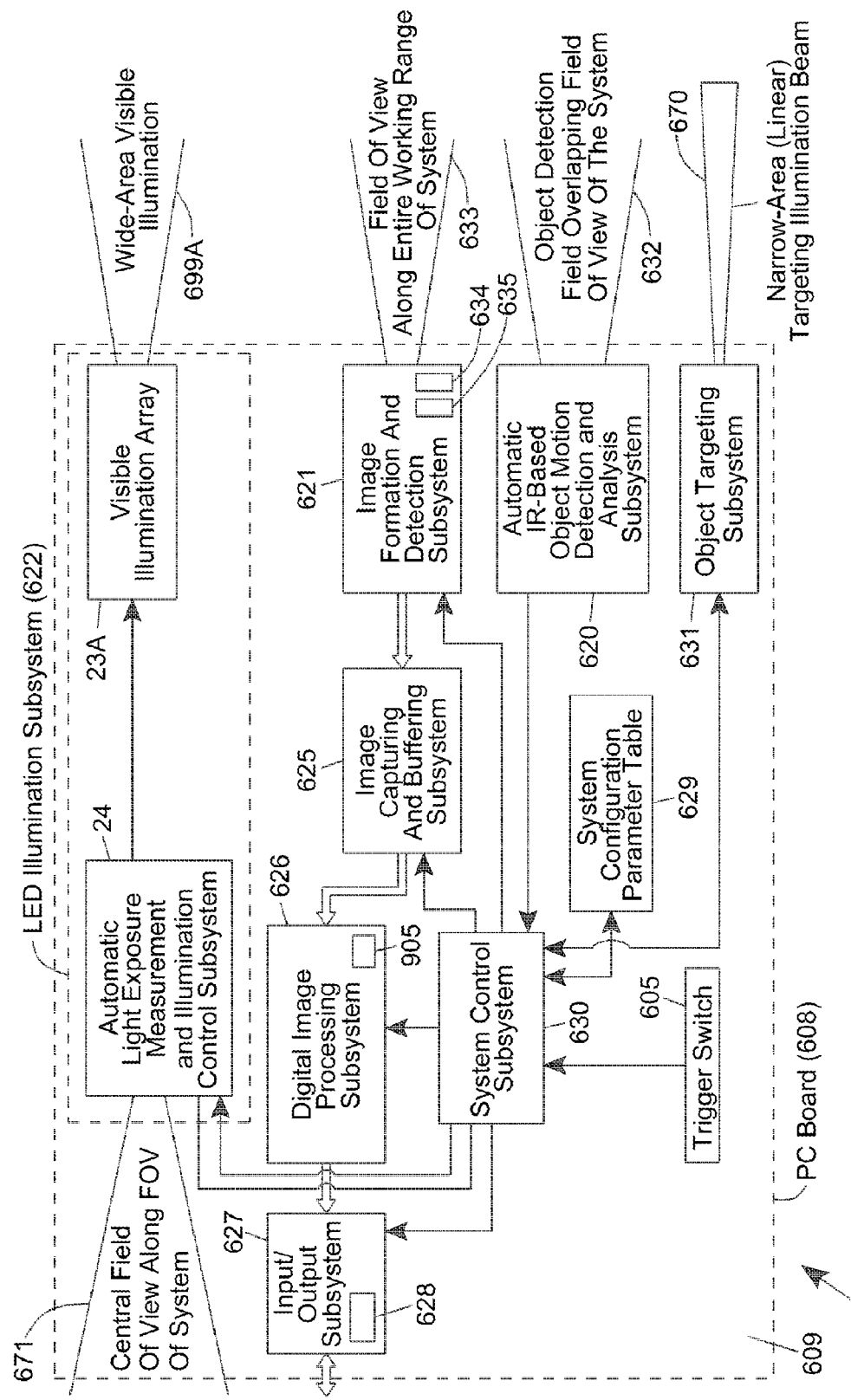
FIG. 14 is a block schematic system diagram of the single-channel digital imaging bar code symbol reading system shown in FIG. 15.

As shown in FIG. 14, the digital-imaging based code symbol reading system 600 comprises a number of subsystem components, namely: a digital image formation and detection (i.e. camera) subsystem 621 having image formation (camera) optics 634 for producing a field of view (FOV) upon an object to be imaged and a CMOS or like area-type image detection array 635 for detecting imaged light reflected off the object during illumination operations in an image capture mode in which at least a plurality of rows of pixels on the image detection array are enabled; a LED-based illumination subsystem 622 employing a single LED illumination array 623 comprising visible LEDs 623A, alternatively interspaced along a linear dimension, in the illustrative embodiment (although other arrangements are possible); a narrow-band transmission-type optical filter (not-shown), realized within the hand-supportable and detected by the image detection array 635, for transmitting illumination reflected from the illuminated object, while all other components of ambient light are substantially rejected; an object targeting illumination subsystem 631 as described hereinabove; an IR-based object detection subsystem 620 for producing an IR-based object detection field 632 within the FOV of the image formation and detection subsystem 621; an automatic light exposure measurement and illumination control subsystem 624 for controlling the operation of the LED-based illumination subsystem 622 including the operation of said visible array within said illumination subsystem; an image capturing and buffering subsystem 625 for capturing and buffering 2-D images detected by the image formation and detection subsystem 621; a digital image processing subsystem 626 for processing 2D digital images captured and buffered by the image capturing and buffering subsystem 625 and reading 1D and/or 2D bar code symbols represented therein; a local Predictive Error Event (PEE) database 905 for statistics tracking and non-repetitive use, and further supporting a bar code symbol reading process on the retail information network 1, as described in FIGS. 12A and 12B; optionally, a software-implemented bar code symbol arbitration module 908 for selecting the best bar code symbol among multiple bar code symbols presented during any given predetermined time window of operation; an input/output subsystem 627 for outputting processed image data and the like to an external host system or other information receiving or responding device; and a system control subsystem 630 integrated with the subsystems above, for controlling and/or coordinating these subsystems during system operation. Notably, the local database or data store 905 can be realized in various ways including a simple memory storage device such as EPROM, or using more complex data storage techniques such as a relational database management system (RDBMS) where the application requires or permits.

The primary function of the object targeting subsystem 631 is to automatically generate and project a visible linear-targeting illumination beam 670 across the central extent of the FOV of the system in response to either (i) the automatic detection of an object during hand-held imaging modes of system operation, or (ii) manual detection of an object by an operator when he/she manually actuates the trigger switch 605.

The primary function of the object motion detection and analysis subsystem 620 is to automatically produce an object detection field 632 within the FOV 633 of the image formation and detection subsystem 621, to detect the presence of an object within predetermined regions of the object detection field 632, as well as motion and velocity information about the object therewithin, and to generate control signals which are supplied to the system control subsystem 630 for indicating when and where an object is detected within the object detection field of the system. The automatic IR-based object motion detection and analysis subsystem 620 can be implemented using an IR LED 690A and IR photodiode 690B supported below the linear array of visible LEDs 623A, or by other suitable means.

The image formation and detection (i.e. camera) subsystem 621 includes image formation (camera) optics 634 for providing a field of view (FOV) 633 upon an object to be imaged and a CMOS area-type image detection array 635 for detecting imaged light reflected off the object during illumination and image acquisition/capture operations.

The primary function of the LED-based illumination subsystem 622 is to produce a visible wide-area illumination field 636A from the visible LED array 623A when subsystem 622 is operating in its illumination mode during digital image capture. In the preferred embodiment, the field of illumination has a narrow optical-bandwidth and is spatially confined within the FOV of the image formation and detection subsystem 621 during modes of illumination and imaging, respectively. This arrangement is designed to ensure that only narrow-band illumination transmitted from the illumination subsystem 622, and reflected from the illuminated object, is ultimately transmitted through a narrow-band transmission-type optical filter subsystem within the system and reaches the CMOS area-type image detection array 635 for detection and processing, whereas all other components of ambient light collected by the light collection optics are substantially rejected at the image detection array 635, thereby providing improved SNR, thus improving the performance of the system. The narrow-band transmission-type optical filter subsystem is realized by (1) a high-pass (i.e. red-wavelength reflecting) filter element embodied within at the imaging window 603, and (2) a low-pass filter element mounted either before the CMOS area-type image detection array 635 or anywhere after beyond the high-pass filter element, including being realized as a dichroic mirror film supported on at least one of the FOV folding mirrors employed in the digital imaging system.

In the illustrative embodiment, the automatic light exposure measurement and illumination control subsystem 624 performs two primary functions: (1) to measure, in real-time, the power density [joules/cm] of photonic energy (i.e. light) collected by the optics of the system at about its image detection array 635, and to generate auto-exposure control signals indicating the amount of exposure required for good image formation and detection; and (2) in combination with the illumination array selection control signal provided by the system control subsystem 630, to automatically drive and control the output power of the visible LED array 623A, employed in the illumination subsystem 622, so that objects within the FOV of the system are optimally exposed to either visible or invisible LED-based illumination, as determined by the system control subsystem 630, and optimal images are formed and detected at the image detection array 635. A parabolic light collection mirror can be used to focus collected light from the FOV onto photo-detector 681, which can be operated independently from the area-type image sensing array 635.

The primary function of the image capturing and buffering subsystem 625 is (1) to detect the entire 2-D image focused onto the 2D image detection array 635 by the image formation optics 634 of the system, (2) to generate a frame of digital pixel data for either a selected region of interest of the captured image frame, or for the entire detected image, and then (3) buffer each frame of image data as it is captured. Notably, in the illustrative embodiment, the system has both single-shot and video modes of imaging. In the single shot mode, a single 2D image frame (31) is captured during each image capture and processing cycle, or during a particular stage of a processing cycle. In the video mode of imaging, the system continuously captures frames of digital images of objects in the FOV. These modes are specified in further detail in US Patent Application Publication No. US20080314985 A1, incorporated herein by reference in its entirety.

Figure 15:
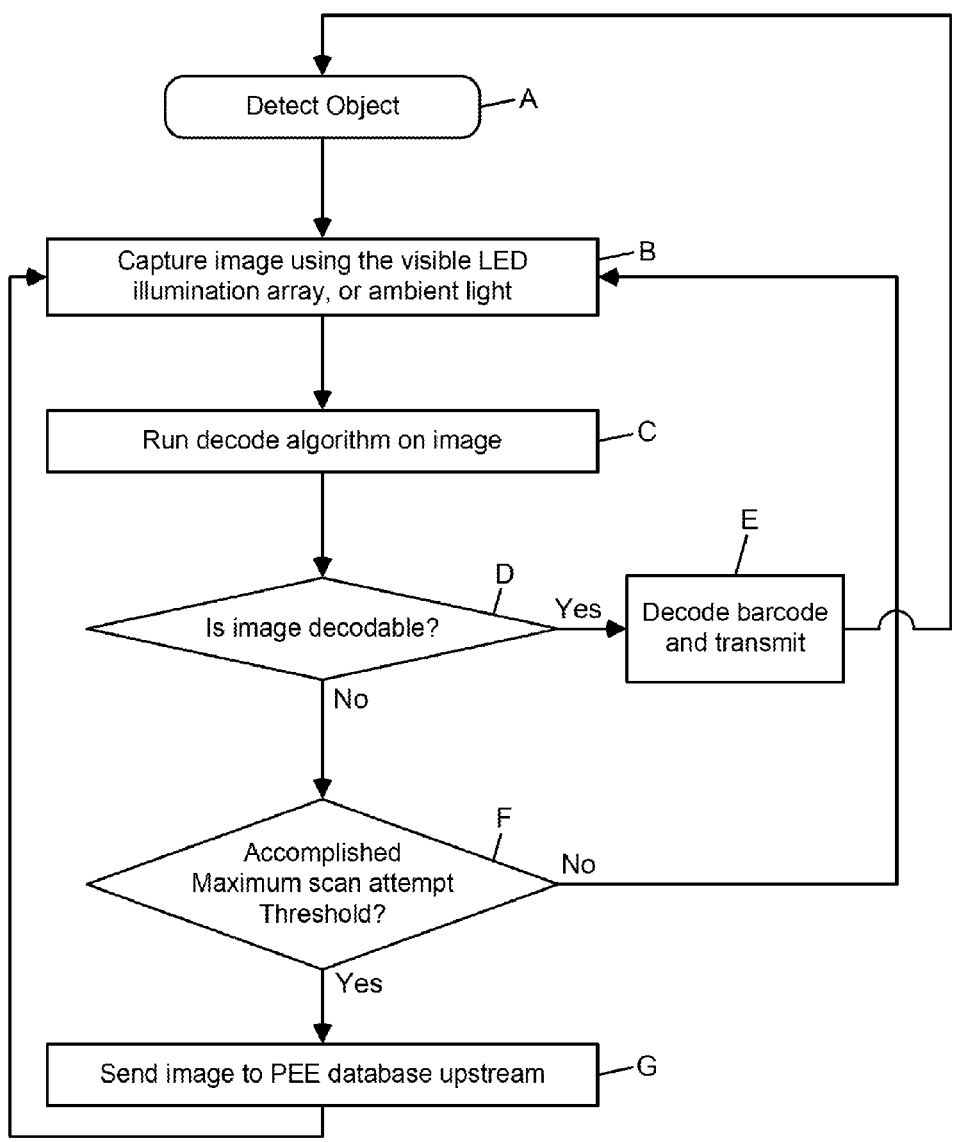
FIG. 15 is a flow chart describing the primary steps carried out within the system of FIG. 14 during system operation.

The primary function of the digital image processing subsystem 626 is to process digital images captured and buffered by the image capturing and buffering subsystem 625, under the control of the system control subsystem 630 so that the method of bar code symbol reading described in FIG. 15 is carried out in successful manner. Such image processing operations include the practice of image-based bar code decoding methods, as described in U.S. Pat. No. 7,128,266, incorporated herein by reference.

The primary function of the input/output subsystem 627 is to support universal, standard and/or proprietary data communication interfaces with external host systems and devices, and output processed image data and the like to such external host systems or devices by way of such interfaces. Examples of such interfaces, and technology for implementing the same, are given in U.S. Pat. No. 6,619,549, incorporated herein by reference in its entirety.

The primary function of the system control subsystem 630 is to provide some predetermined degree of control, coordination and/or management signaling services to each subsystem component integrated within the system, as shown, while carrying out the bar code symbol reading method described in FIG. 15. While this subsystem can be implemented by a programmed microprocessor, in the preferred embodiments, this subsystem is implemented by the three-tier software architecture supported on micro-computing platform as described in U.S. Pat. No. 7,128,266 and elsewhere hereinafter.

The primary function of the manually-activatable trigger switch 605A integrated with the housing is to enable the user, during a manually-triggered mode of operation, to generate a control activation signal (i.e. trigger event signal) upon manually depressing the same (i.e. causing a trigger event), and to provide this control activation signal to the system control subsystem 630 for use in carrying out its complex system and subsystem control operations, described in detail herein.

The primary function of the system configuration parameter table 629 in system memory is to store (in non-volatile/persistent memory) a set of system configuration and control parameters (i.e. SCPs) for each of the available features and functionalities, and programmable modes of supported system operation, and which can be automatically read and used by the system control subsystem 630 as required during its complex operations. Notably, such SCPs can be dynamically managed as taught in great detail in co-pending US Patent No. US20080314985 A1, incorporated herein by reference.

The Control Process Supported Within the POS-Based Digital Imaging Bar Code Symbol Reading System In general, hand-supportable digital imaging system 600 of FIGS. 13 and 14 supports both manually-triggered and automatically-triggered modes of operation, and the method of bar code symbol reading described below can be practiced using either of these triggering techniques.

In FIG. 15, the flow chart describes the method of reading bar code symbols carried out by the digital-imaging based bar code symbol reader 600 shown in FIGS. 13 and 14, and described above.

As indicated at Block A in FIG. 15, the control subsystem 630 determines if an object has been detected in the field of view (FOV). When the system is operating in its manually-triggered mode, this operation can be achieved by the user pulling the manually pulling trigger switch 605A. When the system is operating in its automatically-triggered mode of operation, this operation can be achieved by the object detection subsystem automatically detecting the presence of an object within the field of view (FOV) of the system. In the event that an object is detected, then at Block B, the system control subsystem 630 enables the image formation and detection subsystem to detect and capture a digital image of the object in the FOV, using a field of visible LED-based illumination generated by illumination subsystem 622, or alternatively ambient illumination (e.g. to facilitate the reading of bar code symbols displayed on LCD screens of mobile phones, mobile computers and the like). At this stage, the object might bear a bar code symbol 16A within the FOV of the system.

At Block C in FIG. 15, control subsystem 630 runs a decode algorithm on the captured digital image, and if at Block D, a bar code symbol graphically represented in the digital image is decodable, then at Block E, the bar code symbol is decoded and the symbol character data is transmitted from the I/O subsystem 627 to the host system. If, however, at Block D a bar code symbol is not decodable in the digital image, then control subsystem 630 determines at Block F whether or not the maximum scan attempt threshold has been accomplished, and if not, then the system controller returns to Block B, and resumes the flow as indicated. However, if at Block F, control subsystem 630 determines that the maximum scan attempt threshold has been reached, then control subsystem 630 proceeds to Block G, and sends a failure to decode notification (i.e. "no read" operation) to the operator, and the system returns to Block B, as shown in FIG. 15.

The above method of imaging-based based bar code symbol reading and control of operation is carried out in an automated manner, within the bar code symbol reader 600, wholly transparent to the operator who is holding the system in his or her hand.

Summary of Predictive Diagnostics Supported in Illustrative Embodiment of Hybrid Digital Imaging and Laser Scanning System Scanner Module Involved: Predictive Activity (Error Event Type)

Imager/System: Imager takes a picture of clean windows and stores as a reference for determining when the window needs cleaning.

Imager/System: Sense imaging LED current and compare to baseline current expected to warn maintenance personnel of potential failure.

Imager/System: Use imager to sense scan pattern to see if any lasers are out or weak.

Imager/System: Flag imager communication degradation by main microprocessor.

Imager/System: Use decode time as a prediction of dirty window or illumination issues Imager/System: Use increased decode time on specific codes along with server interaction to notify of potential scanner issues Imager/System: Use image acquired during scale zero to notify of incorrect zeroing operation. Neither the scanner nor scale really knows exactly what zero is but an image can determine that it was done incorrectly.

Imager/System: Use image acquired on no reads to diagnose improper operation (bar code is covered or obstructed whereby a special beep is sounded). If the item still is not scanned, the image is saved to further prove incorrect scanning technique, illegal activity by the cashier, poorly printed barcodes by the manufacturer, etc. etc.

Imager/System: Use Imager as backup to predict wake-up sensor is failing (i.e. digital imager is used more often than the IR-based wake-up sensor).

Laser Scanner Only: Sensing warning current of lasers for potential issues

Laser Scanner Only: Sensing warning current of motors for potential issues

Laser Scanner Only: Sensing poor scanning as a window or laser issue.

System: Monitor total current on initial surge and also quiescent operation for change in levels previously stored as max surge and quiescent normal current levels. Detect encroaching on fatal operating areas.

System: Sense change in current of all local and auxiliary devices to predict issues.

System/Scale: Sensing number of zero button presses as a prediction of scale needing it too often. Other things can be implied here besides the scale really needing zero such as cashier playing too much with the zero push button switch, an intermittent switch, etc.

System Hardware: Sensing extremely short button presses as a predictor of potential button failures. The switch signals are too short to be real or too long (button or switch sticking).

Wake-up System: Use fact that switch button wakeup is initiated repetitively to flag potential wake up sensor issues.

System/Scale: Using last calibration date as predictor of scale maintenance needs.

Scale: Scale calibration prediction diagnostics by sensing scale zero drift.

Scale: Sense metrology numbers to diagnose improper scale operation.

Figure 16A:
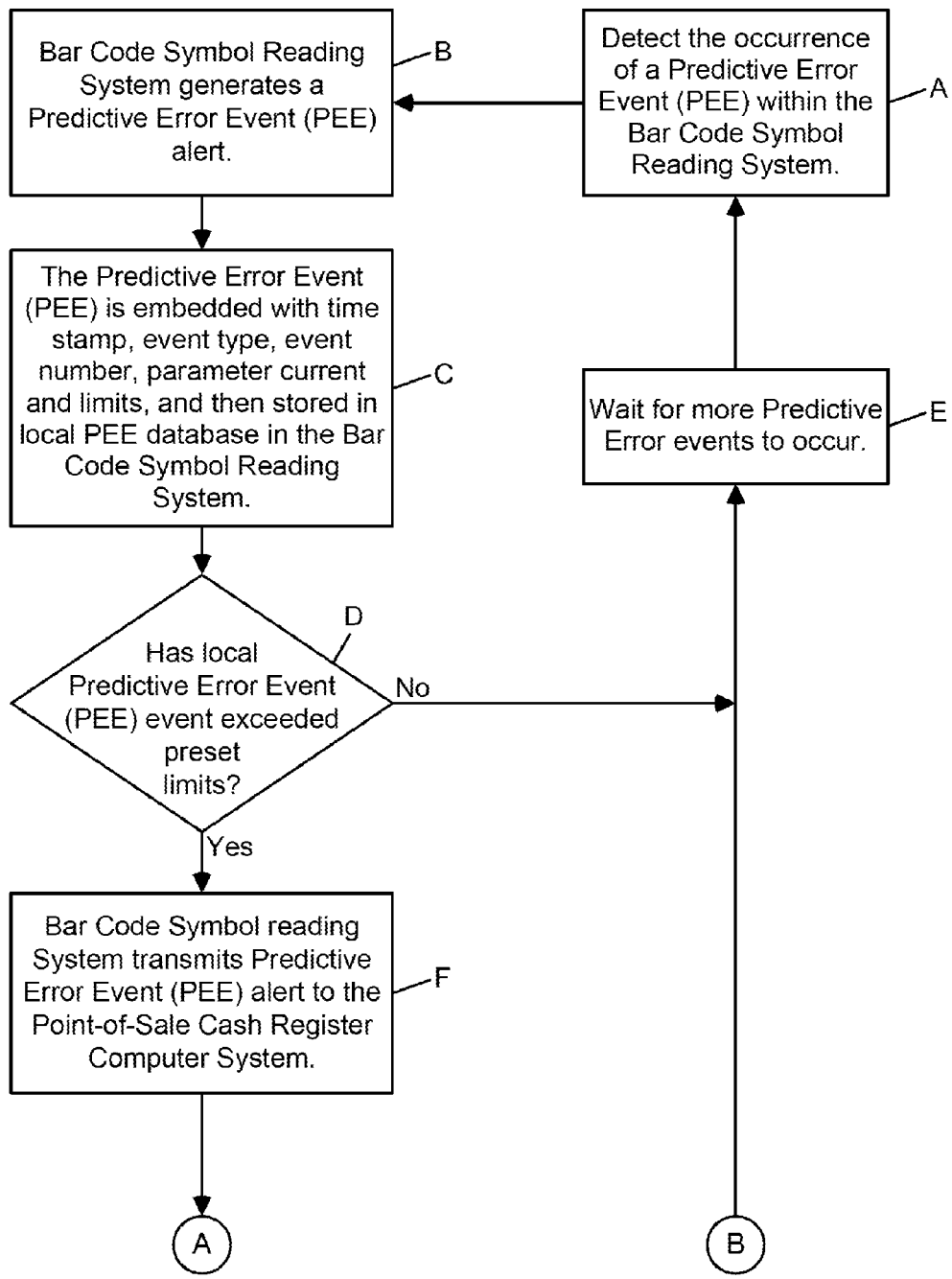
FIGS. 16A and 16B, taken together, set forth a flow chart describing the primary steps carried out during a first illustrative embodiment of a method of automatically and transparently detecting predictive error events (PEE) within bar code symbol reading systems deployed on the retail information networks shown in FIG. 1.
Figure 16B:
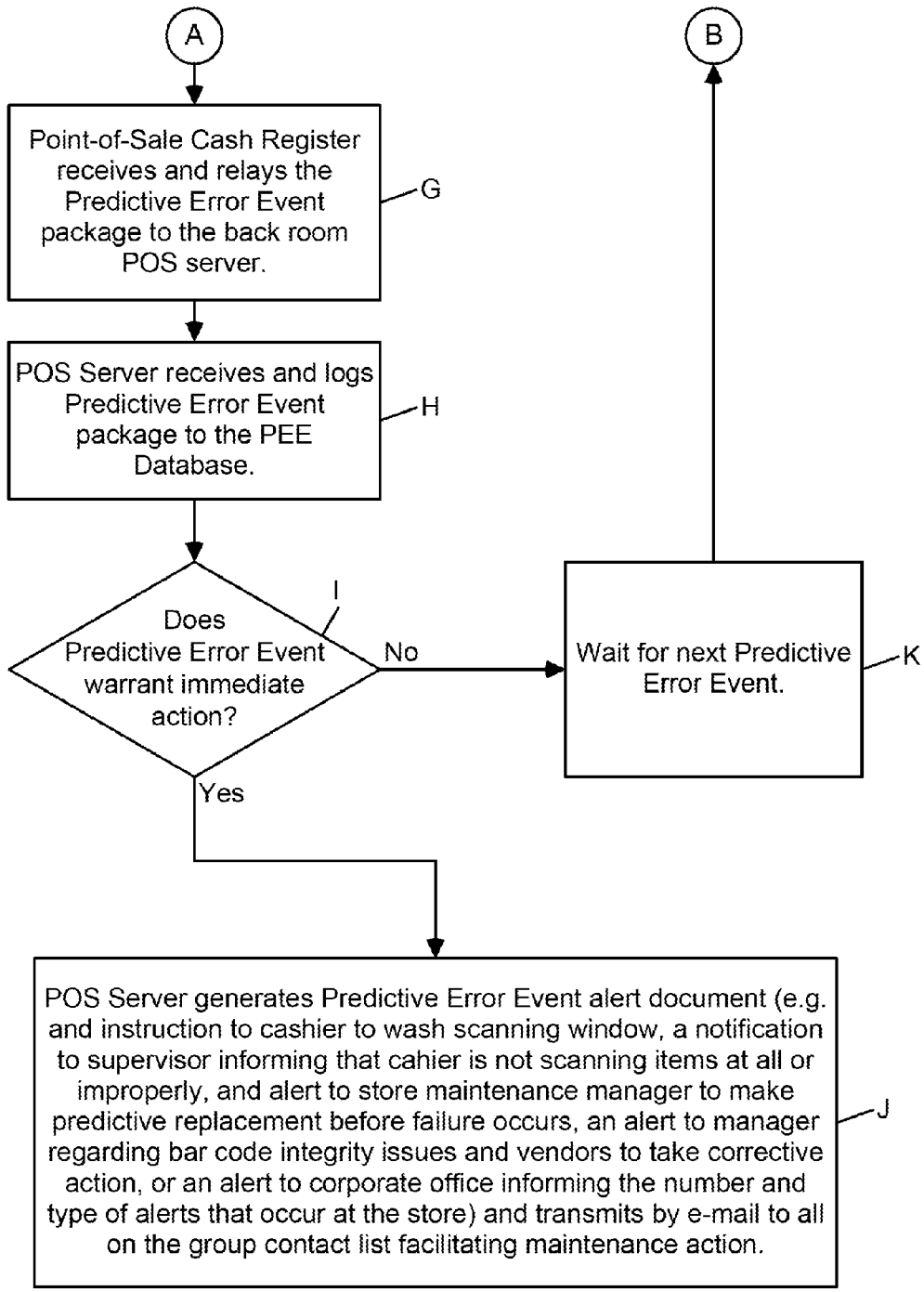

Method of Generating Predictive Error Events (PEE) and Predictive Error Alerts (PEA) from Hybrid (Digital Imaging/Laser) Scanning Systems or Laser Scanning Systems on a Retailer Information Network With reference to FIGS. 16A and 16B, it is appropriate now to describe a novel illustrative embodiment of a method of detecting predictive error events (PEE) within laser scanning and digital imaging scanning systems in general, and hybrid-type bar code symbol reading systems in particular, and generating predictive error alerts (PEA) within POS stations in the retailer information network 1. An example of the type of PEE type events the method is capable of detecting is described in the table set forth above, for purposes of illustration, not limitation, and the method is described in the flow chart set forth in FIGS. 16A and 16B.

As indicated at Block A in FIG. 16A, the system controller determines whether or not a predictive error event (PEE) within the bar code symbol reading system has occurred.

When a PEE is detected at Block A in FIG. 16, then at Block B the bar code symbol reading system generates a predictive error event (PEE).

As indicated at Block C in FIG. 16A, the predictive error event (PEE) is embedded with a time-stamp, event type, event number, parameter current and limits, and then stored in the local PEE database 905 in the bar code symbol reading system.

As indicated at Block D, the system controller determines whether or not a local predictive error event (PEE) has exceeded preset limits (e.g. first, second error limits). If the preset limits have not been exceeded, then at Block E, the bar code symbol reading system waits for more predictive error events (PEEs) to occur. If the preset limits have been exceeded at Block D, then the bar code symbol reading system proceeds to Block F, where the bar code symbol reading system transmits predictive error event (PEE) alert to the POS cash register computer system.

As indicated at Block G in FIG. 16B, the POS cash register computer system receives and relays the predictive error event alert (PEA) data package, to the back room POS information server 960.

At Block H, the POS information server 960 receives and logs the PEA data package to the PEE database maintained by and/or within the POS information server 960.

At Block I, the POS information server determines whether or not the received predictive error event (PEE) warrants immediate action (i.e. whether or not the data values exceed set thresholds, and further action is triggered. If immediate action is warranted at Block I, then at Block J, the POS information server 960 generates a predictive error event (PEE) alert document, and server 960 or 970 transmit this PEE alert document (e.g. .pdf formatted document) by email or instant messaging or other electronic techniques, to all members on the group contact list involved in facilitating maintenance action on that alert. One of the members of that group could be the cashier. In that case, the predictive error alert (PEA) is sent back to the POS cash register system 930 to alert the cashier to take action (e.g. cleaning of a scanning window, etc.) If the cashier is not one of the members of that particular predictive error alert group, then the alert is passed onto other members via the POS Server 960 by the generation and transmission of emails, instant messages and/or other electronic communication. The predictive error event alert document could include, for example: an instruction to the cashier to clean the scanning window, a notification to the supervisor informing that the cashier is not scanning items at all or improperly, an alert to the store maintenance manager to do make predictive replacement before failures occur, an alert to the store manager regarding barcode integrity issues and for vendors take corrective action, or an alert to corporate officers informing the number and type of alerts that occur at this particular store.

If immediate action is not warranted at Block I, then at Block K the POS information server 960 waits for the next predictive error event (PEE) package to be transmitted from a POS cash register computer system deployed on the retailer information network.

Method of Predicting Error Event Detection and Alert Generation Using Scale Calibration Diagnostics That Senses Scale Zero Drift Referring now to FIGS. 17A, 17B and 17C, methods for predictive error events involving scale calibration will now be described in detail.

In general, metrology is a system of measurement, and an electronic weigh scale subsystem 22 provided in hybrid bar code symbol reading system 100 does not work from number 0 to a max number (say 99999) when weighing an item. Rather, the electronic weigh scale 22 needs to be 'calibrated', whereby 'scale at zero' is 'marked' at a certain point above the zero number on the range, using the scale platter as an offset weight. Then a 'calibrated' weight is added to the scale weigh platter, representing the max range of the scale (in our case this is 30 lbs or 15 kgs). That number is now 'marked' or saved in configuration of the scale as a representation of the maximum weight. On power up, the scale 'marks' a temporary new "zero" spot along its dynamic working range. The number that the scale is currently using to represent "zero" weight is a telltale parameter, or indicator, of a 'creeping' predictive error. Also, a second part of metrology involves checking the current metrology number against the number that was marked at power up, whenever the scale indicates that it has a zero status bit set. The zero status bit, in conjunction with the current metrology number, is also a 'telltale' sign of something that may cause a problem.

Figure 17A:
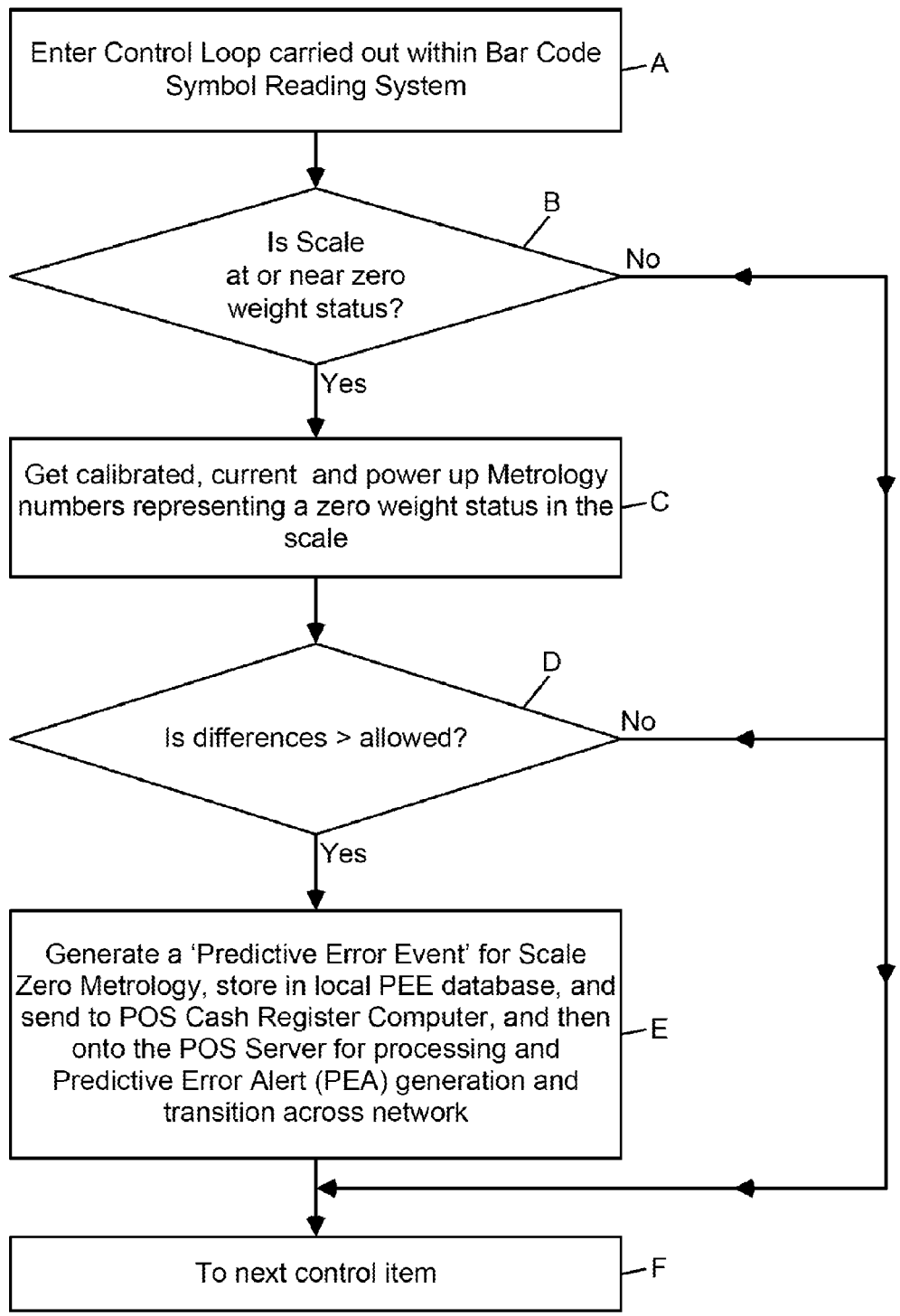
FIG. 17A is a flow chart describing the primary steps carried out during the predictive error event detection process carried out within a hybrid laser scanning and digital imaging system having an electronic weigh scale subsystem, for the purpose of detecting drift away from zero scale measurement/indication.

Method of Predicting Scale Metrology Errors by Monitoring Drifts in Electronic Scale Zero Values The flow chart set forth in FIG. 17A describes a method of monitoring predictive scale metrology errors, due to zero scale zero drift, carried out as part of a 'normal' control loop operating within the bi-optic scanner and scale system 100, or 400, or functional equivalent.

As indicated at Block A in FIG. 17A, the bi-optical scanner/scale system enters the control loop. At Block B, the system controller determines whether or not the scale is currently at zero status. The metrology measurement cannot be taken when the scale is somewhere above zero. If the scale is not at zero status at Block B, then the system proceeds to Block F and moves onto monitoring the next control item. If the scale is at zero status at Block B, then the system proceeds to Block C.

As indicated at Block C in FIG. 17A, the system controller gets/retrieves the calibrated, current and power-up metrology numbers representing a zero weight status in the electronic scale subsystem 22.

At Block D in FIG. 17A, the system controller determines whether or not (i) the difference between the calibrated and power up zero metrology numbers, or (ii) the difference between the calibrated and current zero metrology numbers, or (iii) the difference between the power up and current zero scale-metrology numbers, exceeds a pre-programmed limit. If the difference is less than the allowed pre-programmed threshold, then the system controller advances to Block F to review and handle the next control item, as shown in FIG. 17A. If the difference is greater than the allowed preprogrammed threshold, then the system controller proceeds to Block E and generates and stores a predictive error event (PEE) in the local PEE database 905 for the zero scale-metrology. If local PEE limits are exceeded, then the PEE record is transmitted upstream to the POS cash register computer system 930, and then re-transmitted to the POS server 960 for storage in the remote PEE database, and subsequent processing. If thresholds are exceeded, the POS server generates and transmits a PEE alert (PEA) to both management and maintenance to inspect the system, and to analyze and recalibrate the scale, if necessary.

At Block F, the system proceeds onto the next control process item maintained within the system.

Method of Monitoring Predictive Scale Metrology Errors, Due to Scale Operation Error Metrology was explained in the previous section. When the scale is calibrated, both the new zero weight and the maximum weight spots on the analog scale are 'marked' or saved in configuration. The scale zero point changes with another scale power up, or when manually zeroing the scale. The maximum range spot is only 'virtually' adjusted, that is, since the calibrated weight is not available, the scale assumes where the max spot is, based on the changing new zero spot. In some scales, the max spot stays the same until recalibrated. Regardless of the manner in which data is saved, improper operation or the prediction that the scale will be soon entering an improper operational area, can be determined.

The key to being able to determine improper operation of the scale is first to save the zero and max spots as the scale is being calibrated, or to later retrieve them from the scale, when available. The scanner and scale system 100 now has reference points to determine questionable operation. As the scale is being used in normal operation, the weights naturally are transmitted through the scanner in the 'single cable mode' of the scanner and scale operation. Since this mode has only one cable, both the scanner and scale operation pass through the scanner on the way to the POS cash register. The scanner system now keeps a record of the metrology points whenever the scale returns a substantial weight. The metrology points can be requested of the scale right after a weight is returned. The scanner 'PLOTS' the returned metrological measurement. Whenever the error (i.e. delta away from normal path) surpasses a pre-programmed limit, the scanner generates a 'predictive error event (PEE)' indicating that the scale operation is questionable and should be checked and/or recalibrated.

Figure 17B:
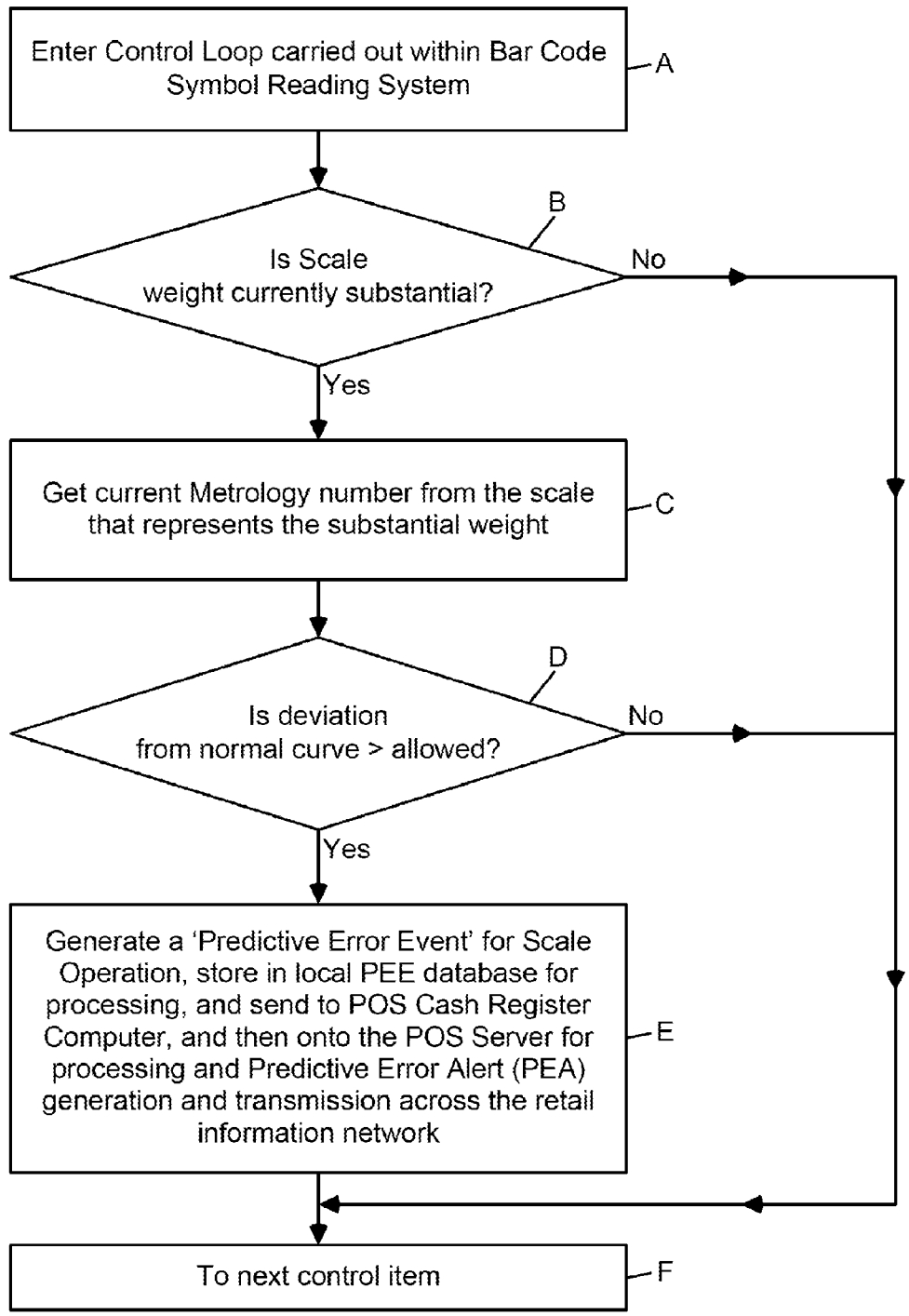
FIG. 17B is a flow chart describing the primary steps carried out during the predictive error event detection process automatically and transparently carried out within a hybrid laser scanning and digital imaging system having an electronic weigh scale subsystem, for the purpose of predicting electronic scale operation error.
Figure 17C:
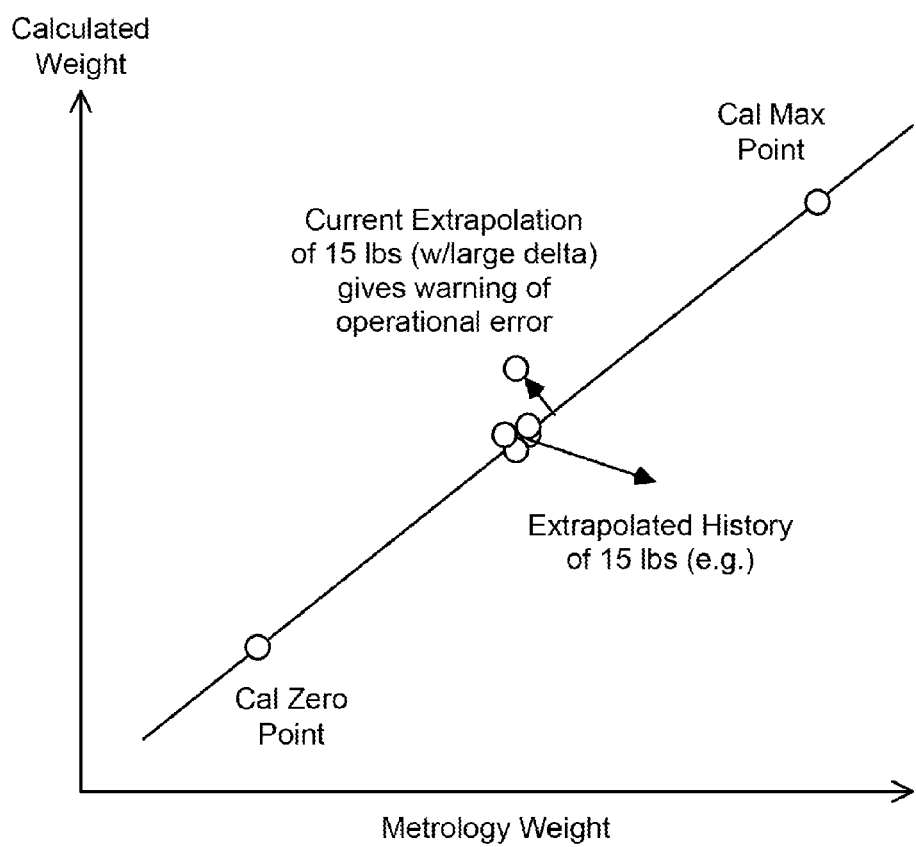
FIG. 17C is a chart showing calculated weight vs. metrology weight, generated during the process of FIG. 17B.

The flow chart set forth in FIGS. 17B and 17C describes a method of monitoring predictive scale-metrology errors, due to scale operation error, carried out as part of a 'normal' control loop operating within the bi-optic scanner and scale system 100, or 400, or functional equivalent.

As indicated at Block A in FIG. 17B, the bi-optical scanner and scale system enters the control loop. At Block B, the system controller determines whether or not the scale weight is currently substantial (i.e. non-zero). If the scale is at zero status or the weight is steady and NOT determined to be not substantial, then the system proceeds to Block F and moves onto monitoring the next control item. If the scale is above zero status and the weight is steady and determined to be substantial, then the system proceeds to Block C.

As indicated at Block C in FIG. 17B, the system controller gets the current metrology number from the electronic scale, representing a substantial weight, whenever the scale returns a weight greater than a pre-programmed value. The metrology measurement cannot be taken when the scale is somewhere near zero, as the operational error will be too small. As shown in FIG. 17C, the metrology number, representing a substantial weight, is plotted on a virtual operational graph with the zero and max points representing where the weights should be traveling along.

At Block D in FIG. 17B, the system controller determines whether or not the deviation between (i) metrology weight and (ii) the calculated weight, from the normal curve illustrated in FIG. 17C, is greater than the allowed threshold. If the distance (delta or deviation) from the ideal operational line is less than a pre-programmed threshold or limit, then the system controller advances to Block F to look at the next control item in FIG. 17B, as shown. If the deviation is greater than the allowed threshold, then the system controller proceeds to Block E and generates and stores a predictive error event (PEE) in the local PEE database 905 for the scale operation, and this PEE remains active until it is automatically-cleared, manually cleared, or the electronic weigh scale is recalibrated. If local PEE limits are exceeded, then the PEE record is transmitted upstream to the POS cash register computer system 930, and then re-transmitted to the POS server 960 for storage in the remote PEE database, and subsequent processing. If thresholds are exceeded, the POS server generates and transmits a PEE alert (PEA) to both management and maintenance to inspect the system, and analyze and recalibrate the scale, if and as necessary.

At Block F, the system proceeds onto the next control process item maintained within the system.

Method of Predicting Scale Metrology Errors by Monitoring Scale Out of Calibration Activity Whenever the electronic scale is calibrated, the current date and time is stamped into the event data stored within the scanner/scale system 100, 400. As the system is programmed to support many monitoring functions, it searches for a calibration date that is getting older measured using the real-time clock maintained within the system. When a pre-programmed limit is reached on scale calibration age, the system automatically generates a predictive error event (PEE) indicating that the scale operation is now questionable as it is out of calibration based on the time that has passed since the last calibration.

Figure 17D:
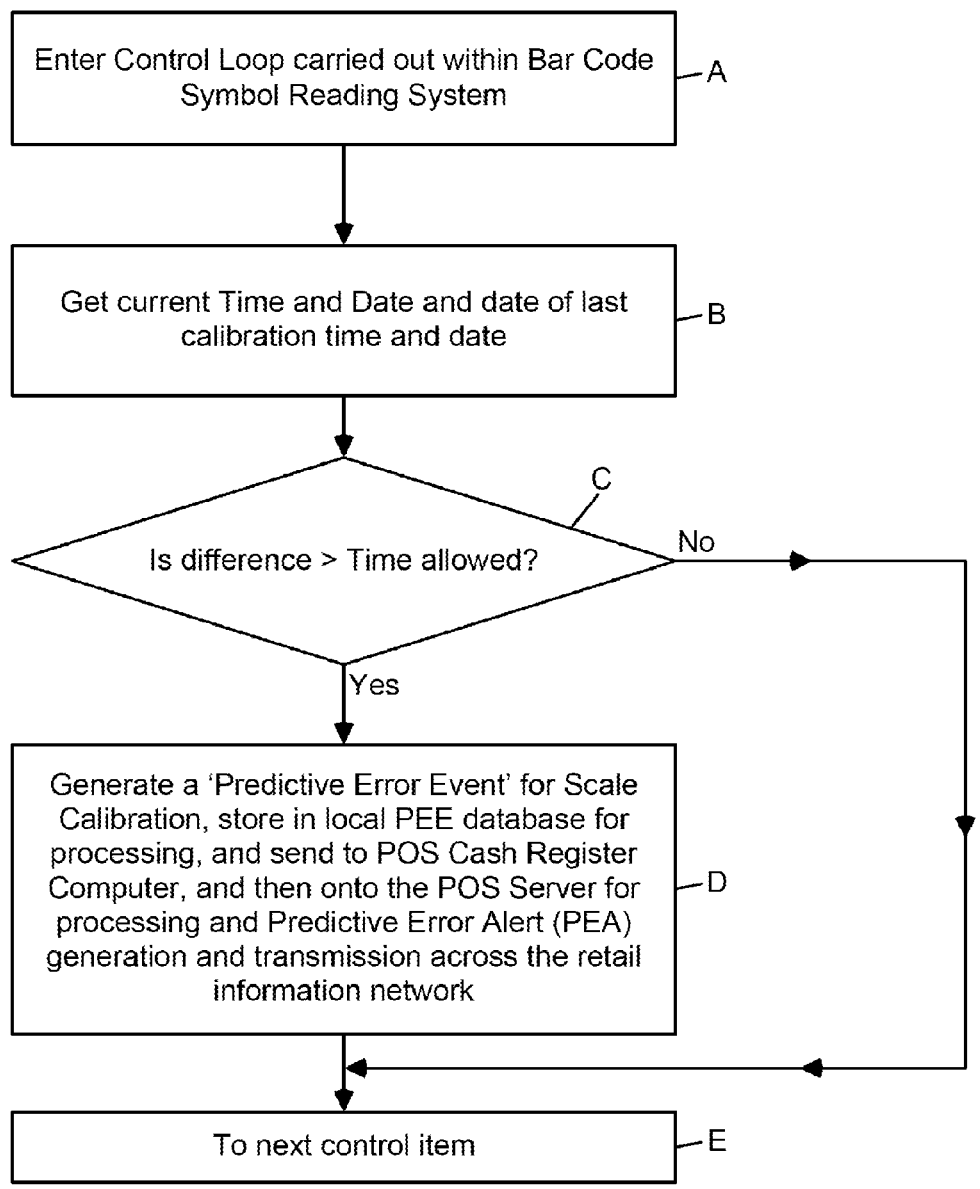
FIG. 17D is a flow chart describing the primary steps carried out during the predictive error detection event process automatically and transparently carried out within a hybrid laser scanning and digital imaging system having an electronic weigh scale subsystem, to predict when the electronic scale should be recalibrated.

The flow chart set forth in FIG. 17D describes a method of monitoring predictive scale calibration errors, due to the age of scale calibration, carried out as part of a 'normal' control loop operating within the bi-optic scanner and scale system 100, or 400, or functional equivalent.

As indicated at Block A in FIG. 17D, the bi-optical scanner/scale system enters the control loop.

At Block B, the system controller gets the real time clock time values and date information, and date and time of the last calibration.

At Block C in FIG. 17D, the system controller compares the two time stamps, and determines whether or not the difference between (i) current date and time, and (ii) the date and time of last calibration, is greater than the allowed threshold, predicting that the electronic weigh scale is out of calibration based on time and date measurements. If the difference is less than the allowed threshold, then the system controller proceeds to Block E and moves onto the next control process. If the deviation is greater than the allowed threshold, then the system controller proceeds to Block D and generates and stores a predictive error event (PEE) in the local PEE database or data store 905 for the scale calibration, and this PEE event remains active until it is automatically-cleared, manually cleared, or the electronic weigh scale is recalibrated. If local PEE limits are exceeded, then the PEE record is transmitted upstream to the POS cash register computer system 930, and then re-transmitted to the POS server 960 for storage in the remote PEE database, and subsequent processing. If thresholds are exceeded, the POS server generates and transmits a PEE alert (PEA) to both management and maintenance to inspect the system, and analyze and recalibrate the scale, if and as necessary.

At Block E, the system proceeds onto the next control process item maintained within the system.

Method of Predicting System Error Events, by Monitoring Changes in the Electrical Current Flowing Through all Local and Auxiliary Devices Today, many electronic system designs are carried out with an energy-conservation initiative in mind. That is, designs are trying to do the most with as few resources as possible. One of those resources is the electrical current used in powering the scanner/scale system, including any device attachments connected to the scanner/scale system.

To facilitate monitoring of electrical current drawn by each device associated with the bar codes symbol reading systems disclosed herein, a current measuring circuit is employed at every place on the printed circuit board that feeds current to these devices within the system. These inputs can be multiplexed so that one digital representation is received from all devices over the same I/O line to the main processor. Then, the system monitors the devices (present in its configuration) with respect to using little or excessive current to power that device. When a pre-programmed current limit is observed, for a given device, the scanning system generates a 'predictive error' indicating that targeted device is operating in a warning area of electrical current usage. Two different methods of predictive error event generation are disclosed in FIGS. 18A and 18B, using two different kinds of warning current ranges for two different kinds of system operation (i.e. normal operation mode, and power-save operation mode, respectively).

Figure 18A:
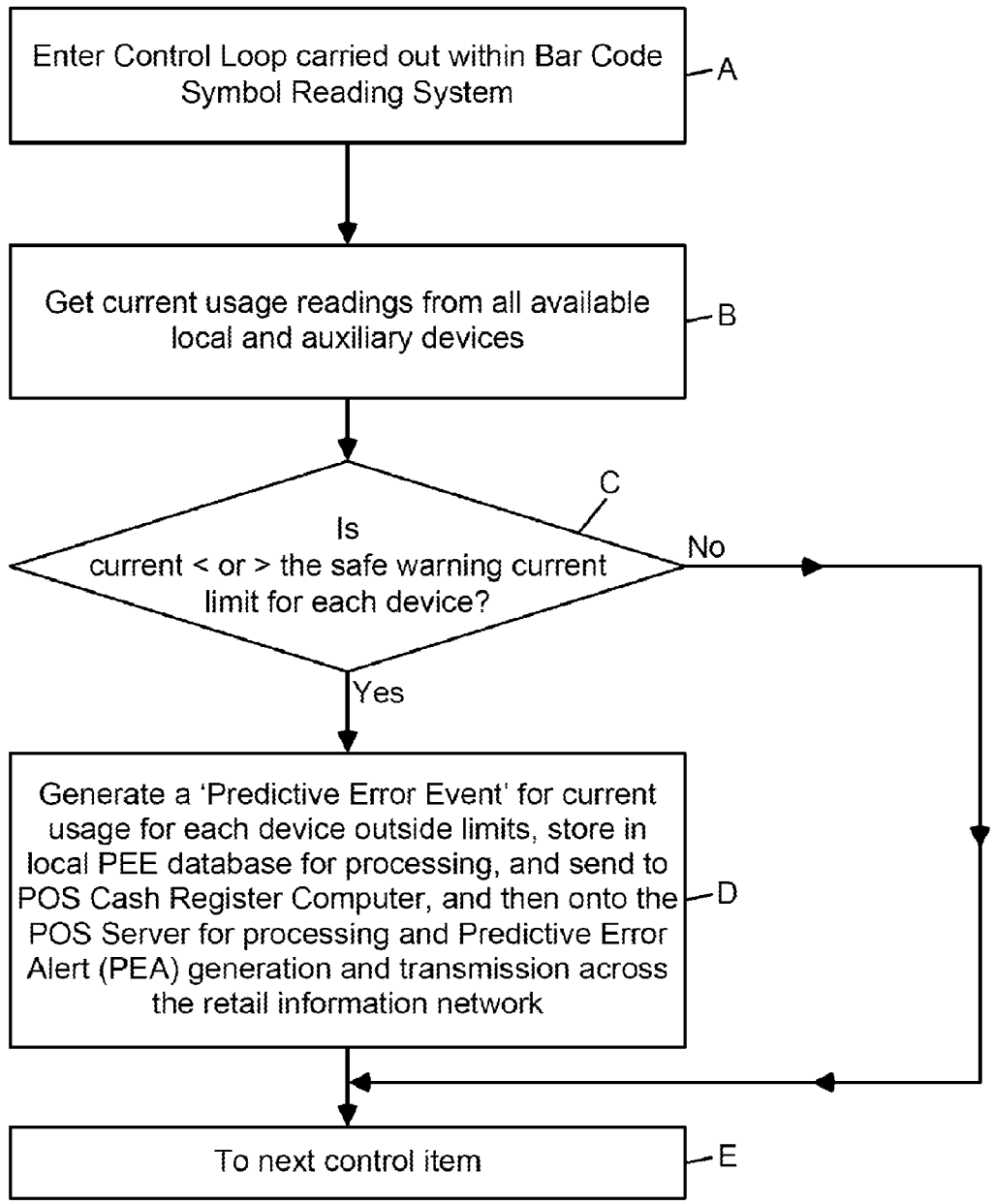
FIG. 18A is a flow chart describing the primary steps carried out during the predictive error event detection process automatically and transparently carried out within a hybrid laser scanning and digital imaging system having an electronic weigh scale subsystem, to predict when devices are operating outside their specified safe warning range of operating electrical current.

The flow chart set forth in FIG. 18A illustrates scanner/scale system monitoring the electrical current consumed by its devices, and whether or not current usage operates outside the warning range of normal operation, allotted for that device, where values of measured current falling in the warning range is questionable but not fatal. A predictive error event (PEE) occurs whenever any device operates outside those bounds, or "warning areas" (i.e. not fatal ranges of normal operation). The aim of the present method is to detect these "warning areas" and command action before failure events actually occur.

As indicated at Block A in FIG. 18A, the bi-optical scanner/scale system enters the control loop.

At Block B, the system controller gets the electrical current usage readings from all available local and auxiliary devices within the system.

At Block C in FIG. 18A, the system controller determines whether the electrical current usage reading for each device exceeds or is much less than the preprogrammed limit window set for each device. If the current usage values are within the preprogrammed window, then the system controller proceeds to Block E and moves onto the next control process.

If the electrical current usage reading for a given device does exceed its preprogrammed window, then the system controller proceeds to Block D in FIG. 18A and generates and stores a predictive error event (PEE) in the local PEE database 905, for electrical current usage outside each device's preprogrammed threshold limits, and this PEE remains active until it is automatically-cleared, manually cleared, or the device has maintenance performed on it or is replaced. If local PEE limits are exceeded, then the PEE record is transmitted upstream to the POS cash register computer system 930, and then re-transmitted to the POS server 960 for storage in the remote PEE database, and subsequent processing. If thresholds are exceeded, the POS server generates and transmits a PEE alert (PEA) to both management and maintenance to inspect the system, and analyze the faulty device or the scanner system itself, and replace it if and as necessary.

At Block E, the system proceeds onto the next control process item maintained within the system.

Figure 18B:
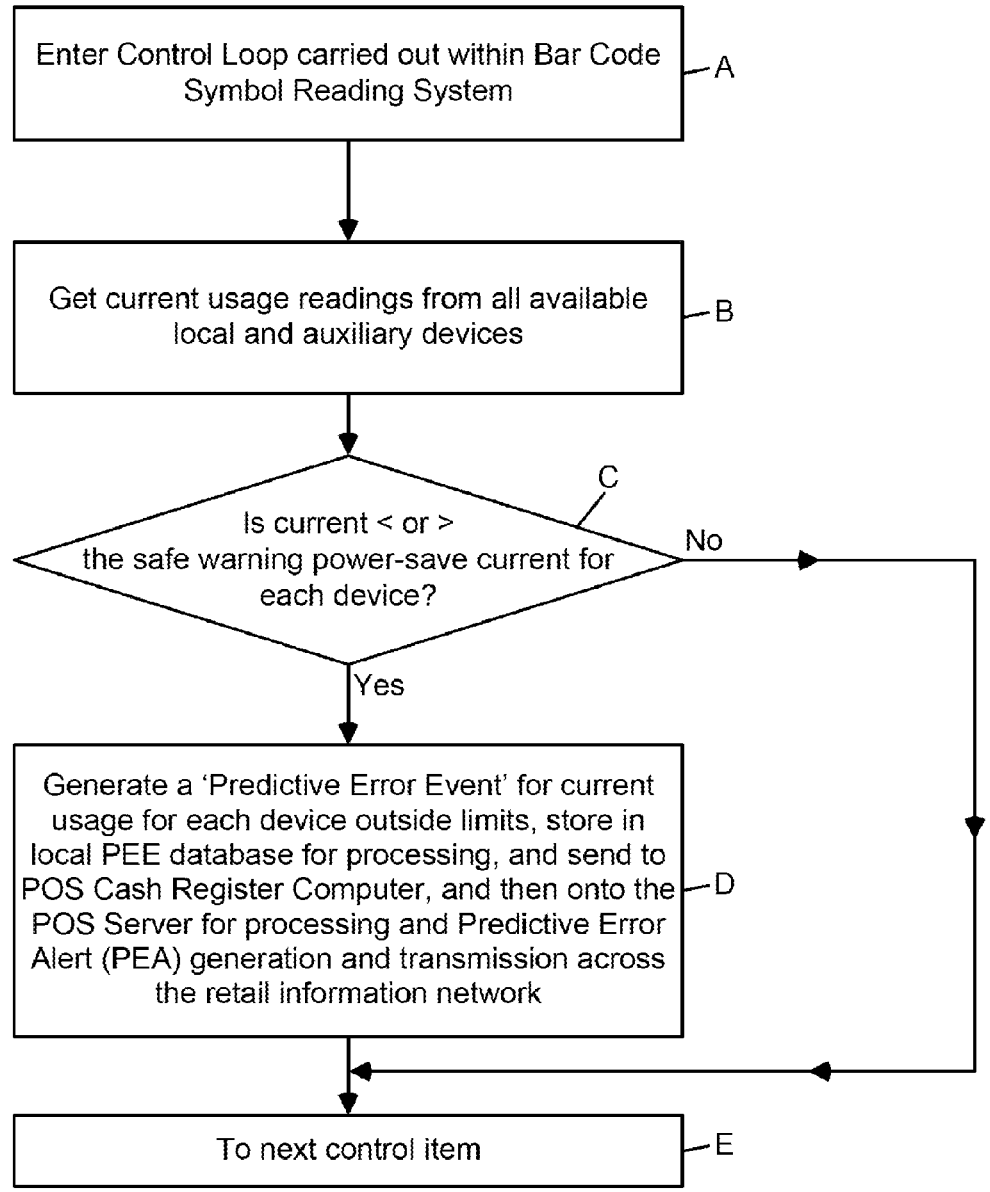
FIG. 18B is a flow chart describing the primary steps carried out during the predictive error event detection process automatically and transparently carried out within a hybrid laser scanning and digital imaging system having an electronic weigh scale subsystem, to predict when devices are operating outside their specified safe warning range of power-save electrical current.

Method of Predictive Error Event Detection Process for all Devices Using Warning Power-Save Current Range, where the Warning Power-Save Range is Questionable but not Fatal The flow chart set forth in FIG. 18B illustrates scanner/scale system monitoring the electrical current consumed by its devices, and whether or not current usage operates outside the warning "power-save" range of operation, allotted for that device, where values of measured current falling in the warning "power-save" range is questionable but not fatal. A predictive error event (PEE) occurs whenever any device operates outside those bounds, or "warning areas" (i.e. not fatal ranges of power-save operation). The aim of the present method is to detect these "warning areas" and command action before failure events actually occur.

As indicated at Block A in FIG. 18B, the bi-optical scanner/scale system enters the control loop.

At Block B in FIG. 18B, the system controller gets the electrical current usage readings from all available local and auxiliary devices within the system.

At Block C in FIG. 18B, the system controller determines whether the electrical current usage reading for each device exceeds or is much less than the preprogrammed safe "power-save" current limit window set for each device. If the current usage values are within the preprogrammed power-save current window, then the system controller proceeds to Block E and moves onto the next control process.

If the electrical current usage reading for a given device does exceed its preprogrammed window, then the system controller proceeds to Block D in FIG. 18B and generates and stores a predictive error event (PEE) in the local PEE database 905, for electrical current usage outside each device's preprogrammed threshold limits, and this PEE remains active until it is automatically-cleared, manually cleared, or the device has maintenance performed on it or is replaced. If local PEE limits are exceeded, then the PEE record is transmitted upstream to the POS cash register computer system 930, and then re-transmitted to the POS server 960 for storage in the remote PEE database, and subsequent processing. If thresholds are exceeded, the POS server generates and transmits a PEE alert (PEA) to both management and maintenance to inspect the system, and analyze the faulty device or the scanner system itself, and replace it if and as necessary.

At Block E in FIG. 18B, the system proceeds onto the next control process item maintained within the system.

Method of Predicting Wake-Up Sensor Error Activity by Monitoring Wake-Up Switch Events The hybrid bi-optic system 100 has a 'sleep mode' whereby its lasers, motors, and other non-essential current using devices are deactivated (i.e. de-energized) after a pre-programmed time period in order to save electrical power. While such function can be thought of as an energy-savings feature, the actual system benefits by minimizing electrical power consumption is to increase the lifetime of the system and its components. In the bi-optic scanning systems 100 and 400, a push button switch 67B is provided on the system housing that is used to multiplex a number of differently programmed functions. Two such functions would include: (i) inducing the scanning system into its power-saving "sleep mode" by depressing the manual button switch 67B for an extended period of time; and waking the system up from its power-saving "sleep mode" by depressing the button switch for a shorter period of time. Each of these functions are counted and logged by the system. This use of the switch to wake-up the scanner could be a signal that the normal method of waking up the scanner, namely the IR or photo-transistor detector, is failing.

Excessive use of the push-button switch 67B could be a warning or predictor that normal IR wake-up sensor circuit 67A in the system 100 is not working properly, and therefore, the cashier is using the push-button switch to manually control the sleep mode of the system. When depression of the push-button switch is detected a predetermined number of times in a row, when the IR-wake-up sensor or digital imaging is activated for wake-up sensing, the system automatically generates a predictive error event (PEE) and corresponding alert, signaling to the operator that the push-button switch 67B is being used excessively and that the IR or photo-transistor functionality of the IR wake-up sensor circuit 67A requires inspection and/or maintenance.

Figure 19A:
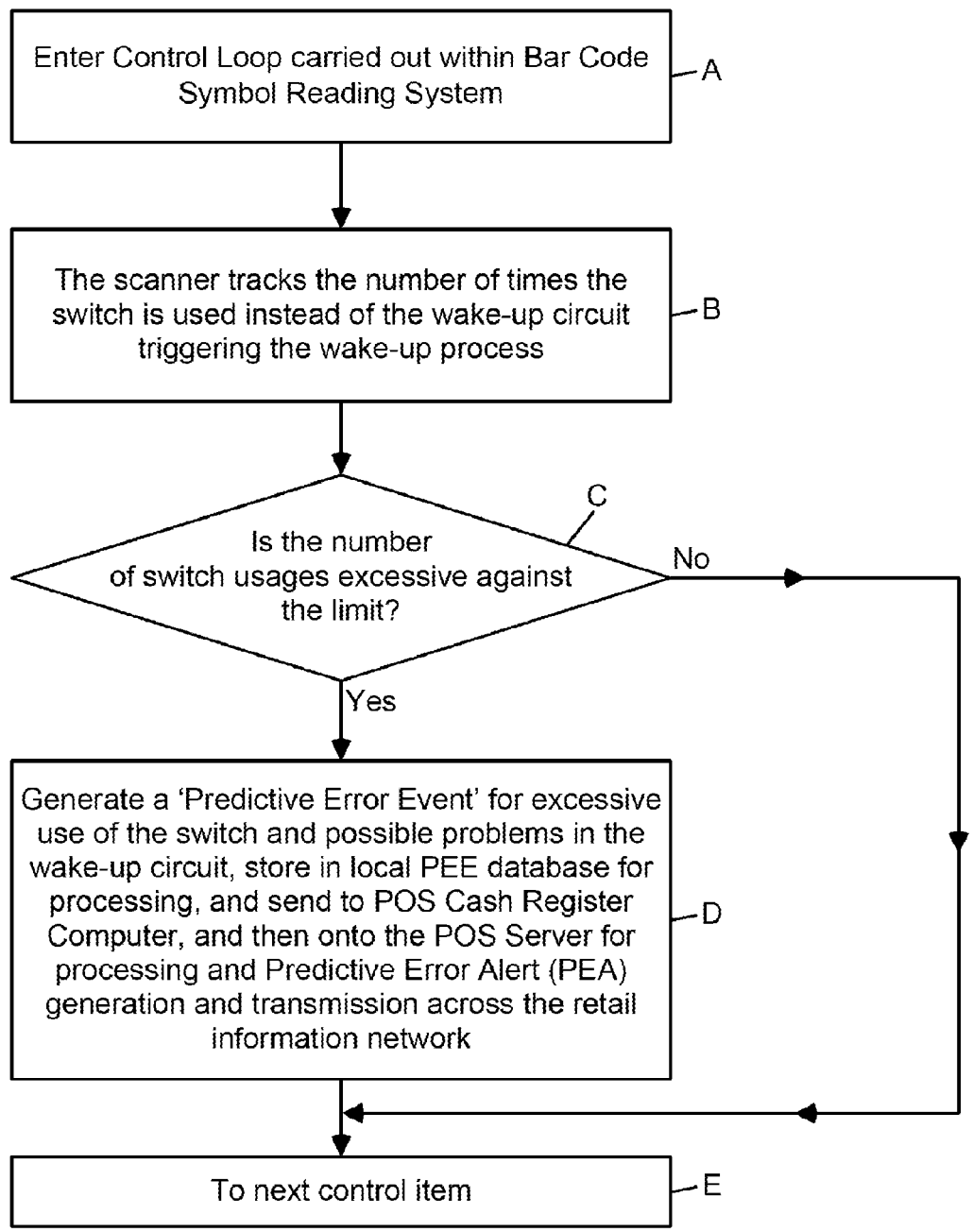
FIG. 19A is a flow chart describing the primary steps carried out during the predictive error event detection process automatically and transparently carried out within a hybrid laser scanning and digital imaging system having an electronic weigh scale subsystem, to predict when the wake-up switch is being used excessively.

The flow chart set forth in FIG. 19A illustrates system monitoring and tracking of the number of time the wake-up button switch 67B is used instead of the IR wake-up sensor circuit 67A, during the system wake-up process. A predictive error event (PEE) occurs whenever the system operates outside of pre-programmed bounds, or "warning areas", regarding system wake up using the manually-triggered wake-up switch 67B, instead of using the automatic IR wake-up sensor circuit 67A. The aim of the present method is to detect these "warning areas" and command action before failure events actually occur.

As indicated at Block A in FIG. 19A, the bi-optical bar code symbol reading system enters the control loop.

At Block B in FIG. 19A, the system controller tracks the number of times the manually-triggered wake-up switch 67B is depressed during the wake-up process, rather than the IR wake-up sensor circuit 67A

At Block C in FIG. 19A, the system controller determines whether the number of times the manually-triggered wake-up switch 67B is depressed, relative to the IR wake-up sensor 67A usage, exceeds the preprogrammed limit set for the system. If the usage values do not exceed the preprogrammed thresholds, then the system controller proceeds to Block E and moves onto the next control process.

If the switch is used an excessive number of times, then the system controller proceeds to Block D in FIG. 19A and generates and stores predictive error event (PEE) in the local PEE database 905, for excessive use of the switch outside system's preprogrammed threshold limits and potential problems with the IR wake-up sensor circuit 67A. This PEE remains active until it is automatically cleared, manually cleared, or the IR wake-up sensor 67A actually affects system wake-up. If local PEE limits are exceeded, then the PEE record is transmitted upstream to the POS cash register computer system 930, and then re-transmitted to the POS server 970 for storage in the remote PEE database, and subsequent processing. If thresholds are exceeded, the POS server 960 generates and transmits a PEE alert (PEA) to both management and maintenance to inspect the system, and analyze the faulty wake-up detector device 67A and replace it if necessary.

At Block E in FIG. 19A, the system proceeds onto the next control process item maintained within the system.

Method of Predicting Wake-Up Sensor Error Activity by Monitoring Excessive Usage of Digital Imager Based Wake-Up Sensor In some instances, it may be advantageous for the hybrid bi-optic bar code symbol reading system 100 to be configured so that its digital imaging module 210 is used as a backup to sense the presence of the cashier (by capturing and processing digital video images) and wake-up the system from power save ("sleep") mode when the cashier is recognized in one or more of the digital images. When the digital-imaging wakeup sensor 67C is activated, monitoring the system for repetitive activation out of power save mode, instead of the normal use of the IR or photo transistor sensor for the same purpose, it could predict that there may be something failing or about to fail with the operation of the power save wakeup IR or Photo transistor circuit.

Excessive reliance on the digital imager-based wake-up detector 16C could be a warning or predictor that normal IR wake-up sensor circuit 67A in the system 100 is not working properly, and therefore, the system is relying too much on the supplementary imager detector 16C to control the sleep mode of the system. When use of the imager detection circuitry is used a predetermined number of times in comparison to the number of times the regular IR-wake-up sensor has been used, the system automatically generates a predictive error event (PEE) and corresponding alert, signaling the network that the imager detector is being used excessively and that the IR or photo-transistor functionality of the regular IR wake-up sensor circuit 67A probably requires inspection and/or maintenance.

Figure 19B:
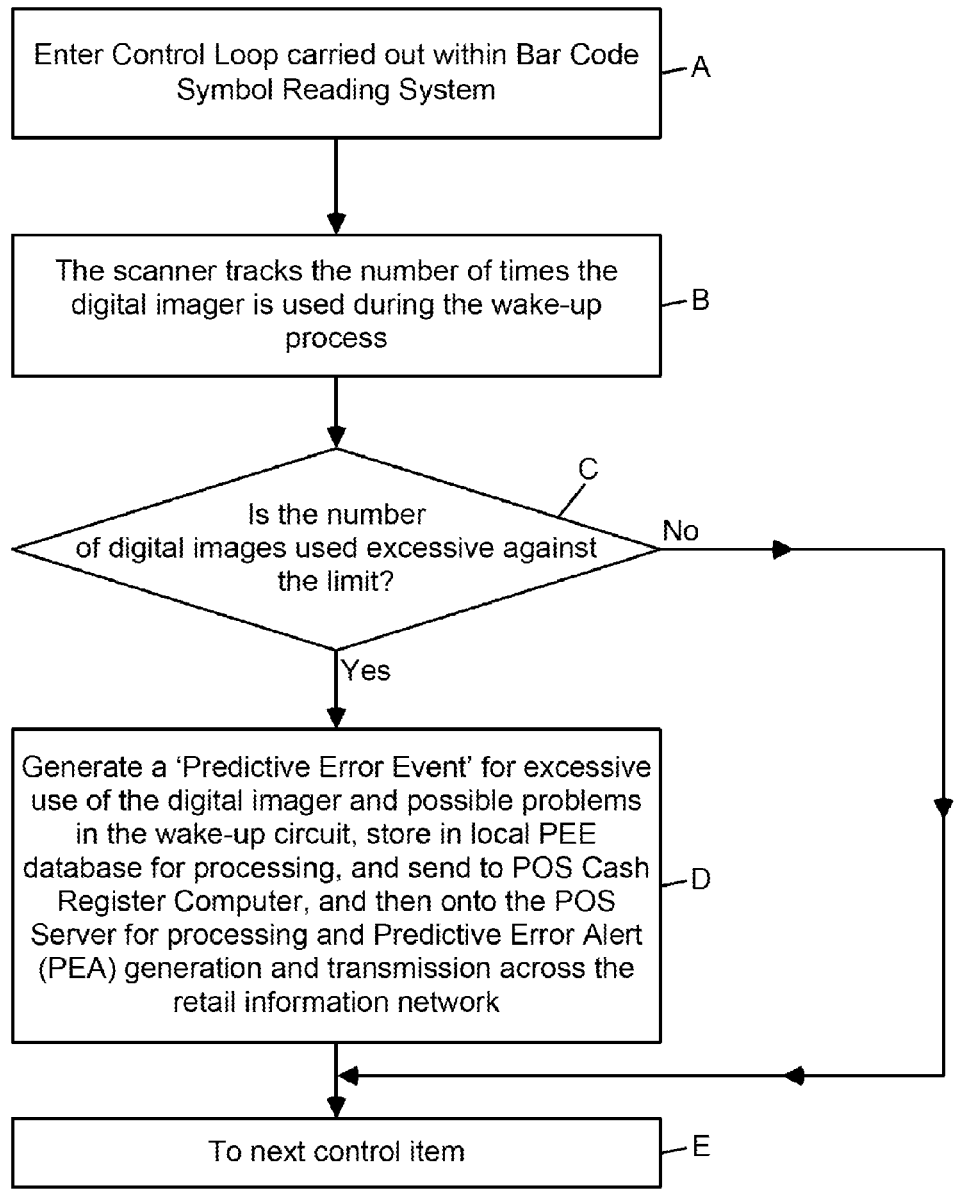
FIG. 19B is a flow chart describing the primary steps carried out during the predictive error event detection process automatically and transparently carried out within a hybrid laser scanning and digital imaging system having an electronic weigh scale subsystem, to predict when the backup digital-imaging based wake-up circuit starts performing a larger percentage of the wake-up function operations than the main IR-based wakeup sensor circuit.

The flow chart set forth in FIG. 19B illustrates system monitoring and tracking of the number of times the imager detection circuit is used as compared to the IR or photo transistor wake-up sensing circuit 67A, during the system wake-up process. A predictive error event (PEE) occurs whenever the system operates outside of pre-programmed bounds, or "warning areas", regarding system wake up using the imager detection circuit automatically triggered wake-up, instead of using the automatic IR wake-up sensor circuit 67A. The aim of the present method is to detect these "warning areas" and command action before failure events actually occur.

As indicated at Block A in FIG. 19B the bi-optical bar code symbol reading system enters the control loop.

At Block B in FIG. 19B, the system controller tracks the number of times the imager sensor is used to wake up the scanner as opposed to the normal IR or Photo Transistor sensor 67A.

At Block C in FIG. 19B, the system controller determines whether the number of times the imager sensor had to be used relative to the IR wake-up sensor 67A usage. If the usage values do not exceed the preprogrammed thresholds, then the system controller proceeds to Block E and moves onto the next control process.

If the imager sensor (a secondary backup sensor) is used an excessive number of times, then the system controller proceeds to Block D in FIG. 19B and generates and stores predictive error event (PEE) in the local PEE database 905, for excessive use of the imager-based wake-up sensor 16C being outside the system's preprogrammed threshold limits and potential problems with the IR wake-up sensor circuit 67A, and this PEE remains active until it is automatically-cleared, manually cleared, or the IR wake-up sensor 67A actually is used more than the imager-based wake-up sensor 16C for wake-up, usually because system maintenance was performed. If local PEE limits are exceeded, then the PEE record is transmitted upstream to the POS cash register computer system 930, and then re-transmitted to the POS server 960 for storage in the remote PEE database, and subsequent processing. If thresholds are exceeded, the POS server generates and transmits a PEE alerts (PEA) to both management and maintenance to inspect the system, and analyze the faulty wake-up detector device and replace it if necessary.

At Block E in FIG. 19B, the system proceeds onto the next control process item maintained within the system.

Method of Predicting Switch Faults and Reliability by Analyzing Switch Behavior

Years ago, systems were designed and built using 'switch debounce' circuits inserted between the switches themselves, and the electronics that use them. This was a great help as it provided a 'dampening' effect on the signal from the switch contacts. Switch debounce circuits eliminated bouncy electronic noise signals that could cause problems in systems that required clean activations, to prevent discrete circuits from aberrant behavior. However, today, economics have replaced 'switch debounce' circuits with software-based filtering solutions that ensure the reliability of mechanical switch function.

To facilitate detection of any marginally-faulty push-button switch in the system (including push-button switch 67B), the switch should be made to generate a diversion, or system interrupt. The switch interruption and handling software module 67D, implemented on a programmed processor within system 100 or 400, will be activated when the switch 67B is engaged (i.e. switched-on event), and also when disengaged (i.e. switched-off event). A general multi-purpose free running timer is used in the switch software. Whenever a switch 67B changes state, it generates an interrupt and the software 'marks' the time of the event. Then all events (i.e. both "switched-on" and "switched-off" events) provide a good indication of how the switch is working mechanically. When the timing between switched-on and switched-off events is too fast, or is sensed as being too long, then such abnormalities can be used to predict an error that the manual switch 67B will totally fail sometime in the near future.

Figure 20:
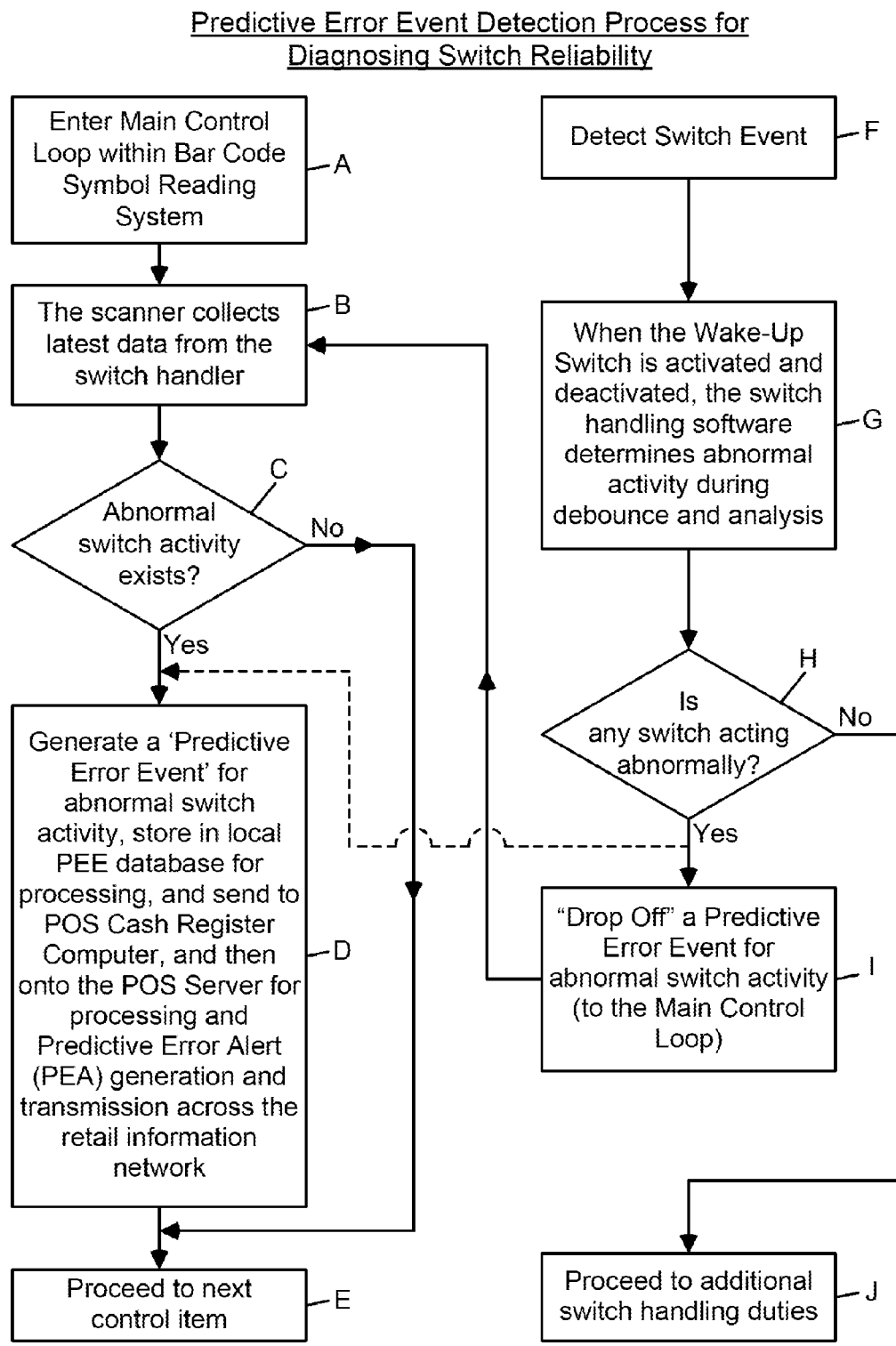
FIG. 20 is a flow chart describing the primary steps carried out during the predictive error event detection process automatically and transparently carried out within a hybrid laser scanning and digital imaging system having an electronic weigh scale subsystem, to diagnose switch reliability.

As indicated at Block A in FIG. 20, the bi-optical bar code symbol reading system enters the control loop.

At Block B, the system controller collects and tracks the latest data from the switch handler software (transferred from Block I).

At Block C in FIG. 20, the system controller determines whether or not abnormal switch activity exists (relative to predetermined threshold levels). If abnormal switch activity is not detected relative to the preprogrammed thresholds, then the system controller proceeds to Block E and moves onto the next control process.

If abnormal switch activity is detected at Block C in FIG. 20, then the system controller proceeds to Block D and generates and stores a predictive error event (PEE) in the local PEE database 905, for abnormal switch activity (i.e. indicative that the switch is in peril of failure), and this PEE remains active until it is automatically-cleared, manually cleared, or the wake-up switch 67B starts or resumes operating properly. If local PEE limits are exceeded, then the PEE record is transmitted upstream to the POS cash register computer system 930, and then re-transmitted to the POS server 960 for storage in the remote PEE database, and subsequent processing. If thresholds are exceeded, the POS server generates and transmits a PEE alerts (PEA) to both management and maintenance to inspect the system, and analyze the faulty switch in question and replace it if necessary.

At Block E in FIG. 20, the system proceeds onto the next control process item maintained within the system.

An auxiliary control loop runs between Blocks F through J, while the main control loop from Blocks A through E, operates.

As indicated at Block F in FIG. 20, when the switch 67B is activated or deactivated, the switch interrupt and handling software module 67D within the system 100, or 400 is automatically entered, on an interrupt basis, and detects the occurrence of each switch event (i.e. switched-on or switched-off event).

As indicated at Block G in FIG. 20, when the switch 67B is activated and deactivated (i.e. switched-on or switched-off), the switch handling software 67D determines abnormal switch timing activity during debounce and analysis (i.e. as the switch goes from active, inactive, active, inactive etc).

At Block H in FIG. 20, using switch-timing analysis, the control process determines whether or not the switch is acting abnormally. If the switch is acting normally, then the control process proceeds to Block J, and the software continues with normal switch handling, servicing additional switch handling duties. If the switch is acting abnormally, then the control process proceeds to Block I, a flag is sent to the normal control loop, signally that a particular switch is showing signs of possible failure at some future time, a predictive error event (PEE) for abnormal switch activity is generated, and transferred to the main control loop, as shown in FIG. 20. Processing now waits for the arrival of the asynchronous control loop to catch the flag during its normal monitoring activities.

Method of Predicting Dirty Scan Window Error Activity by Optically Monitoring Scan Quality The method described in FIGS. 21A through 21D provides the hybrid digital imaging and scanning system 100, or digital imaging system 600, with the capacity to automatically predict when the scanning/imaging window is not sufficiently clean of debris, grime and/or grit, and it should be cleaned to avoid system performance errors, degradation, and/or malfunction.

In the illustrative embodiment, the method of detection is the based on the fact that the scanning system maintains information specifying precisely where on each scanning window, the current bar code is located. The system captures and maintains a digital image of the laser scanning pattern projected through each scanning window, each time a bar code is scanned in the 3D scanning volume. The system maintains a history of numbers mapped on a cross-hatched map of the surface area of each scanning window, and signifying degrading contrast or other troubled parameters at each location in the scanning window. Using this technique, the system can determine precisely which surface region of the scanning window requires cleaning. The details of this predictive method will be described in detail hereinbelow with reference to FIG. 21

Figure 21A:
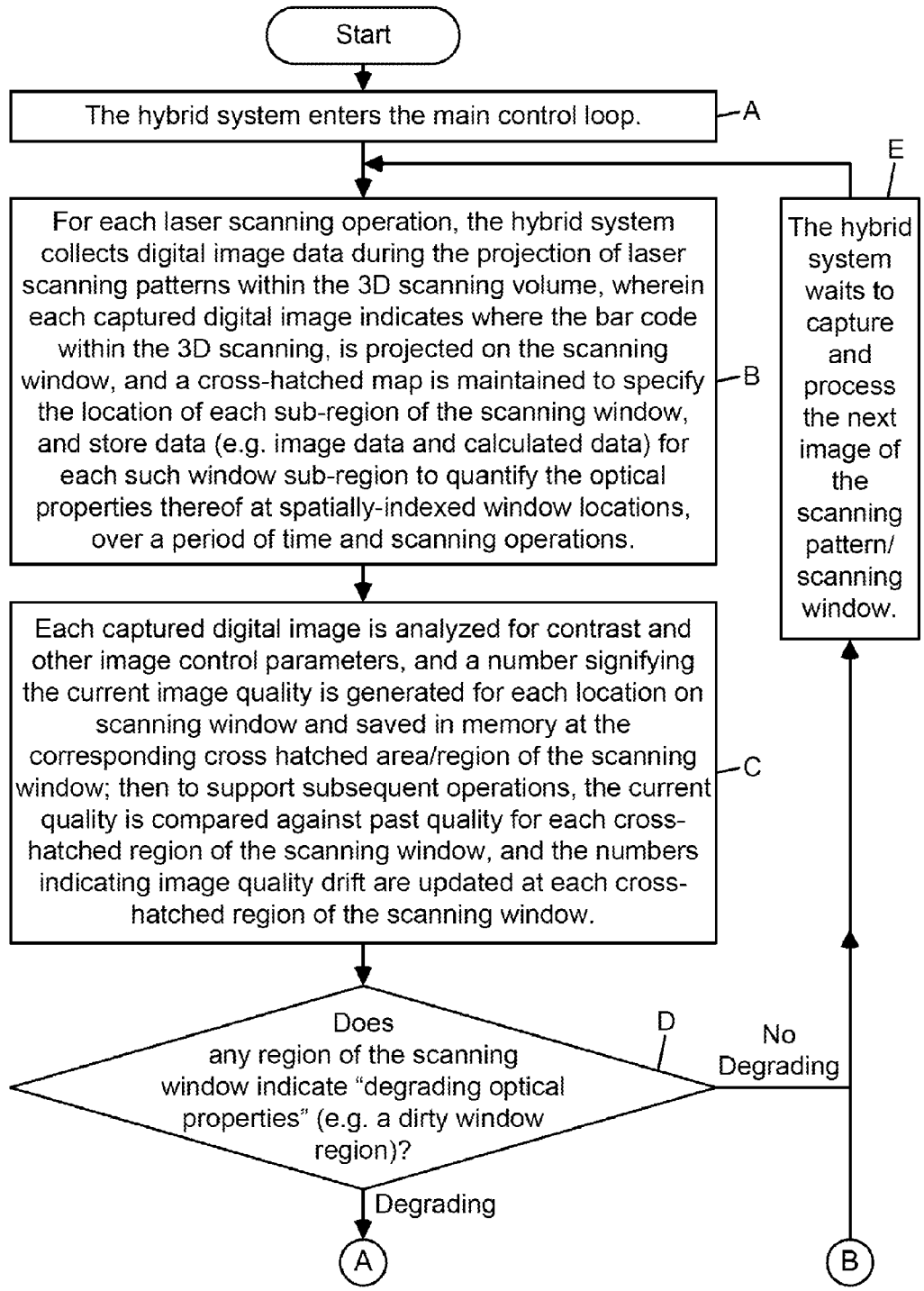
FIGS. 21A through 21D, set forth, a flow chart describing the primary steps carried out during the predictive error event detection process automatically and transparently carried out within a hybrid laser scanning and digital imaging system having an electronic weigh scale subsystem, to predict when the scanning/imaging windows are dirty. This process is an example of when the cashier is proactively kept in the service loop by feedback presented to the cashier and tracking his/her actions for non-compliance to the solution.

As indicated at Block A in FIG. 21A, the hybrid system 100 enters its main control loop.

As indicated at Block B in FIG. 21A, for each laser scanning operation, the hybrid system collects digital image data during the projection of laser scanning patterns within the 3D scanning volume, wherein each captured digital image indicates where the bar code is located within the 3D scanning, is projected on the scanning window, and a cross-hatched map is maintained to specify the location of each sub-region of the scanning window, and stores data (e.g. image data and calculated data) for each such window sub-region to quantify the optical properties thereof at spatially-indexed window locations, over a period of time and scanning operations.

As indicated at Block C in FIG. 21A, each captured digital image is analyzed for contrast and other image control parameters, and a number signifying the current image quality is generated for each location on scanning window and saved in memory at the corresponding cross hatched area/region of the scanning window; then to support subsequent operations, the current quality is compared against past quality for each cross-hatched region of the scanning window, and the numbers indicating image quality drift are updated at each cross-hatched region of the scanning window.

As indicated at Block D in FIG. 21A, the hybrid system determines whether or not any region of the scanning window indicate "degrading optical properties" (e.g. dirty window region) based, for example, on a number of scans which exhibit progressively poorer quality images.

As indicated at Block E in FIG. 21A, the hybrid system waits to capture and process the next image of the scanning pattern/scanning window.

Figure 21B:
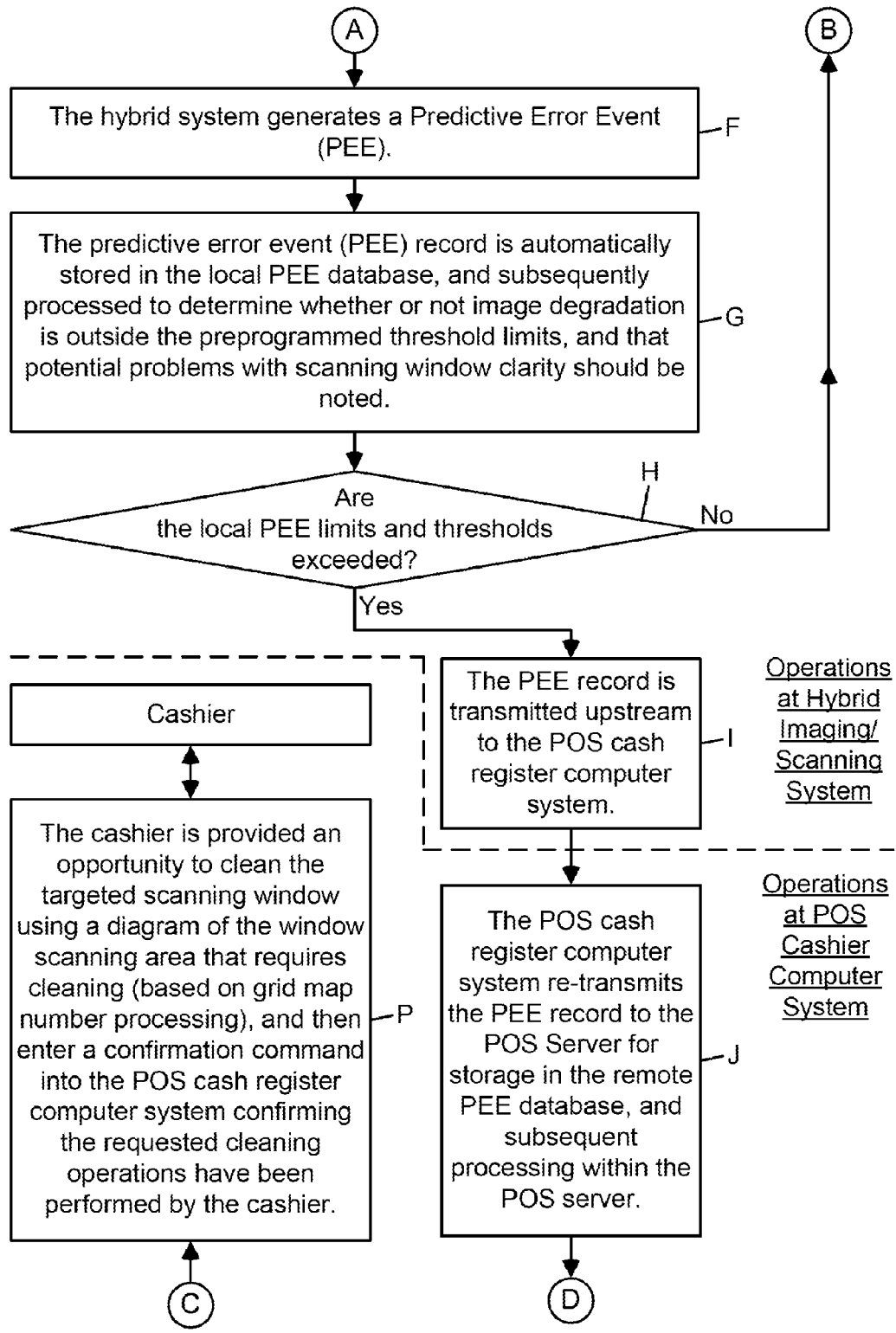

If any area of a scanning window exhibits degrading optical properties (i.e. constantly drifting in the direction of image quality degradation), then the control system moves to Block F in FIG. 21B to generate a Predictive Error Event (PEE).

As indicated at Block G in FIG. 21B, a predictive error event (PEE) record is automatically stored in the local PEE database, and subsequently processed to determine whether or not image degradation is outside the preprogrammed threshold limits, and that potential problems with scanning window clarity should be noted. The PEE remains active until it is automatically-cleared, manually cleared, or the image for that particular area improves above the threshold signifying good scans are now read there.

As indicated at Block H, the remote POS Server determines whether or not the local PEE limits and thresholds are exceeded.

If PEE limits and thresholds are not exceeded at Block H in FIG. 21B, then the system proceeds onto control Block E and waits to scan the next bar code symbol, and capture and process digital images at Block B.

If the local PEE limits and thresholds are exceeded at Block H, then at Block I the PEE record is transmitted upstream to the POS cash register computer system.

As indicated at Block J in FIG. 21B, the POS cash register computer system relays the PEE record to the POS server for storage in the remote PEE database, and subsequent processing within the POS server.

Figure 21C:
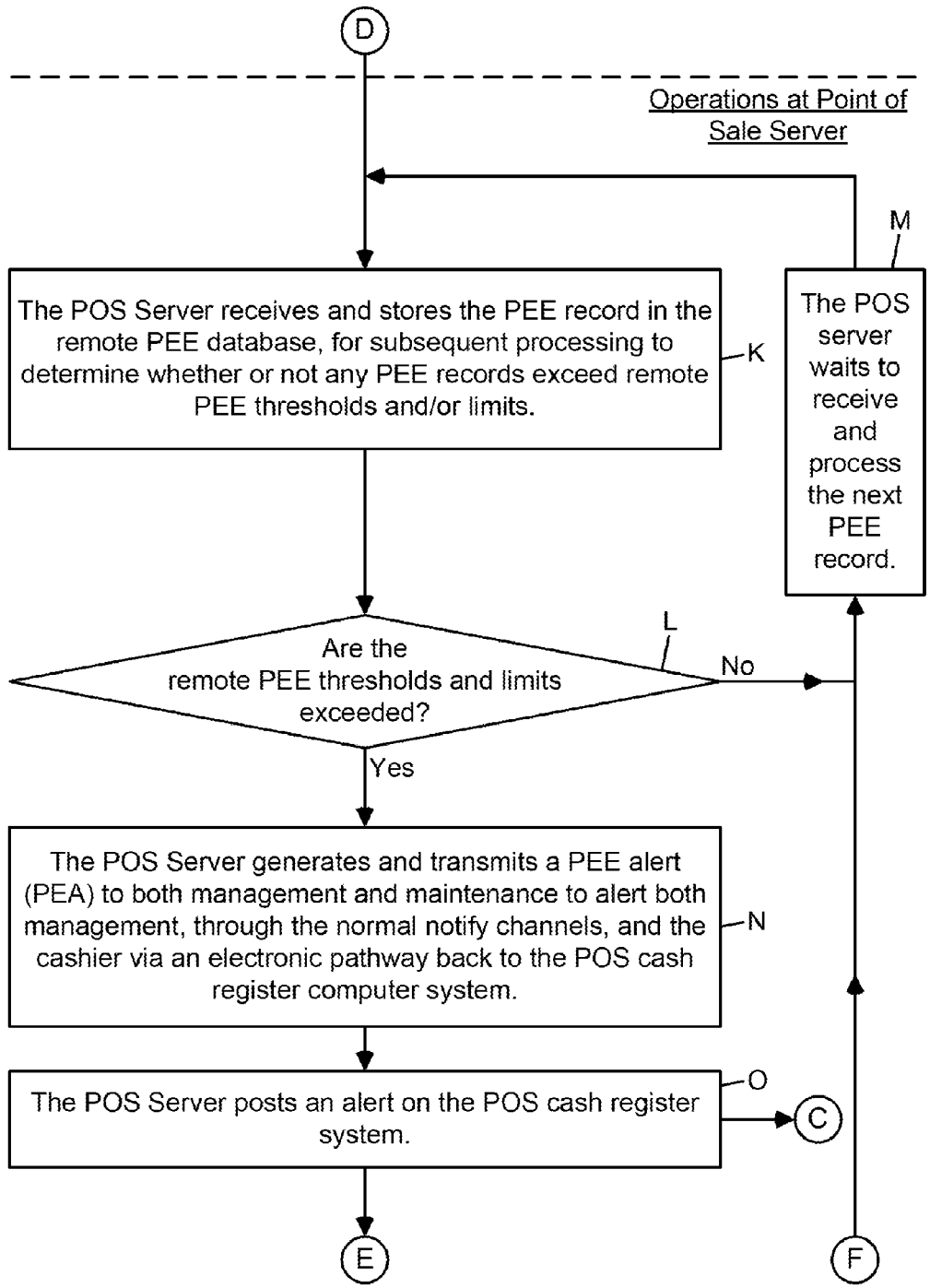

As indicated at Block K in FIG. 21C, the POS server receives and stores the PEE record in the remote PEE database, for subsequent processing to determine whether or not any PEE records exceed remote PEE thresholds and limits.

As indicated at Block L in FIG. 21C, the remote POS server determines whether or not the remote PEE thresholds and limits exceeded.

If at Block L in FIG. 21C the remote PEE limits and thresholds are not exceeded, then the POS server proceeds to Block M, and waits to receive and process the next PEE record.

If at Block L in FIG. 21C, the local PEE limits and thresholds are exceeded, then at Block N, the POS server generates and transmits a PEE alert (PEA) to both management and maintenance to alert all parties that subscribe to the (PEA) alerts through the normal notify channels As indicated at Block O in FIG. 21C, the POS server posts an alert back to the POS cash register system if the alert is a type that concerns anyone, namely the cashier, at the POS checkout station. If alert is intended to be sent to the POS cash register system (cashier), then it is sent there at this time via connector C.

As indicated at Block P in FIG. 21B, the cashier is provided an opportunity to clean the targeted scanning window using a diagram of the window scanning area that requires cleaning (based on grid map number processing), and then entering a response into the POS cash register computer system that the requested cleaning operations have been performed.

Figure 21D:
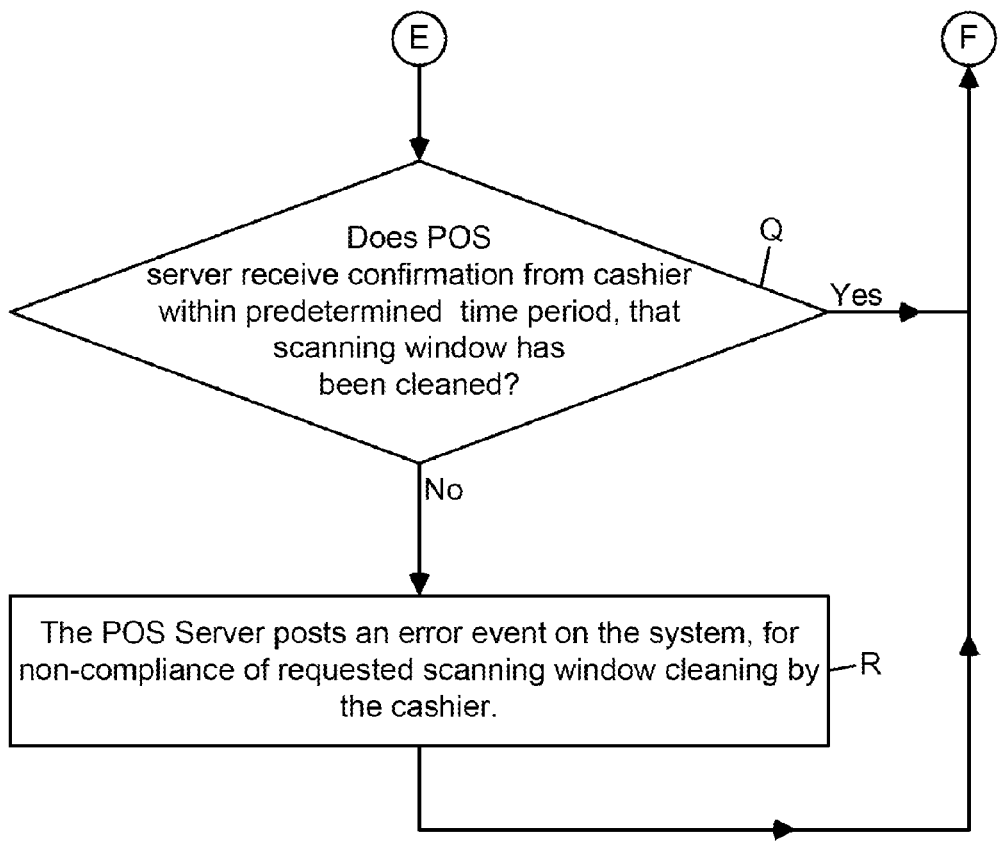

As indicated at Block Q in FIG. 21D, the POS server waits a predetermined period of time for the cashier to perform the requested scanning window cleaning operations, and also an opportunity to validate, through the POS cash register computer system, that the cashier's duty of cleaning the window of the scanning system has been carried out in a prompt manner.

If at Block Q in FIG. 21D the window is cleaned in a timely manner by user confirmation given at the POS cash register computer system, then the POS server returns to Block M and waits for the next scanning operation and PEE record generation.

If at Block Q in FIG. 21D the window is not cleaned in a timely manner, by user confirmation, then the POS Server advances to Block R, and posts another error event on the system, for non-compliance of requested scanning window cleaning by the cashier. This event is directed to the cashier's supervisor or management thus enforcing compliance of installed service maintenance systems.

After Block R in FIG. 21D, the POS server returns to Block M and waits for the next scanning operation and PEE record generation.

While this process has been carried out on the hybrid system 100 described above, it is understood that this process can be carried out using a digital imaging bar code symbol reading system, such as system 600, to ensure that its imaging windows are maintained in a clean (i.e. optically transparent state) during system operation, to prevent performance degradation or the occurrence of system failure.

Figure 22:
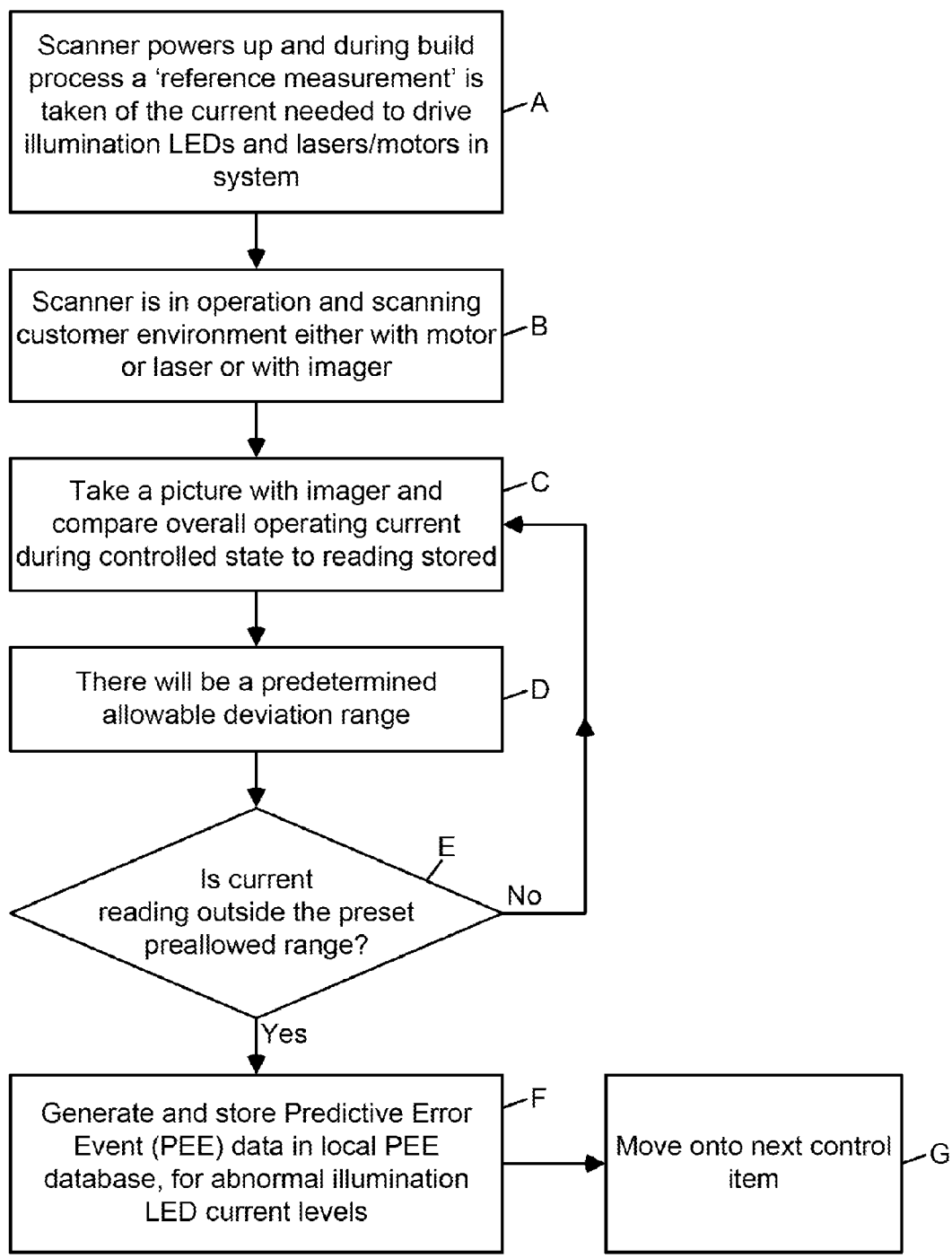
FIG. 22 is a flow chart describing the primary steps carried out during the predictive error event detection process automatically and transparently carried out within a hybrid laser scanning and digital imaging system having an electronic weigh scale subsystem, to predict when the imaging LEDs, laser diodes and scanning motors are operating outside their specified range of electrical current.

Method of Predicting Illumination LED Failure by Monitoring LED Current During Digital Imaging Operations The method described in FIG. 22 provides hybrid digital imaging and scanning system 100, or digital imaging system 600, with the capacity to automatically predict when the illumination LEDs, used during digital imaging operations, are close to device failure, degradation, and/or malfunction, and should be serviced before LED failure actually occurs.

As indicated at Block A in FIG. 22, the scanning system powers up and during the build process, and a "reference measurement" is taken of the electrical current required to drive the illumination LEDs employed by the digital imaging subsystem 210, as well as lasers and scanning motors employed in the laser scanning subsystems 150.

As indicated at Block B in FIG. 22, the scanning system powers up as normal and is operational (i.e. digital imager captures and processes digital images of objects in the FOV and/or the laser scanning subsystem laser scans objects in the 3D scanning volume).

At Block C in FIG. 22, the digital imaging subsystem captures a digital image of the FOV, the operating current through the illumination LEDs is measured and compared against the reference measurement taken and stored at Block A.

As indicated at Block D, a predetermined range of deviation will be allowed between the measured current value and reference measurement.

At Block E in FIG. 22, an algorithm is run to determine whether or not the deviation between the measured electrical current through the illumination LEDs and the reference measurement, falls outside the pre-set allowed range of deviation. If the deviation does not fall outside the pre-allowed range of deviation, then the system returns to Block C, and captures another digital image, measures the operating current through the illumination LEDS and compares the current measurement against the reference measurement taken and stored in Block A. If the deviation does fall outside the pre-allowed range of deviation, then the system proceeds to Block F, and generates and stores a predictive error event (PEE) in the local PEE database 905 for abnormal electrical current levels through illumination LED. If local PEE limits are exceeded, then the PEE record is transmitted upstream to the POS cash register computer system 930, and then re-transmitted to the POS server 960 for storage in the remote PEE database, and subsequent processing. If thresholds are exceeded, the POS server generates and transmits a PEE alert (PEA) to both management and maintenance to inspect the system, and analyze the faulty LED circuitry and replace it if necessary.

At Block G in FIG. 22, the system proceeds to the next control item.

Figure 23A:
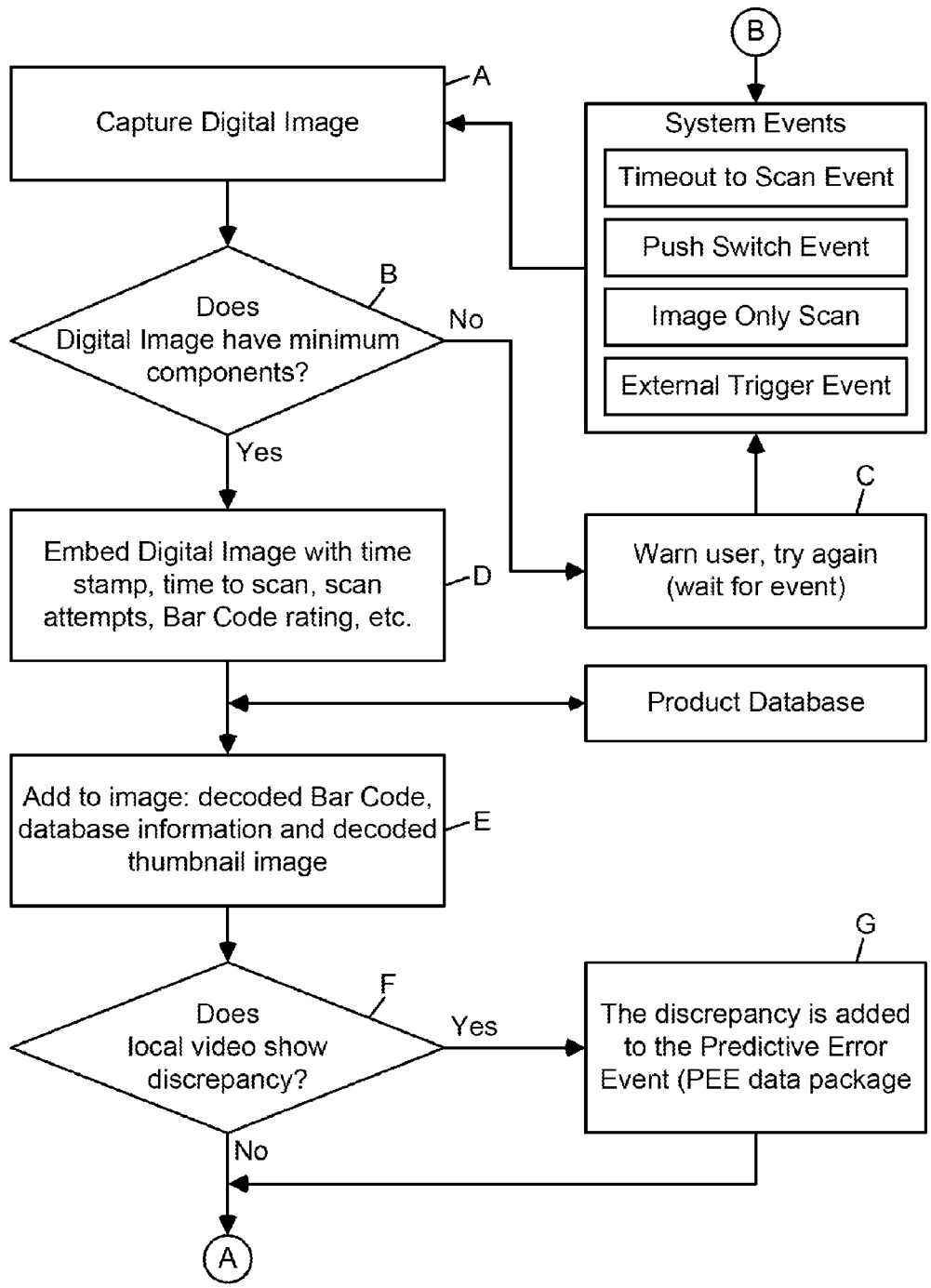
FIGS. 23A and 23B set forth a flow chart describing the primary steps carried out during the predictive error detection process automatically and transparently carried out within a hybrid laser scanning and digital imaging system, to predict when certain bar code symbols on certain product items are likely to present difficulty when scanned at POS checkout stations, and to automatically send notification and metrics to retail managers, and other along the supply chain, up to product manufacturers.
Figure 23B:
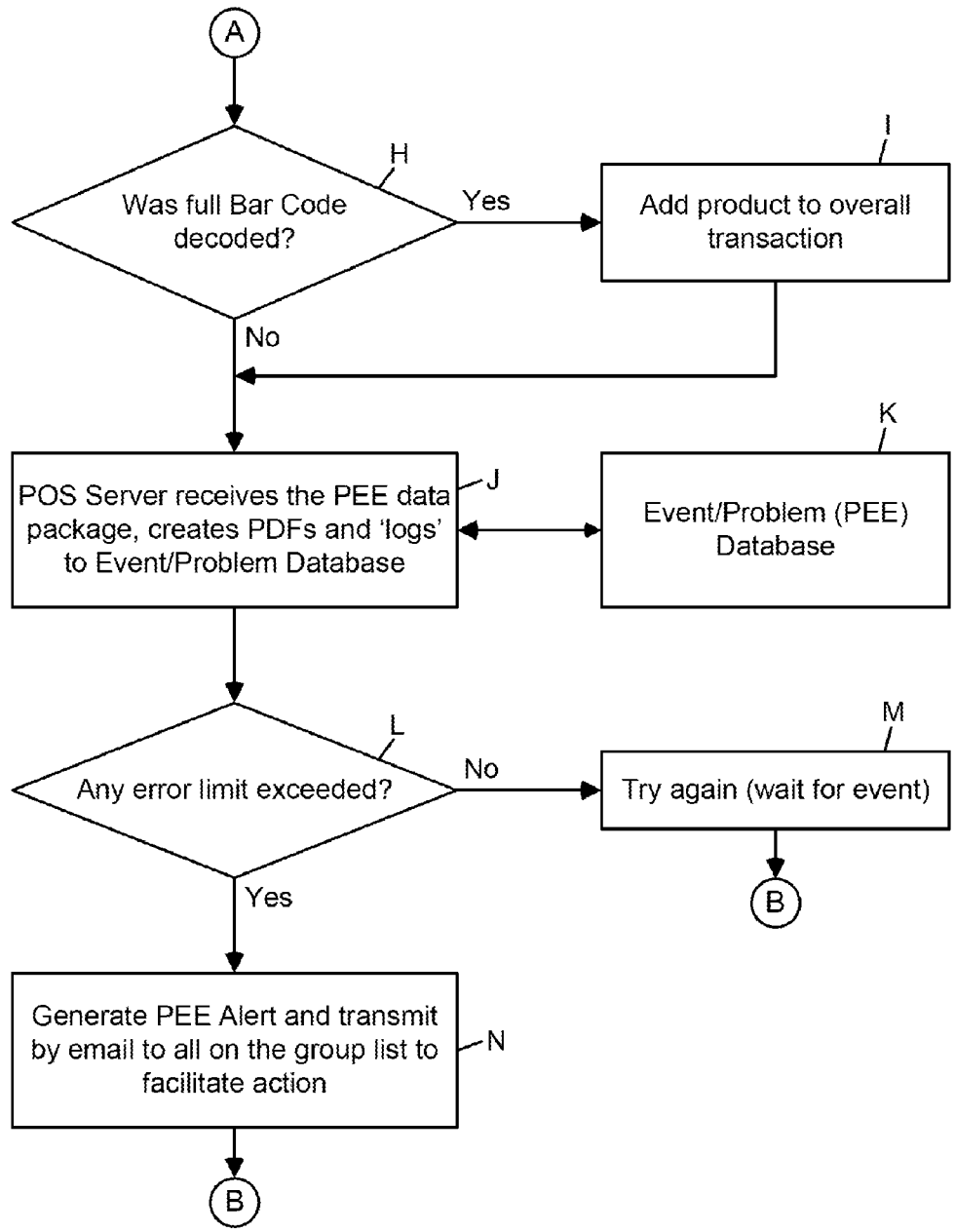

Predictive Error Event Detect Process for the Recognition of Damaged and Deformed Products and Barcodes on Those Products In FIGS. 23A and 23B, a method is described for predicting error events based on the recognition of damaged and deformed consumer products, and barcodes affixed to those products, where, for example, barcodes may be torn, wrinkled, over-printed, under-printed, completely decimated, or just poorly printed. As will be described below, the predictive error detection process is carried out automatically and transparently within the hybrid laser scanning and digital imaging system 100, or digital imaging system 600, to predict that certain bar code symbols on certain product items are likely to present difficulty when scanned at POS checkout stations, and to automatically send notification and metrics to retail managers, and other along the supply chain, up to product manufacturers, to perfect and protect the product's barcode readability.

When using the hybrid system 100, the digital imaging module 210 is used to capture and store a digital image of the product item within the FOV. Typically, the digital image will be triggered by the hybrid bi-optic system 100 in response to the laser scanning subsystem's difficulty to read a bar code symbol in its 3D scanning volume. After some programmable time, a digital image is automatically triggered and generated by the hybrid scanning/imaging system. The capture digital image contains 'visual proof' that the bar code is a difficult one to read in that it appears in the image with along information about the barcode and product. In the event the product item was fully decoded, but took awhile to decode the symbol, the digital image would include, as embedded data, the following data elements: time stamp of image capture; the alpha and/or numbers as decoded by the bar code symbol decode processor; the time to scan/decode; the attempts at scanning/decoding; the information from the store's database as to the description of the product; and a barcode rating that shows the readability of the barcode by the scanner. Any one of these data items may be in error, or the bar code is shown to be defective.

The method described in FIGS. 23A and 23B provides the hybrid digital imaging and scanning system 100, or digital imaging system 600, with the capacity to automatically predict error events for recognized damaged and deformed products and barcodes on those products.

As indicated at Block A, the hybrid bar code symbol reading system captures a digital video image in response to any one of a number of possible "system events" that can be produced from a timeout to scan (exceeding a predetermined time duration to decode), image-only scan occurrence, push button activation, or other external command to start data product/code information gathering via digital video imaging.

As indicated at Block B, the hybrid system determines whether or not digital image contains minimum components. If the captured digital image does not have minimum components, then the system proceeds to Block C and warns the user/cashier to try to read the bar coded product once again (while the system waits for the next system event to occur). If the captured digital image does have minimum components, then the system proceeds to Block D and the digital image is embedded with the following data elements: its time stamp; time to scan duration; number of scan attempts; bar code rating; etc.

At Block E, the product/price database 990 is used to add the following data items to the captured digital of the product/code: decoded bar code symbol character data; database information; decoded thumbnail image; etc. Other customer parameters may be included as part of the configuration of this predictive error event (PEE) based on bar code symbol readability/decodability issues.

As an alternative to embedding information within the digital image file at the hybrid system, the 'package' of bar code information can be transmitted to the POS cash register computer system, by a driver request, and the information embedded with the captured video images. Also, a video image of the product can also appear on the POS video display along with the product description. This digital image of the product can be useful for the customer, and also hold the cashier accountable, that is, if the customer and management 'see' a costly item being scanned, yet a small item (like a pack of gum appears from the product/price database), then something is terribly wrong somewhere.

At Block F, the hybrid system then determines whether or not the locally display digital video image show discrepancy. If local digital video image shows discrepancy at Block F, then at Block G the discrepancy is added to the predictive error data package.

If the local digital video image does not show discrepancy at Block F, then at Block H, the system determines whether or not a full bar code was decoded. If a full bar code is decoded, then at Block I, the product is added to the transaction at the POS checkout station.

If a full bar code is not decoded, the process proceeds to Block J, and PEE data package (e.g. digital video image and embedded data plus any discrepancies) are transmitted to the POS cash register computer 930, and then the POS cash register computer system transmits the package to the POS information server. The POS information server 960 receives the PEE data package from the POS cash register computer system 930, and logs the same to the PEE event/problem database 960.

Once PEE data packages start arriving at the POS information server 960 and stored in the event/problem database, the PEEs can be collated according to various criteria, including: (i) by same products that give all checkout lanes same problems during bar code symbol reading—which can point to hard to read bar codes or bar codes that have degraded over time; (ii) by products that gives only one checkout lane problems during bar code symbol reading—which can be construed as a problem with a bar code symbol reading system, a need to clean the POS station, the replacement of a scanner; (iii) by all products coming from a specific location in the retail store (e.g. product codes read in the deli, for example, are becoming harder to read which could alert that the in-house deli printer needs maintenance, e.g. because of "worn print heads" or depleted printer media); and (iv) by particular bar codes that can only be read by the digital imaging subsystem of the hybrid scanner, predicting that the laser scanning subsystem should be scheduled for maintenance testing.

At Block L, the POS information server 960 determines whether or not an error limit is exceeded, and if no, then at Block M, the user tries again, or waits for another system event. Also, it could be that the limit of events has not been reached, so the database is left alone until some programmable limit is reached. This limit can also be a daily or weekly report (auto-generated of course) or the fact of reaching the programmable limit.

If an error limit is exceeded, then at Block N, the POS server 960, or 970, generates a PDF-based predictive error alert (PEA), based on a corresponding PEE, and transmits the PEA message via email or instant message, or other electronic means of notification, to all on the group list to facilitate action.

Modifications that Come to Mind

All of the methods described above involve "watching" adherence and actions taken on the Predictive Error Alerts (PEAs) posted in the system. If no actions take place in a reasonable timeframe, then additional alerts should be generated to let management know that no action has been taken. This forces compliance to the system.

The above-described system and method embodiments have been provided as illustrative examples of how operational performance of POS scanning and checkout systems with bar code symbol reading systems can be significantly improved using local predictive error event (PEE) databases and remote POS information servers processing PEE data packages and sending notifications to technicians and managers assigned to make repairs or performance maintenance operations in response to predictive error alerts (PEAs) and notification.

The present invention disclosure has taught, in great detail, how bar code symbol reading systems at a POS scanning and checkout station, can automatically detect predictive error events (PEE) and store them in a local PEE database or data store 905 (e.g. for statistical purposes), and transmitting a PEA data package to the POS cash register computer system, and ultimately to the POS information server 970, for handling, processing and handling. However, it is understood that the local PEE database 905 can be implemented anywhere within the POS station of the bar code symbol reading (i.e. scanning) system.

Although the description above contains much specificity, these should not be construed as limiting the scope of the invention, but as merely providing illustrations of some of the presently preferred embodiments of this invention. All structural and functional equivalents to the elements of the above-described embodiments that are known to those of ordinary skill in the art are expressly incorporated herein by reference and are intended to be encompassed by the accompanying Claims. Variations and modifications to such apparatus and processes will readily occur to those skilled in the art having the benefit of the present disclosure. All such modifications and variations are deemed to be within the scope of the accompanying Claims.

The invention claimed is:

1. A symbol reading system, comprising:
a housing having a scanning window;
a symbol reading subsystem disposed in the housing for reading symbols within a region adjacent the scanning window, generating symbol character data for each read symbol, and transmitting the symbol character data to a computer;
a local predictive error event (PEE) data store for logging and storing predictive error events (PEEs) detected within the symbol reading system; and
a processor configured for:
determining if the number of detected PEEs exceeds a threshold; and
if the number of detected PEEs exceeds the threshold, generating an alert.

2. The symbol reading system of claim 1, wherein the symbol reading subsystem comprises:
  a laser scanning subsystem for generating and projecting a plurality of laser scanning planes through the scanning window, which intersect within a 3D scanning volume adjacent the scanning window and provide a laser scanning pattern within the 3D scanning volume, for scanning symbols within the 3D scanning volume and producing a first signal; and
  a scan data processor for processing the first signal produced by the laser scanning subsystem and generating symbol character data for each read symbol.

3. The symbol reading system of claim 1, wherein the symbol reading subsystem comprises:
  an imaging subsystem for projecting a field of illumination (FOI) and a coextensive field of view (FOV) into the region adjacent the scanning window and capturing and processing digital images of symbols in the FOV; and
  an image processor for processing the digital images produced by the imaging subsystem to read symbols in the FOV.

4. The symbol reading system of claim 3, wherein:
  the imaging subsystem comprises an illumination LED that is driven by a current to project the FOI; and
  the processor is configured for:
    determining if the current is within a predetermined range; and
    if the current is not within the predetermined range, generating a PEE.

5. The symbol reading system of claim 1, wherein the symbol reading subsystem comprises:
  a laser scanning subsystem for generating and projecting a plurality of laser scanning planes through the scanning window, which intersect within a 3D scanning volume adjacent the scanning window and provide a laser scanning pattern within the 3D scanning volume, for scanning symbols within the 3D scanning volume and producing a first signal;
  a scan data processor for processing the first signal produced by the laser scanning subsystem and generating symbol character data for each read symbol
  an imaging subsystem for projecting a field of illumination (FOI) and a coextensive field of view (FOV) into the region adjacent the scanning window and capturing and processing digital images of symbols in the FOV; and
  an image processor for processing the digital images produced by the imaging subsystem to read symbols in the FOV.

6. The symbol reading system of claim 5, wherein:
  the scanning window is located within the imaging subsystem's FOV; and
  the image processor is configured for:
    determining if a digital image indicates that the scanning window has degraded optical properties; and
    if a digital image indicates that the scanning window has degraded optical properties, generating a PEE.

7. The symbol reading system of claim 1, wherein the processor is configured for:
  if the number of detected PEEs exceeds a threshold, transmitting the logged and stored PEEs to a computer.

8. A system, comprising:
  a product/price database for storing price information associated with symbols;
  two or more symbol reading systems communicatively connected to the product/price database for reading symbols, each of the two or more symbol reading systems comprising:
    a local predictive error event (PEE) database for generating and storing PEE records of predictive error events (PEEs) detected within the symbol reading system; and
    a processor; and
  a remote PEE database communicatively connected to the two or more symbol reading systems for storing PEE records generated by the two or more symbol reading systems;
  wherein the two or more symbol reading systems' processors are configured for:
    determining if the number of detected PEEs exceeds a threshold; and
    if the number of detected PEEs exceeds the threshold, transmitting the generated PEE records to the remote PEE database.

9. The system of claim 8, wherein one or more of the symbol reading systems, comprises:
  a laser scanning subsystem for generating and projecting a plurality of laser scanning planes for scanning symbols and producing a first signal; and
  a scan data processor for processing the first signal produced by the laser scanning subsystem and generating symbol character data for each read symbol.

10. The system of claim 8, wherein one or more of the symbol reading systems, comprises:
  an imaging subsystem having a field of view (FOV) for capturing digital images of symbols in the FOV; and
  an image processor for processing the digital images produced by the imaging subsystem to read symbols in the FOV.

11. The system of claim 10, wherein:
  the imaging subsystem comprises an illumination LED that is driven by a current to project a field of illumination (FOI); and
  the processor is configured for:
    determining if the current is within a predetermined range; and
    if the current is not within the predetermined range, generating a PEE.

12. The system of claim 8, wherein one or more of the symbol reading systems, comprises:
  a laser scanning subsystem for generating and projecting a plurality of laser scanning planes for scanning symbols; and
  an imaging subsystem having a field of view (FOV) for capturing digital images of symbols in the FOV.

13. The system of claim 8, wherein one or more of the symbol reading systems, comprises:
  a laser scanning subsystem for generating and projecting a plurality of laser scanning planes through a scanning window for scanning symbols;
  an imaging subsystem having a field of view (FOV) for capturing digital images of symbols in the FOV; and
  an image processor for processing the digital images produced by the imaging subsystem;
  wherein the scanning window is located within the imaging subsystem's FOV; and
  wherein the image processor is configured for:
    determining if a digital image indicates that the scanning window has degraded optical properties; and
    if a digital image indicates that the scanning window has degraded optical properties, generating a PEE.

14. The system of claim 8, comprising a remote processor configured for:
  determining if the number of PEE records stored in the remote PEE database exceeds a remote threshold; and if the number of detected PEEs exceeds the remote threshold, generating and transmitting a signal via a communication network.

15. A system, comprising:
a product/price database for storing price information associated with symbols;
two or more symbol reading systems communicatively connected to the product/price database for reading symbols, each of the two or more symbol reading systems comprising:
   a local predictive error event (PEE) database for generating and storing PEE records of predictive error events (PEEs) detected within the symbol reading system; and
   a processor; and
a remote PEE database communicatively connected to the two or more symbol reading systems for storing PEE records generated by the two or more symbol reading systems;
wherein the two or more symbol reading systems' processors are configured for:
   determining if the number of detected PEEs exceeds a threshold;
   if the number of detected PEEs exceeds the threshold, transmitting the generated PEE records to the remote PEE database; and
   if the number of detected PEEs exceeds the threshold, generating an alert.

16. The system of claim 15, wherein one or more of the symbol reading systems, comprises:
an imaging subsystem having a field of view (FOV) for capturing digital images of symbols in the FOV; and
an image processor for processing the digital images produced by the imaging subsystem to read symbols in the FOV.

17. The system of claim 16, wherein:
the imaging subsystem comprises an illumination LED that is driven by a current to project a field of illumination (FOI); and
the processor is configured for:
   determining if the current is within a predetermined range; and
   if the current is not within the predetermined range, generating a PEE.

18. The system of claim 15, wherein one or more of the symbol reading systems, comprises:
a laser scanning subsystem for generating and projecting a plurality of laser scanning planes for scanning symbols; and
an imaging subsystem having a field of view (FOV) for capturing digital images of symbols in the FOV.

19. The system of claim 15, wherein one or more of the symbol reading systems, comprises:
a laser scanning subsystem for generating and projecting a plurality of laser scanning planes through a scanning window for scanning symbols;
an imaging subsystem having a field of view (FOV) for capturing digital images of symbols in the FOV; and
an image processor for processing the digital images produced by the imaging subsystem;
wherein the scanning window is located within the imaging subsystem's FOV; and
wherein the image processor is configured for:
   determining if a digital image indicates that the scanning window has degraded optical properties; and
   if a digital image indicates that the scanning window has degraded optical properties, generating a PEE.

20. The system of claim 15, comprising a remote processor configured for:
determining if the number of PEE records stored in the remote PEE database exceeds a remote threshold; and
if the number of detected PEEs exceeds the remote threshold, generating and transmitting a signal via a communication network.

* * * * *